United States Patent
Grondin et al.

(10) Patent No.: US 9,762,603 B2
(45) Date of Patent: Sep. 12, 2017

(54) ASSESSMENT TYPE-VARIABLE ENTERPRISE SECURITY IMPACT ANALYSIS

(71) Applicant: Informatica LLC, Redwood City, CA (US)

(72) Inventors: Richard Grondin, Sainte-Julie (CA); Rahul Gupta, Dublin, CA (US); Bala Kumaresan, Cupertino, CA (US)

(73) Assignee: Informatica LLC, Redwood City, CA (US)

( * ) Notice: Subject to any disclaimer, the term of this patent is extended or adjusted under 35 U.S.C. 154(b) by 39 days.

(21) Appl. No.: 14/708,089

(22) Filed: May 8, 2015

(65) Prior Publication Data
US 2015/0326601 A1 Nov. 12, 2015

Related U.S. Application Data

(60) Provisional application No. 61/991,477, filed on May 10, 2014, provisional application No. 62/144,327, (Continued)

(51) Int. Cl.
*H04L 29/06* (2006.01)
*G06F 21/57* (2013.01)
(Continued)

(52) U.S. Cl.
CPC ...... *H04L 63/1433* (2013.01); *G06F 17/3053* (2013.01); *G06F 21/577* (2013.01); *G06F 21/6245* (2013.01); *G06Q 10/0635* (2013.01)

(58) Field of Classification Search
CPC ............. H04L 63/1433; G06F 17/3053; G06F 21/577; G06F 21/6245; G06Q 10/0635
See application file for complete search history.

(56) References Cited

U.S. PATENT DOCUMENTS

| 7,536,724 B1* | 5/2009 | Sobel | H04L 63/1433 726/25 |
| 2008/0229421 A1* | 9/2008 | Hudis | H04L 63/1433 726/25 |

(Continued)

OTHER PUBLICATIONS

Cooley, A., "InfoSphere Guradium," IBM DeveloperWorks,' Jul. 30, 2010, 5 pages, [Online] [Retrieved on Sep. 11, 2015] Retrieved from the Internet<URL:http://www.ibm.com/developerworks/data/library/dmmag/DMMag_2010_Issue3/FeatureGuardium/>.

(Continued)

*Primary Examiner* — Yonas Bayou
(74) *Attorney, Agent, or Firm* — Amardeep S. Grewal; Reed Smith LLP

(57) ABSTRACT

A data management service identifies sensitive data stored on enterprise databases according to record classification rules that classify a data record as having a sensitive data type if the data record includes fields matching at least one of the record classification rules. Methods and systems rely on a set of impact factors each having a set of set of value bands representing a range for the impact factor and a corresponding value (between 0 and 1). The factors, ranges, and values all are customizable for an organization. Impact scoring calculations take into account each of the impact factors, and each is weighted to represent a specific risk perception or assessment type. A similar impact scoring is applied to data quality using volume of data as a key attribute of the quality.

21 Claims, 43 Drawing Sheets

Related U.S. Application Data filed on Apr. 7, 2015, provisional application No. 62/144,330, filed on Apr. 8, 2015.

(51) Int. Cl.
*G06F 17/30* (2006.01)
*G06F 21/62* (2013.01)
*G06Q 10/06* (2012.01)

(56) References Cited

U.S. PATENT DOCUMENTS

| | | | |
|---|---|---|---|
| 2008/0229422 A1* | 9/2008 | Hudis | G06F 21/552 726/25 |
| 2008/0244742 A1* | 10/2008 | Neystadt | H04L 63/308 726/23 |
| 2009/0049553 A1* | 2/2009 | Vasudeva | G06F 21/577 726/25 |
| 2009/0217381 A1* | 8/2009 | Helman | G06F 21/552 726/25 |
| 2009/0328222 A1* | 12/2009 | Helman | G06F 21/554 726/25 |
| 2010/0058432 A1* | 3/2010 | Neystadt | G06F 21/57 726/1 |
| 2010/0241595 A1 | 9/2010 | Felsher | |
| 2010/0275263 A1* | 10/2010 | Bennett | G06F 21/577 726/25 |
| 2013/0091574 A1* | 4/2013 | Howes | G06Q 10/10 726/24 |
| 2013/0219493 A1* | 8/2013 | Banzhof | H04L 63/1433 726/22 |
| 2013/0227695 A1* | 8/2013 | Shankar | G06F 21/577 726/25 |
| 2013/0253979 A1 | 9/2013 | Williams et al. | |

OTHER PUBLICATIONS

European Extended Search Report, European Application No. 15167178.1, Sep. 24, 2015, 9 pages.

European Extended Search Report, European Application No. 15167217.7, Oct. 16, 2015, 10 pages.

Anonymous, "2013 Cost of Data Breach Study: Global Analysis," Ponemon Institute, May 28, 2013, pp. 1-22, [Online] [Retrieved on Oct. 4, 2015] Retrieved from the Internet<URL:http://www.ponemon.org/local/upload/file/2013 Report Global CODB Final 5-2.pdf>.

Anonymous, "Managing Risk to Sensitive Data with SecureSphere," Imperva.com, Sep. 30, 2012, 9 pages, [Online] [Retrieved on Sep. 11, 2015] Retrieved from the Internet<URL:http://www.imperva.com/docs/wp_managing-risk-to-sensitive-data-with-securesphere.pdf>.

Ghani, H.. et al., "Quantitative Assessment of Software Vulnerabilities Based on Economic-Driven Security Metrics," 2013 International Conference on Risks and Security of Internet and Systems (CRISIS), IEEE, Oct. 23, 2013, 8 pages.

Mogull, R., "Understanding and Selecting a Database Activity Monitoring Solution," Arhive.org, May 1, 2013, 24 pages, [Online] [Retrieved on Sep. 11, 2015] Retrieved from the Internet<URL:https://web.artive.org/web/20130501221003/https://securosis.com/asset s/library/reports/DAM-Whitepaper-final.pdf>.

Scarfone, K. et al., "The Common Configuration Scoring System (CCSS): Metrics for Software Security Configuration Vulnerabilities," NIST Interagency Report 7502, Dec. 31, 2010, 42 pages, [Online] [Retrieved on Oct. 7, 2015] Retrieved from the Internet<URL:http://csrc.nist.gov/publications/nistir/ir7502/nistir-7502_CCSS.pdf>.

Stoneburner, G. et al., "Risk Management Guide for Information Technology Systems," NIST Special Publication 800-30, Computer Security Division Information Technology Laboratory National Institute of Standards and Technology, US, No. 800-30, Jul. 1, 2002, pp. 1-55.

* cited by examiner

FIG. 5

View the Data Store details and click edit to modify Data Stores.

Connection Properties

| | |
|---|---|
| Name: | Finance |
| Description: | |
| Repository type: | PowerCenter Repository |
| Data Store Type | Oracle 11g |
| Host Name: | invbx61iin40 |
| Port: | 1521 |
| Service Name: | ora11ginformatica.com |
| Sid: | |
| Connection String: | INFA_CRA11g |
| Username: | PCRS169_Ora |
| Password: | ***** |
| Secure JDBC Parameters: | |
| Domain Name: | Domain_invr281m169 |
| PowerCenter Integration Service Name: | PCIS |
| PowerCenter Repository Service Name: | PCRS |
| PowerCenter Username: | Administrator |
| PowerCenter Password: | ***** |
| PowerCenter Folder Name: | |
| Node Host: | invr281m169 |
| Node Port: | 6005 |
| Site Key Location: | |
| Last Modified By: | Administrator |
| Last Modified On: | |

Additional Properties

| | |
|---|---|
| Merged Data Stores: | |
| Data Owner: | Admin |
| Location: | NA |
| Application Group: | Default |
| Security Group(s): | Everyone |
| Department: | transport |

FIG. 8A

New Data Store

Specify data store type and specify details:

Connection Properties

| | |
|---|---|
| Name: | New Data Store |
| Description: | |
| Repository Type: | ◉ |
| Data Store Type: | ◉ |

Additional Properties

| | |
|---|---|
| Data Owner: | |
| Location: | ◉ |
| Application Group: | ◉ |
| Security Group(s): | 0 Groups Selected ◉ |
| Department: | |

FIG. 8B

New Data Domain

Specify details for new data domain creation

Name: [ New Data Domain ]

Description: [ ]

| Meta Data Match | Data Match |

Select any meta data matching options and specify details.

◉ Pattern
○ Reference Table
○ Rule

[ ]  ⊗  ⊕   E.g.: 111-111-1111 or 123.1111.111, etc.

FIG. 10B

New Data Domain

Specify details for new data domain creation.

Name: [New Data Domain]

Description: [          ]

| Meta Data Match | Data Match |

Select any data matching options and specify details.

◉ Pattern
○ Reference Table
○ Rule

[                    ] ⊗  ⊕

E.g.: 111-111-1111 or 123.1111.111, etc

Conformance Score:

Reject          Validate         Auto Accept 0            46    54              100

FIG. 10C

Policies

5 Policies     New

| Name | Domains | Data Stores | Scans |
|---|---|---|---|
| Custom<br>Last updated on 2/28/2015, 8:24:49 PM by Administrator | 0 | 1 | 1 |
| PCI<br>Last updated on 2/28/2015, 8:24:16 PM by Administrator | 5 | 7 | 5 |
| PHI<br>Last updated on 2/28/2015, 8:24:35 PM by Administrator | 14 | 28 | 0 |
| PII<br>Last updated on 2/28/2015, 8:24:43 by Administrator | 18 | 3 | 4 |
| Rohit Policy<br>PCI<br>Last updated on 2/28/2015, 8:24:56 PM by Administrator | 0 | 4 | 1 |

FIG. 11A

New Policy

1 Specify Properties and Assign domains ——— 2 Data Domain Match

Specify properties for the policy

Name: New Policy

Description:

Cost Per Row($): 100

Severity:

Select domains for this policy

0 Domains Selected

27 Assign Domains

| | Name | Domain Group | Description |
|---|---|---|---|
| ☐ | AccountNumber | PCI,PHI,Account_Bank | validates if the input matches account number. |
| ☐ | Age | PII | validates if the input matches age format. |
| ☐ | BirthDay | PII | Validates if the input matches birth day. |
| ☐ | BirthPlace | PII | Validates if the input matches birth place. |
| ☐ | CertificateLicenceNumber | PHI | Validates if the input matches certificate licence number. |
| ☐ | CompanyName | PHI,contact | Validates if the input matches US company name. |
| ☐ | Country | PII,Address | Validates if the input matches country name. |
| ☐ | CreditCardNumber | PCI,PII,Account_Bank | Validates if the input matches credit card number. |
| ☐ | DeviceSerialNumber | PHI | Validates if the input matches device serial number. |
| ☐ | DrivingLicenceNumber | PHI | Validates if the input matches driving licence number. |
| ☐ | Email | PHI,contact | Validates if the input matches Email format. |
| ☐ | ExpirationDate | PCI | Validates if input matches expiration date. |

FIG. 11B

New Policy

① ——— ②

Specify Properties          Data Domain Match
and Assign Domains

Select the data domain match options:

○ Match Any
○ Match All
◉ Custom

Specify one or more data match conditions.

Data Match Condition 1

Data Domain is [ AccountNumber ▽ ]   [ + ]   [ X ]

FIG. 11C

Scans

18 Scans

18 Scans
11 Failed

| Name | Data Stores | Policies | Domains | Scan Status |
|---|---|---|---|---|
| Financials_Scan<br>Last updated on 1/5/2015, 7:12:41 PM by Administrator | 1 | 1 | 0/18 | Completed |
| HealthCare_scam<br>Last updated on 1/5/2015, 7:25:47 PM by Administrator | 1 | 1 | 0/8 | Completed |
| Marketing_scan<br>Last updated on 1/5/2015, 7:02:22 PM by Administrator | 1 | 1 | 0/5 | Completed |
| Now Scan<br>Last updated on 1/7/2015, 4:58:57 AM by Administrator | 4 | 1 | 0/0 | Failed |
| Sales<br>Last updated on 1/5/2015, 12:13:02 PM by Administrator | 1 | 1 | 0/14 | Completed |
| Sales DB scan<br>Last updated on 1/5/2015, 2:34:13 PM by Administrator | 1 | 1 | 0/14 | Failed |
| Sales DB scan2<br>Last updated on 1/5/2015, 2:01:40 PM by Administrator | 1 | 1 | 0/14 | Failed |
| Sales scan 107<br>Last updated on 1/5/2015, 4:58:18 PM by Administrator | 1 | 1 | 0/14 | Failed |
| Sales_DS_scan<br>Last updated on 1/5/2015, 12:58:09 PM by Administrator | 28 | 1 | 0/14 | Failed |
| Sales_DS_scan1<br>Last updated on 1/5/2015, 1:20:19 PM by Administrator | 28 | 1 | 0/14 | Failed |
| TransportPCRSScan<br>Last updated on 1/29/2015, 1:37:05 PM by Administrator | 1 | 1 | 0/18 | Completed |

New

FIG. 12A

Edit Financials_Scan

① Define & Connect — ② Assign Policy — ③ Schedule

Select Data Store Type and Specify scan options.

Name: Financials_Scan

Description:

Repository Type: PowerCenter Repository

Data Stores:

Scan Options: ☑ Include Data Stores and catalog information
☑ Proliferation

FIG. 12B

Edit Financials_Scan

① — ② — ③
Define & Connect — Assign Policy — Schedule

Select policies for this scan.

| | Name | Description | Domains |
|---|---|---|---|
| ☐ | Custom | undefined | 8 |
| ☐ | PCI | undefined | 6 |
| ☐ | PHI | undefined | 14 |
| ☒ | PII | undefined | 18 |
| ☐ | Rohit Policy | PCI | 0 |

1 Policies Selected

5 Assign Policies

FIG. 12C

Edit Financials_Scan

① Define & Connect —— ② Assign Policy —— ③ Schedule

○ Run Now
◉ Schedule Scan

Start Date: 03/17/2015
Start Time: 11:17 AM

☐ Recurrences

FIG. 12D

Alert Rules

6 Alert Rules

| Name | Alert Conditions | Severity | Email Notification | Schedule |
|---|---|---|---|---|
| AlertRule1 Last updated on 1/6/2015,5:47:57 PM by Administrator | 1 | High | No | Run Now |
| AlertRule2 Last updated on 1/6/2015,6:56:06 PM by Administrator | 1 | Medium | No | Run Now |
| AlertRule3 Last updated on 1/6/2015,7:11:40 PM by Administrator | 1 | Low | No | Yearly |
| AlertRule4 Description Last updated on 1/5/2015,8:31:39 PM by Administrator | 1 | High | No | Weekly |
| Now Alert Rule Last updated on 2/11/2015,2:08:12 PM by Administrator | 1 | Informational | No | Run Now |
| New AlertReleased Last updated on 3/12/2015,4:14:18 PM by Administrator | 1 | High | Yes | Weekly |

FIG. 13A

New Alert Rule

1 Define ──── 2 Notify

Specify details for new alert creation.

Name: [New Alert Rule]

Description: [ ]

Severity: [High]

Specify alert conditions:

| Alert Condition | Operator | Value |
|---|---|---|
| [Country ▽] | [Equals to ▽] | [Vatican City ▽] ⊗ |

Country
Location
Data Store
Policy
Protection Status
Risk Cost
Risk Store
Sensitive Records
Severity
Target Country
Target Location

Alert Properties

Alert Id: 25
Rule Name: Test High Risk
Description:
Date: 3/17/2015, 11:24:28 AM
Severity: High 1 Alert Conditions

| | |
|---|---|
| Risk Score | Greater than 5 |

117 Data Stores matching Alert Rule.

| Data Stores | Risk Score | Protection Status | Sensitive Records | Severity | Data Value | Owner |
|---|---|---|---|---|---|---|
| Sales/DB2114 | 50 | 0% | 0 | Restricted | 0 | Admin |
| Sales/ORACLE107 | 50 | 0% | 0 | Restricted | 0 | Admin |
| Sales/DB2113 | 50 | 0% | 0 | Restricted | 0 | Admin |
| Sales/MSSQL100 | 50 | 0% | 0 | Restricted | 0 | Admin |
| Sales/OraL2 | 50 | 0% | 0 | Restricted | 0 | Admin |
| Sales/DB2111 | 50 | 0% | 1000 | Restricted | 0 | Admin |
| Sales/DB2173 | 50 | 0% | 0 | Restricted | 0 | Admin |
| Sales/Db2174 | 50 | 0% | 0 | Restricted | 0 | Admin |
| Sales/Oracle40 | 50 | 0% | 0 | Restricted | 0 | Admin |
| Sales/SQLL1 | 50 | 0% | 0 | Restricted | 0 | Admin |
| Sales/SQLL3 | 50 | 0% | 0 | Restricted | 0 | Admin |
| Sales/MSSQL03 | 50 | 0% | 0 | Restricted | 0 | Admin |

FIG. 13D

ASSESSMENT TYPE-VARIABLE ENTERPRISE SECURITY IMPACT ANALYSIS

CROSS-REFERENCE TO RELATED APPLICATIONS

This application claims the benefit of U.S. Provisional Application No. 62/144,330, filed Apr. 8, 2015, U.S. Provisional Application No. 61/991,477, filed May 10, 2014, and U.S. Provisional Application No. 62/144,327, filed Apr. 7, 2015, all of which are incorporated by reference in their entirety. This application is also related to U.S. application Ser. No. 14/705,718, filed on May 6, 2015, entitled "IDENTIFYING AND SECURING SENSITIVE DATA AT ITS SOURCE" the contents of which are also incorporated by reference in its entirety.

BACKGROUND

Technical Field

The subject matter described herein relates to visualizing data to facilitate identification and protection of sensitive data.

Description of Related Art

Modern day computer networks store numerous types of data, including sensitive data. Sensitive data contains information that could cause harm to individuals and businesses if compromised. Example types of sensitive data include health care records, financial data, and personal identification information. Because the consequences of exposing sensitive data are severe, network administrators apply one or more protection policies to the sensitive data as an additional layer of security beyond a database's standard protections.

Identifying sensitive data may be a challenge for a number of reasons. Within a computer network, databases store countless data records, which are incessantly modified, added, and deleted. To ensure that the locations of sensitive data are known, frequent scans may be used. However, frequent scans are not practical if the scans are computationally intensive, as a scan of each individual database record would be. Accordingly, computationally intensive scans the frequency of scans and the accuracy of the network administrator's sensitive data knowledge. Additionally, not all sensitive data records are of equal importance. A network administrator may not have time to examine every database in a network. When examining databases without prioritization, a network administrator may miss critical databases that present a high overall level of risk.

Furthermore, multiple databases may access sensitive data records. Protecting all copies of a data record may not be practical if the network administrator cannot directly apply protection policies to a database. For example, an external database controlled by another entity accesses a database containing sensitive data, to the network administrator cannot instruct the external database to apply the protection policy.

A "risk" score is a metric commonly used in the security industry to define the risk associated with a component of a data set and to identity the level of vulnerability and impact. The risk score is typically expressed as a value between 0 and 1, with 1 being the highest risk score. The typical risk score is calculated based on different risk factors. Those risk factors could be, by example, the number of sensitive fields or level of data protection for the data set.

When a risk score is computed on a group of risk factors, each risk factor typically contributes to the risk score based on a weight, where the weight given to each factor is based on a particular perspective of the importance of that factor. Thus, a given risk score represents a specific perception of the importance of the risk factors. However, the importance of each factor is not the same for all the different stakeholders. Thus, the risk evaluation using a risk score is may not adequately express actual risk, since it is based on a single perspective of an operational concern for the entity setting the risk factor weights. It would thus be beneficial if risk were scored such that it represented multiple risk assessment types, multiple policies like PCI or PII, or a risk perception amalgam across multiple assessment types. An assessment type represents are particular framework or operational concern for evaluating a security threat. For example, in an enterprise the various assessment types can include liability, reputation, business interruption, compliance, and customer loss.

Similarly, data quality scoring presents the same type of assessment type variations and challenges, e.g., the data quality associated with trend analytics as opposed to the data quality for fraud detection; each one has a different data quality focus.

SUMMARY

As described herein, a method of producing a risk/impact score supports multiple assessment types, both individually or as an amalgam across all assessment types; supports an unlimited number of risk/impact factors and policies of the underlying data; support risk/impact calculations at the data element or object level, but also calculation at the full data set or subset level; support easy identification of how each risk/impact element contributes to the overall risk; and supports a remedial "what if" analysis that considers the impact if a particular risk/impact factor is eliminated.

The same concept applies to data quality, where different data quality assessment types could also be defined to reflect the different use case and respective data quality interests, such as accuracy, completeness, relevance, consistence, and reliability. The same type of calculation could also be applied, using weights according to the data quality assessment type at issue.

The methods described herein rely on a set of impact factors each having a set of set of value bands representing a range for the impact factor and a corresponding value (between 0 and 1). The factors, ranges, and values all are customizable for an organization. In the example detailed herein, two impact factor types are used: four "risk factors" and two "impression metrics," however, any numbers of each type could be used in other examples.

The impact scoring calculations used herein take into account each of the impact factors, and each is weighted to represent a specific risk perception or assessment type. Various assessment types can be used, and thus each assessment type (perspective) has a set of assessment type weights (one for each factor). The assessment type weights also are customizable for an organization.

A similar impact scoring can be applied to data quality, as the volume of data, e.g., is a key attribute of the quality.

A data management service identifies sensitive data stored on enterprise databases according to record classification rules that classify a data record as having a sensitive data type if the data record includes fields matching at least one of the record classification rules. Using the sensitive data types, administrators may target sensitive data with a protection policy appropriate for the sensitive data type.

The data management service determines assessment scores for enterprise databases according to sensitive data records and protection policies on the enterprise databases. Example assessment scores for enterprise databases indicate a proportion of sensitive records that are unprotected, a cost or value of the sensitive data, and an aggregate measurement of risk. Using the assessment scores, an administrator may determine which enterprise databases to target for protection.

The data management service provides an interface that groups enterprise databases having common attributes and indicates aggregated assessment scores for the groups of enterprise databases. Through the interface with the grouped enterprise databases, an administrator may identify trends in database protection and target protection policies to multiple databases. When applying a protection policy, the data management service applies the protection policy to a source database from which dependent enterprise databases access the sensitive database. Once data records are protected at the source database, the secured data proliferates to the dependent databases. By securing enterprise data at the source, the data management service beneficially reduces processing compared to applying a protection policy at the dependent databases.

The disclosed embodiments include a computer-implemented method (e.g., comprising steps performed by one or more processors) for discovering and protecting sensitive data within an enterprise, a non-transitory computer-readable medium comprising instructions executable by a processor to perform the steps for discovering and protecting sensitive data within an enterprise, and a system including one or more processors and the non-transitory computer-readable medium for discovering and protecting sensitive data within an enterprise. The steps include obtaining database descriptions of enterprise databases, each database description indicating a database attribute of the corresponding database; obtaining a record classification rule for a sensitive data type, the record classification rule specifying at least one field type; identifying sensitive data records of the sensitive data type by identifying data records having the at least one field type specified by the record classification rule; determining assessment scores for the enterprise databases, an assessment score determined from a number of identified sensitive data records in the corresponding database; generating status indicators for groups of enterprise databases each having a common database attribute, a status indicator for an enterprise group reflecting a total number of identified sensitive data records in enterprise databases having membership in the enterprise group; providing an interface comprising the generated status indicators; receiving via the user interface a selection of one of the generated status indicators and a selection of a protection policy; and applying the selected protection policy to sensitive data records of an enterprise database having membership in the enterprise group corresponding to the selected status indicator.

The features and advantages described in this summary and the following description are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the accompanying figures. A brief introduction of the figures is below.

FIG. 5 shows aspects of a risk score and associated data flow between them according to one embodiment.

FIG. 8A is an example interface illustrating properties of an enterprise database, in accordance with an embodiment.

FIG. 8B is an example interface for obtaining attributes of an enterprise database, in accordance with an embodiment.

FIG. 10B is an example interface for configuring a field classification rule, in accordance with an embodiment.

FIG. 10C is an example interface for configuring a field classification rule, in accordance with an embodiment.

FIG. 11A is an example interface illustrating example record classification rules, in accordance with an embodiment.

FIG. 11B is an example interface for configuring a record classification rule, in accordance with an embodiment.

FIG. 11C is an example interface for configuring a record classification rule, in accordance with an embodiment.

FIG. 12A is an example interface illustrating example data scans, in accordance with an embodiment.

FIG. 12B is an example interface for configuring a data scan, in accordance with an embodiment.

FIG. 12C is an example interface for configuring a data scan, in accordance with an embodiment.

FIG. 12D is an example interface for configuring a data scan, in accordance with an embodiment.

FIG. 13A is an example interface illustrating example alert rules, in accordance with an embodiment.

FIG. 13B is an example interface for configuring an alert rule, in accordance with an embodiment.

FIG. 13D is an example interface illustrating alerts generated by alert rules, in accordance with an embodiment.

DETAILED DESCRIPTION

The figures and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

System Architecture

Figure 1A:
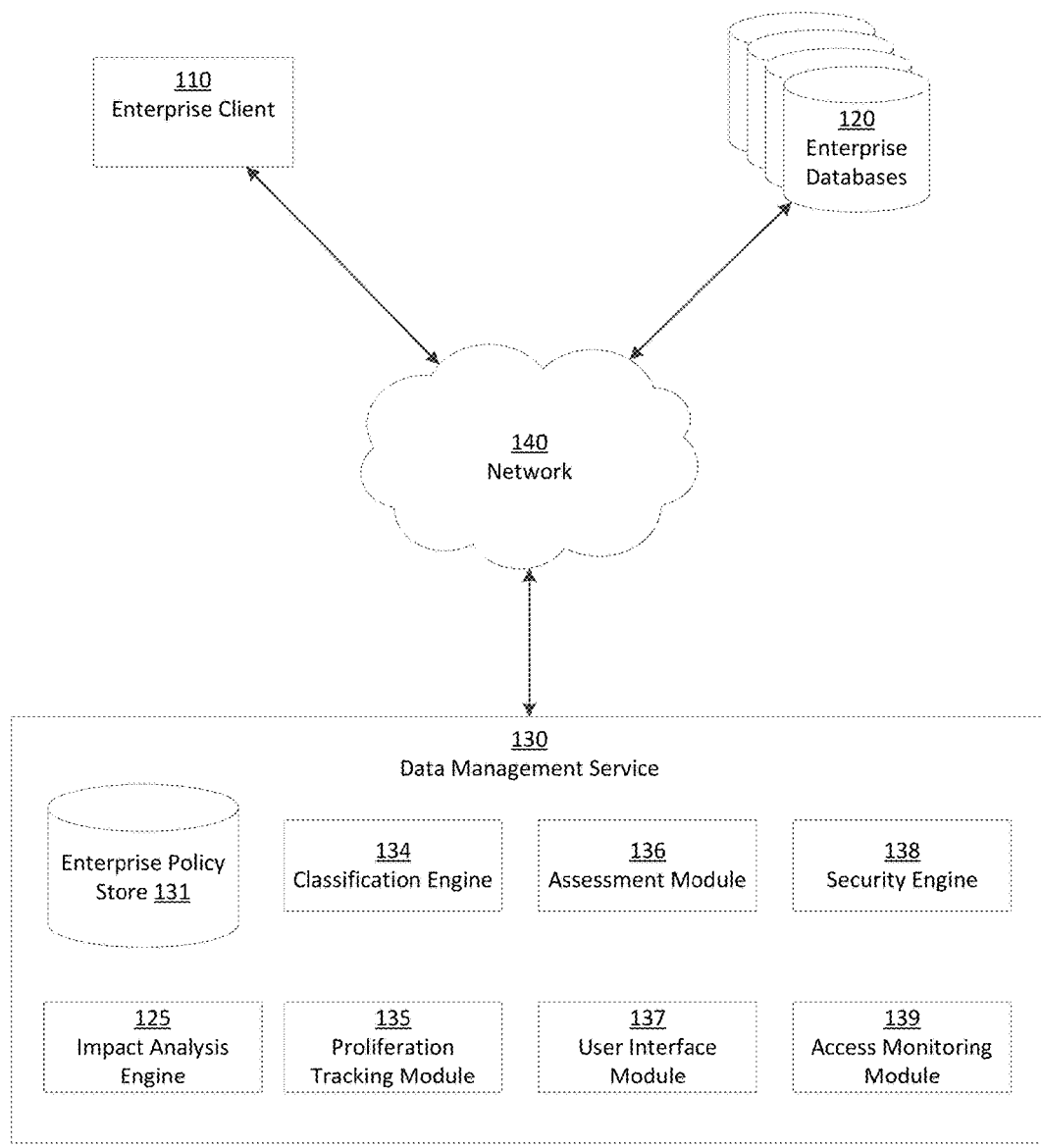
FIG. 1A is a block diagram of a networked computing environment for securing data, in accordance with an embodiment.

FIG. 1 is a block diagram of a networked computing environment for securing data, in accordance with an embodiment. The entities of the networked environment include an enterprise client 110, enterprise databases 120, an impact analysis engine 125, a data management service 130, and a network 140. Although single instances of the enterprise client 110, data management service 130, and network 140 are illustrated, multiple instances may be present. For example, multiple enterprise clients 110 may administer the enterprise databases 120 through the data management service 130. The functionalities of the entities may be distributed among multiple instances. For example, the data management service 130 is provided by a cloud computing service with multiple servers at geographically dispersed locations implementing data management service 130.

An enterprise client 110 refers to a computing device that accesses the data management service 130 through the network 140. By accessing the data management service 130, the enterprise client 110 may monitor the enterprise databases 120 and configure enterprise policies controlling data access and securing data through protection policies such as encryption and masking Example enterprise policies are described with respect to the enterprise policy store 131.

Example enterprise clients 110 include a desktop computer, a laptop, a tablet, a mobile device, a smart television, a wearable device, or any other computer. The enterprise client 110 may contain software such as a data management application provided by the data management service 130 and native to the enterprise client's operating system or a web browser to access a web data management application provided by the data management server 130. Through these data management applications, an authorized user (also referred to as an administrator) may view the status of enterprise databases 120 and configure (e.g., add, modify, remove) enterprise policies. The enterprise client 110 may include a display device (e.g., a screen, a projector) to present the data management application and an input device (e.g., a touchscreen, a mouse, a keyboard, a touchpad) to enable interaction between the administrator and the data management application.

Enterprise databases 120 store data of the enterprise. Enterprise databases 120 may be stored on servers owned by the enterprise or a third party. For example, a cloud service provider provides an enterprise database 120 using multiple servers at multiple datacenters. Through an enterprise client 110, an administrator provides the data management service 130 with credentials to access an enterprise database 120. An enterprise database 120 includes one or more data tables comprised of data records. A data record has one or more fields.

Figure 1B:
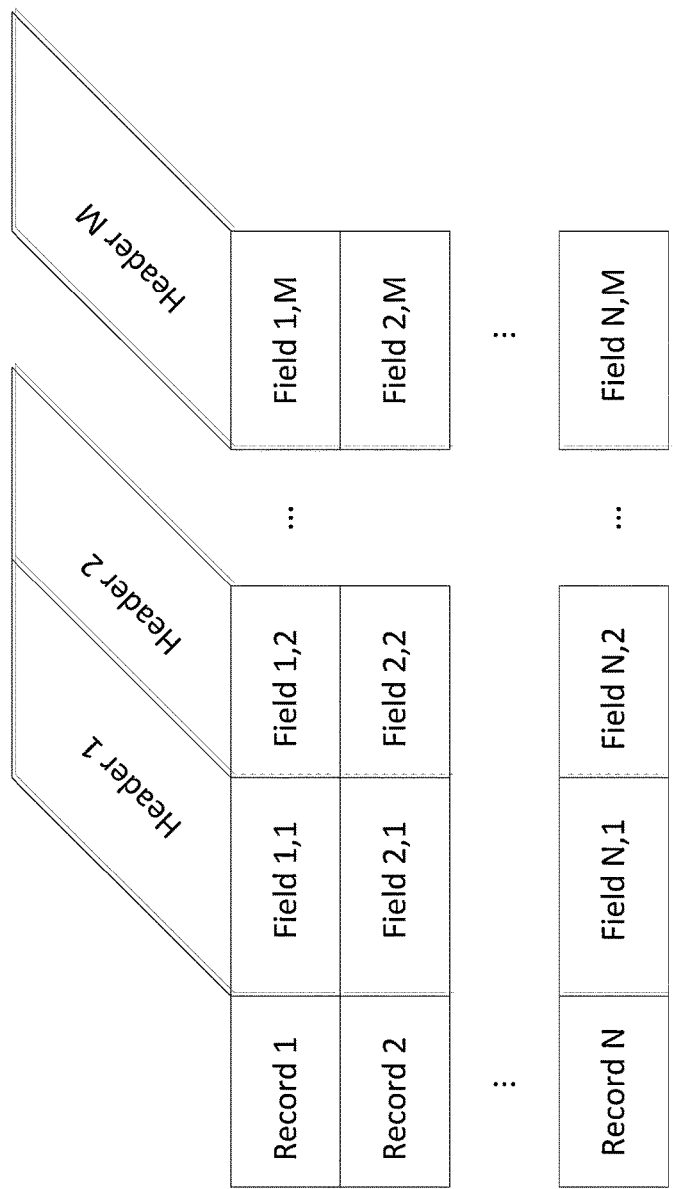
FIG. 1B is a conceptual diagram of an example table within an enterprise database, in accordance with an embodiment.

Turning to FIG. 1B, illustrated is a conceptual diagram of an example table within an enterprise database 120, in accordance with an embodiment. Each of the N records has M fields. A field stores data, including numerical data, textual data, image data, audio data, video data, or a combination thereof. A field typically stores data encoded (e.g., using an ASCII integer) into a low-level data format (e.g., binary) having a direct correspondence to a physical state of hardware in the database. For example, a binary value corresponds to the presence or absence of electrical charge stored in a node of a memory device (e.g., dynamic random access memory, a flash memory, a disk drive). The fields under a header have a common semantic interpretation, which is described by metadata of the corresponding header. In the illustrated embodiment, the table is a two-dimensional array, the records and headers are indexed, and a field may be accessed by indicating the indices of the corresponding record and header. However, other database may be implemented with different structures such as a hash table or tree. The organization of data in the software description of a table may differ from the physical organization of the data stored on hardware.

Turning back to FIG. 1A, an impact analysis engine 125 may be provided by a cloud computing service with multiple servers at geographically dispersed locations, according to some embodiments, and may in included in the data management service 130 in some instances. The impact analysis engine 125 may include an impact UI module 121, a data set retrieval module 122, an impact factor module 123, an assessment type weight module 124, an element impact module 126, a data element impact score module 127, an aggregated impact score module 128, an amalgam impact score module 129, and a contribution factors score module 132. The functionality of the impact analysis engine 125 may be provided by additional, different, or fewer modules than those described herein. The impact analysis engine 125 is discussed in greater detail in conjunction with FIG. 2D.

Turning back to FIG. 1A, the network 140 enables communications among the entities connected thereto through one or more local-area networks and/or wide-area networks. The network 140 (e.g., the Internet) may use standard and/or custom wired and/or wireless communications technologies and/or protocols. The data exchanged over the network 140 can be encrypted or unencrypted. The network 140 may include multiple sub-networks to connect the enterprise client 110, enterprise databases 120, and the data management service 130.

The data management service 130 monitors and manages data on the enterprise databases 120. The data management service 130 may identify and classify sensitive data records, provide an interface illustrating sensitivity of enterprise databases 120, and apply protection policies to data records on enterprise databases 120. The data management service 130 includes an enterprise policy store 131, a classification engine 134, a proliferation tracking module 135, an assessment module 136, a user interface module 137, a security engine 138, and an access monitoring module 139. The functionality of the illustrated components may be distributed (in whole or in part) among a different configuration of modules. Some described functionality may be optional; for example, in one embodiment the data management service 130 does not include an access monitoring module 139.

The enterprise policy store 131 stores enterprise policies configured by an administrator through the enterprise client 110. Enterprise policies include database attributes, location attributes, field classification rules, record classification rules, scan settings, alert rules, and protection policies.

Database attributes describe an enterprise database 120. Example database attributes include a name, access credentials, a location of the database, and one or more enterprise groups associated with the enterprise database 120. An enterprise group is an enterprise department, division, subdivision, role, application group, or other subdivision within the enterprise's organizational structure or software architecture. Database attributes are described in further detail with respect to FIGS. 4A through 4C.

Location attributes describe the location of a database, and may include several levels of specificity (e.g., continent, region, country, state, province, city). Location attributes are described in further detail with respect to FIG. 9A.

Field classification rules are used to determine header types (also referred to as the data domain or field type) associated with fields in a column of data table in an enterprise database 120. Example header types include credit card number, birthdate, and social security information. Data of the same field type have the same semantic meaning but may have different formatting. For example, fields containing the data "(111) 111-1111" and "222.222.2222" both describe telephone numbers (a field type) in spite of having different formatting. Field classification rules are described in further detail with respect to FIGS. 6A through 6C.

Record classification rules are used to classify data records in a data table as having a sensitive data type. Data with the same sensitive data type may be covered by a similar set of industry standards and/or government regulations. Example sensitive data types include PCI (payment card industry) data, PHI (protected health information), PII (personally identifiable information), and HCM (human capital management) data. A sensitive data type may be associated with a data cost (e.g., monetary value per data record) and a severity band (e.g., public, internal, confidential, restricted). The data cost and severity band may be used to identify relative importance of sensitive data to an enterprise. In particular, the user interface module 137 may use the data cost and severity band to suggest enterprise databases 120 for protection. Record classification rules are described in further detail with respect to FIGS. 7A through 7D.

Scan settings define scans used to identify data as having a sensitive data type. An example scan identifies data of one or more selected sensitive data types on one or more selected enterprise databases 120. Scan settings are described in further detail with respect to FIGS. 8A through 8D.

Alert rules are used to identify enterprise databases 120 to be evaluated by an administrator or to identify suspicious activity on an enterprise database 120. Alert rules may be based on assessment scores, data protection status, or database access volume, for instance. An example alert identifies unprotected data having an assessment score (e.g., cost score, risk score) exceeding an assessment score threshold. Alert rules are described in further detail with respect to FIGS. 9A through 9C.

A protection policy indicates one or more protection actions applied to one or more data fields. A protection policy may apply to an entire enterprise database 120, data records in a particular data table, all fields of particular data records, or to particular fields in particular data records. Besides specifying the data protected by the protection policy, the protection policy describes protection actions (e.g., encryption, data masking, access blocking) and parameters for the protection action (e.g., an encryption key, a data masking schema, an authorized access list). Protection policies are described in further detail with respect to the security engine 138.

The classification engine 134 classifies data records into sensitive data types (or verifies that the data is not sensitive). To do so, the classification engine 134 takes as input headers of a data record and outputs one or more sensitive data types matching the headers of the data record as defined by a record classification rule. The classification engine 134 may also identify header types of a data table's fields using the header labels or by comparing the format of data in the fields to a pattern associated with the header type. The classification engine 134 is described in further detail with respect to FIG. 2A.

The proliferation tracking module 135 monitors data access and use by enterprise databases 120 to determine dependency relationships between the enterprise databases 120. The proliferation tracking module 135 identifies source databases and dependent databases retrieving data from the source databases according to the data access and use. In particular, if an enterprise database 120 consistently accesses another enterprise database 120 for a set of data records, then the accessing database is a dependent database. If an enterprise database 120 is accessed by other enterprise databases 120 for the data but does not in turn access other enterprise databases 120 to obtain the data records, then the enterprise database 120 is a source database. The proliferation tracking module 135 may discriminate between source and dependent databases based in part on relative volume of access traffic. For example, a dependent database may send updated data records or additional data records to a source database for merging, but the dependent database retrieves significantly more data records from the source database than the dependent database provides to the source database.

Some dependent databases access data records from another dependent database. A database that accesses a data record from the source database is referred to as a first-layer dependent database. A database accessing an nth-layer dependent database is an (n+1)th-layer dependent database. The proliferation tracking module 135 divides the enterprise databases 120 into layers of databases (where the source database is the zeroth layer) according to dependencies between databases. The proliferation tracking module 135 identifies an outer-layer dependent database as a database predominantly accessing data records from a database in a next inner layer. Database dependencies are illustrated in FIGS. 18A through 18D.

The assessment module 136 determines an assessment score for an enterprise database 120 according to a number of sensitive data records in the enterprise database 120 or a number of unprotected sensitive data records in the enterprise database 120. Unprotected sensitive data records refer to data records to which a protection policy has not been applied (e.g., by the security module 138). Protected sensitive data records refer to data records to which a protection policy has been applied. The assessment module may determine a proportion of unprotected sensitive data records, a risk score, or a cost score. The assessment module 136 is described in further detail with respect to FIG. 2B.

The user interface (UI) module 137 generates a graphical user interface that a user interacts with through software and input devices on the enterprise client 110. The user interface is provided to the enterprise client 110 through communication with the software of the enterprise client 110. Through the user interface, the user adds and modifies enterprise policies, views status indicators of enterprise databases 120, and applies protection policies to enterprise databases 120. The UI module 137 is described further with respect to FIG. 2C.

The security engine 138 obtains a selected enterprise database 120 and a selected protection policy and applies the selected protection policy the enterprise database 120. Example protection policies include encryption, masking, dynamic masking, blocking, and tokenization. Encryption refers to applying a cipher to data to render the data meaningless without reversing the encryption. Masking refers to performing obfuscation operations on data to render the data apparently inaccurate or meaningless. However, processes having a legitimate use for the masked data include logic to reverse the masking when manipulating the masked data. Dynamic masking refers to selectively masking data depending on the accessing user, device, or process. Blocking refers to denying access to a particular user, device, or process (a blacklist approach) or denying access to any user, device, or process that is not specifically authorized (a whitelist approach). Tokenization refers to replacing sensitive data with a reference to the actual sensitive values (e.g., at a source database). The security engine 138 may apply the protection policy to all fields of a data table, to fields in sensitive data records, to fields having a sensitive header type, or to fields having a sensitive header type within sensitive data records.

In one embodiment, the security engine 138 applies the protection policy by identifying an enterprise database 120 storing the data targeted by the protection policy. The security engine 138 then instructs propriety software (e.g., provided by the data management service 130) installed on the enterprise database 120 to apply the protection policy. Alternatively or additionally, the data management service 130 instructs native software on the enterprise database 120 to apply the protection policy. The security engine 138 does not necessarily apply the protection policy to all enterprise databases 120 having copies of the targeted data records. For example, the security engine 138 obtains the source database of the targeted data records (from the proliferation tracking module 135) and applies the protection policy to the source database.

In one embodiment, the security engine 138 automatically (e.g., according to rules) selects protection policies to apply to data according to properties of the data. For example, a sensitive data type is associated with a default protection policy that the security engine 138 applies in response to identifying the sensitive data type. As another example, the security engine 138 applies a default security policy (e.g., blocking) to unprotected sensitive data in response to determining that an assessment score of the data (e.g., risk score, cost score) equals or exceeds a score threshold. As a third example, the security engine 138 applies a default security policy (e.g., tokenization) to unprotected sensitive data in response to determining that the sensitive data has a particular sensitivity levels (e.g., confidential, restricted). The security engine 138 may apply default security policies in response to a command received from an enterprise client 110, in response to a data scan, or in response to an alert.

The monitoring module 139 obtains scan settings and scans enterprise databases 120 to identify sensitive data (or changes in sensitive data) having a sensitive data type indicated by the scan settings. The monitoring module 139 may run scan settings as prompted by a user or according to a schedule (e.g., one-time, routinely). Scan settings are described with respect to FIGS. 8A through 8D.

The monitoring module 139 obtains alert rules and scans enterprise databases 120 to determine whether the alert rule's conditions are met. If so, then the monitoring module 139 generates an alert. The monitoring module 139 scan for alerts periodically, in response to a change in an enterprise database 120, in response to a user request, or in response to availability of processing and bandwidth resources of the data management service 130. Alert rules are described in further detail with respect to FIGS. 9A through 9D.

Classification Engine

Figure 2A:
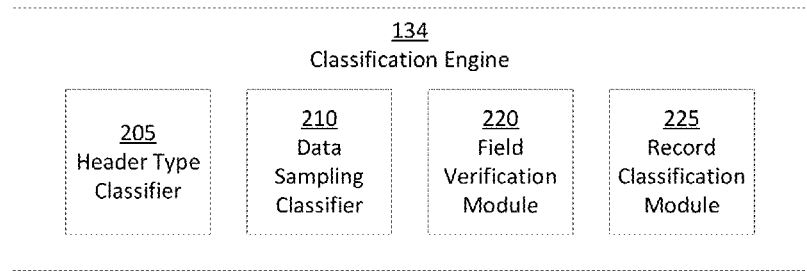
FIG. 2A is a block diagram of an example classification engine, in accordance with an embodiment

FIG. 2A is a block diagram of classification engine 134, in accordance with an embodiment. The classification engine 134 includes a header type classifier 205, a data sampling classifier 210, a field verification module 220, and a record classification module 225. The functionality of the classification engine 134 may be provided by additional, different, or fewer modules than those described herein.

The header type classifier 205 obtains a header associated with a field and determines whether the header has a field type according to a field classification rule. For example, the field classification rule includes one or more strings (e.g., "CreditCard", "Credit Card Number", "Card Number") for comparison with the header metadata. If a description of the header matches one of the strings, then the fields under the header match the field classification rule. As another example, the header includes metadata specifying a data format (e.g., four sets of four digits for a credit card number rule). If the header's data format matches a data pattern indicated by the field classification rule, then the fields under the header match the classification rule. The header type classifier 205 beneficially estimates a classification of data fields to beneficially reduce the computational cost of classifying fields under a header without sampling the fields.

The data sampling classifier 210 obtains field values under a header from one or more data records and determines whether the header has a field type according to a field classification rule. To obtain the field values, the data sampling classifier 210 samples the data table (e.g., first data records, last data records, random data records, uniformly spaced data records). The data sampling classifier 210 compares the sampled field values to the field classification rule and determines a number of field values meeting the classification rule. Based on the number of fields, the data sampling classifier 210 determines whether the header has the field type associated with the field classification rule.

The field classification rule may specify one or more sequences of character types (e.g., number, letter, punctuation), particular characters (e.g., dash, parenthesis). The specified sequence may include variable length portions (e.g., 3 to 4 numbers followed by 1 punctuation character, 1 to any number of letter characters). Field classification rules may also include preprocessing rules such as removal of punctuation or whitespace. Field classification rules may include cross-references to a dictionary (e.g., place names, address abbreviations, common surnames or forenames). For example, a field classification rule labels a field as a telephone number if the field includes two three-digit numbers followed by a four-digit number, where the numbers are delimited by punctuation or whitespace.

To determine whether the header has the field type associated with the field classification rule, the data sampling classifier 210 compares the number of sampled fields matching the field classification rule to one or more thresholds. In one embodiment, if the number of matching fields exceeds a verification threshold, then the data sampling classifier 210 determines that the header has the field type corresponding to the field classification rule. If the number of matching fields does not exceed the verification threshold but does exceed a rejection threshold, then the sampled data is submitted for further review through the field verification module 220. If the number of matching fields does not exceed the rejection threshold, then the header does not match the field classification rule. In other embodiments, the data sampling classifier 210 omits verification, omits automatic field type classification acceptance without verification, or omits automatic field type classification rejection without verification step. The data sampling classifier 210 beneficially estimates a classification of data fields to beneficially reduce the computational cost of classifying fields under a header without exhaustively testing the field for every data record under the header.

The field verification module 220 obtains sampled fields for verification by the data sampling classifier and presents the sampled fields to an administrator for verification. The administrator determines whether the sampled fields have the field type corresponding to the field classification module. The field verification module 220 may present fields that did and did not match the verification rule in equal parts to streamline review by the administrator. Alternatively or additionally, the field verification module 220 classifies the sampled fields by another method (e.g., using the header type classifier 205). Alternatively or additionally, the field verification module 220 submits the sampled fields for comparison to other field classification rules associated with the different type. If the sampled fields match the other field classification rules better (i.e., more matching fields), then the field verification module 220 determines that the sampled fields do not have the field type of the initial field classification rule.

The record classification module 225 obtains field types of a data record and determines whether the data record has a sensitive data type according to a record classification rule. In one embodiment, the record classification rule specifies one or more field types and Boolean logic for combining the field types. The Boolean logic may specify that a data record matches a data classification if the data record has all the specified field types, any of the specified field types, or a particular combination of field types. For example, the record classification module 225 classifies a data record as PII (a sensitive data type) if the data record includes the field type birthdate, the field type first name, the field type last name, and one of the field types social security number and resident alien number.

Assessment Module

Figure 2B:
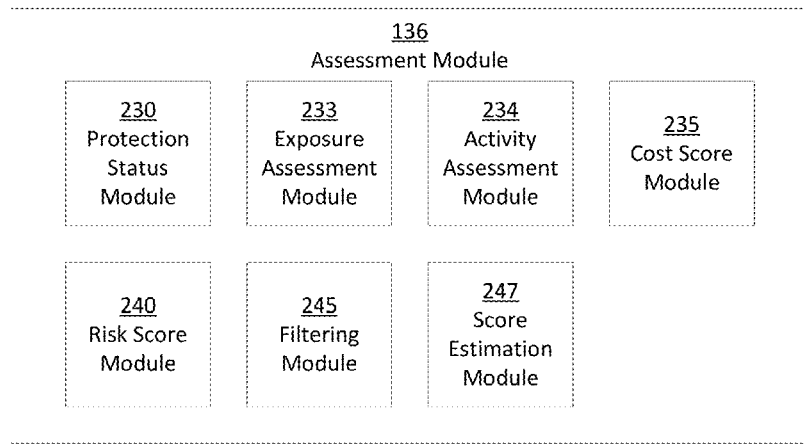
FIG. 2B is a block diagram of an example assessment module, in accordance with an embodiment.

FIG. 2B is a block diagram of assessment module 136, in accordance with an embodiment. The assessment module 136 includes a protection status module 230, an exposure assessment module 233, an activity assessment module 234, a cost score module 235, a risk score module 240, a filtering module 245, and a score estimation module 247. The functionality of the assessment module 136 may be provided by additional, different, or fewer modules than those described herein.

The protection status module 230 obtains an identification of an enterprise database 120 and determines an assessment score for the enterprise database 120. For example, the assessment score is a total count (e.g., of sensitive data records, of protected sensitive data records, of unprotected sensitive data records), or a percentage (e.g., of unprotected or protected sensitive data records out of sensitive data records or total data records, or a percentage of sensitive data records out of total data records). The protection status module 230 may determine the assessment score from a comparison of assessment scores over time. For example, a temporal assessment score indicates an assessment score for data modified or added during a time period. As another example, an assessment score indicates the change (e.g., in absolute or percentage terms) in an assessment score over a time period (e.g., day, month, quarter, year).

The exposure assessment module 233 obtains an identification of an enterprise database 120 and determines a user exposure score, which is an assessment score reflecting a number of users that may access an enterprise database 120. The exposure assessment module 233 identifies users that may access sensitive data in an enterprise database 120 and determines the user exposure score from the number of users that may access the sensitive data records. The user exposure score may be based on the whether the sensitive data are protected. For example, the user exposure score is the number of users that may access unprotected sensitive data fields. The user exposure score may be normalized relative to the total number of users that may access the database to determine a proportion or percentage of users that may access sensitive data or sensitive, unprotected data.

The activity assessment module 234 obtains an identification of an enterprise database 120 and determines an activity score, which is an assessment score reflecting user manipulation of data stored on the enterprise database 120. The activity score may indicate a count of a particular type of access (e.g., reads, writes, deletions) or a total count of overall data accesses (including all types). The activity score may reflect accesses to all data in the enterprise database 120, accesses to sensitive data in the enterprise database 120, or accesses to unprotected sensitive data in the enterprise database 120. Beyond reflecting a total count of data accesses, an activity score may indicate a unique number of users accessing to data, making a particular type of access to data, or accessing a particular type of data. Additionally, an activity score may indicate a ratio between types of data access or a proportion of a type of data access out of the total number of data accesses. For example, the activity assessment module 234 determines a ratio between reads and writes to sensitive data in an enterprise database 120.

The cost score module 235 obtains an identifier of an enterprise database 120 and determines a cost score indicating a total value or cost of the data in the enterprise database 120. The cost score module 235 identifies sensitive data types of sensitive data records in the enterprise database 120 and obtains a record cost corresponding to each sensitive data type. For example, the record cost is defined as part of the record classification rule, as shown in FIG. 11B. The cost score module 235 then computes the cost score from Cost=$\Sigma_t R_t N_t$, where the sum is over each sensitive data type t, $R_t$ is the record cost for the sensitive data type, and $N_t$ is the number of data records of the sensitive data type. Accordingly, the cost score is proportional to the record cost and number of data records for the sensitive data type.

Figure 14:
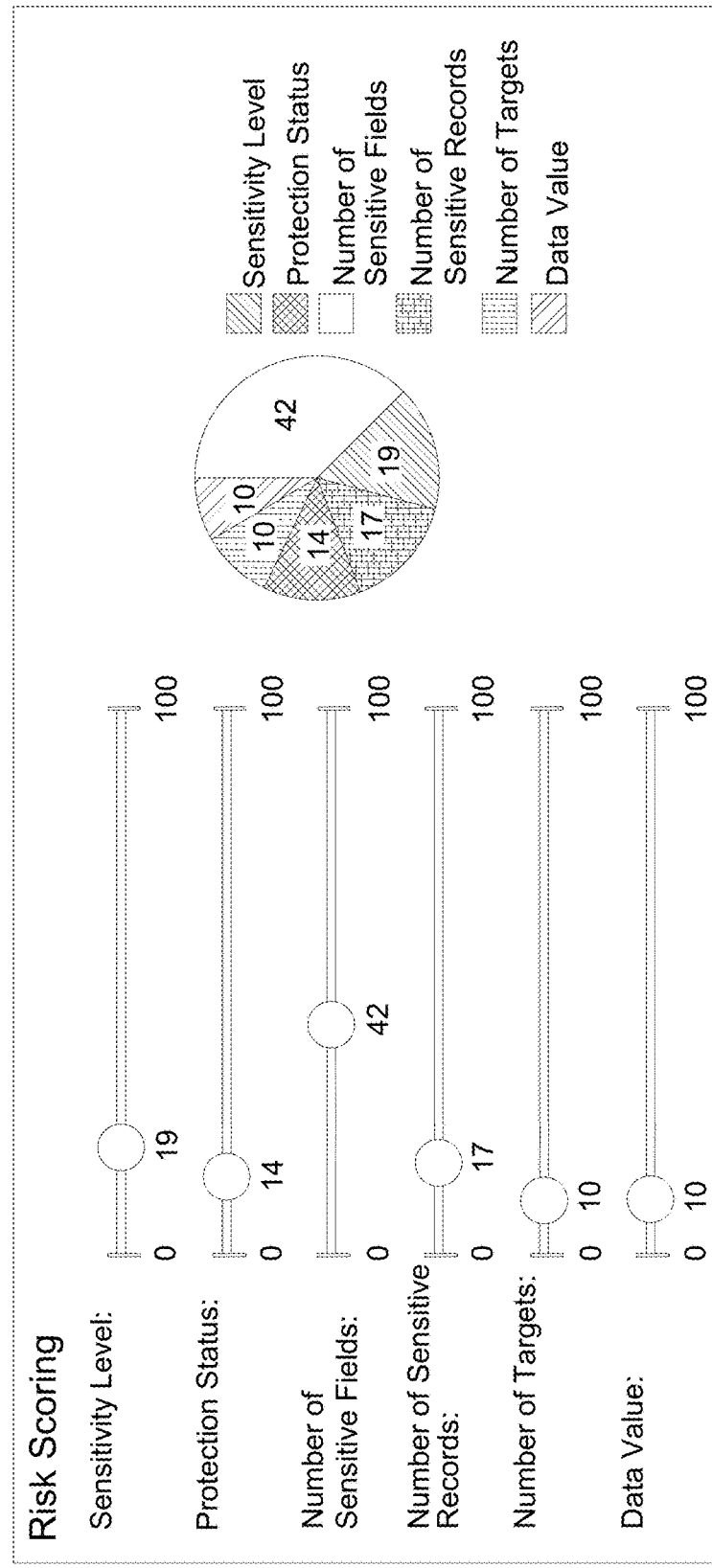
FIG. 14 is an example interface for configuring calculation of risk scores, in accordance with an embodiment.

The risk score module 240 obtains an identifier of an enterprise database 120 and determines a risk score indicating an importance of the enterprise database 120. To determine the risk score, the risk score module 240 combines a number of factors according to user-defined weights, as shown in FIG. 14. The risk score module 240 factors may be combined using a linear combination according to the user-defined weights. As another example, the risk score module 240 determines the percentile of an enterprise database 120 within each factor and linearly combines the percentiles according to the user-defined weights. Example factors used to determine the risk score include a number of sensitive data records in the enterprise database 120, a number of sensitive fields in the sensitive data records of the corresponding enterprise database 120, a number of dependent databases obtaining the sensitive data records from the enterprise database 120, a cost score of the sensitive data records of the enterprise database 120, an average sensitivity level of records in the enterprise database 120 (e.g., public, internal, confidential, privileged, restricted), a number of unprotected data records among the sensitive data records in the enterprise database 120, a user exposure score of the enterprise database 120, an activity score of the enterprise database 120, and whether (or to what extent, e.g., proportion) a protection policy has been applied to the sensitive data records of the corresponding enterprise database 120.

The filtering module 245 obtains a set of enterprise databases 120 and filters the set into one or more subsets of enterprise databases 120 according to database attributes or database status. Database attributes are characteristics of the database such as database enterprise group, or database location. Database status refers to characteristics of data records stored on an enterprise database 120 such as sensitive data types, protection policies applied, number of protected, unprotected, or total sensitive data records. The protection status module 230, the cost score module 235, or the risk score module 240 may determine an assessment score for a filtered subset of enterprise databases 120. The filtering module 245 may employ one or more binary filters in series. For example, the filtering module 245 outputs a subset of databases having PII data (a sensitive data type) and located in the United States. The filtering module 245 may sort the input set of enterprise databases 120 into multiple subsets. For example, the filtering module 245 outputs subsets of enterprise databases 120 sorted according to presence of a sensitive data type, membership in an enterprise group, or location. An enterprise database 120 may be a member of more than one subset. For example, an enterprise database 120 having PII and PHI is included in two subsets of enterprise databases 120 having PII and PHI data, respectively.

The score estimation module 247 obtains a specification of a type of assessment score and a set of enterprise databases 120 and outputs an estimation of the specified type of assessment score. To estimate an assessment score, the score estimation module 247 directs the classification engine 134 to identify and classify sensitive data using the header type classifier 205. By using header metadata, the header type classifier 205 may quickly determine an estimate of the number and types of sensitive data records in enterprise databases 120. Alternatively or additionally, the classification engine 134 determines estimates of the number and type of sensitive data fields by combining estimates based on field types identified by the header type classifier 205 with estimates based on field types identified by the data sampling classifier 210. For example, classifications of data in unchanged databases are based on sampled or actual counts of sensitive data records, and classifications of sensitive data in changed databases are based on headers.

Having prepared an estimate of number and types of sensitive data records, the score estimation module 247 outputs the estimated assessment score using another module of the assessment module 136 that corresponds to the specified type of assessment score. For example, the score estimation module 247 uses the risk score module 240 to estimate a risk score using the database-level estimates of number and types of sensitive records produced by the classification engine 134. In contrast to producing estimated assessment scores by the score estimation module 247, the assessment module 136 may alternatively use classification of data records on a record-by-record basis. In one embodiment, the assessment module 136 initially produces estimated assessment scores for presentation through the user interface module 137 and then progressively refines the assessment scores by performing record-by-record scans as time permits. Thus, the score estimation module 247 beneficially improves responsiveness to enable quick identification of sensitive data even before a full scan is complete.

User Interface Module

Figure 2C:
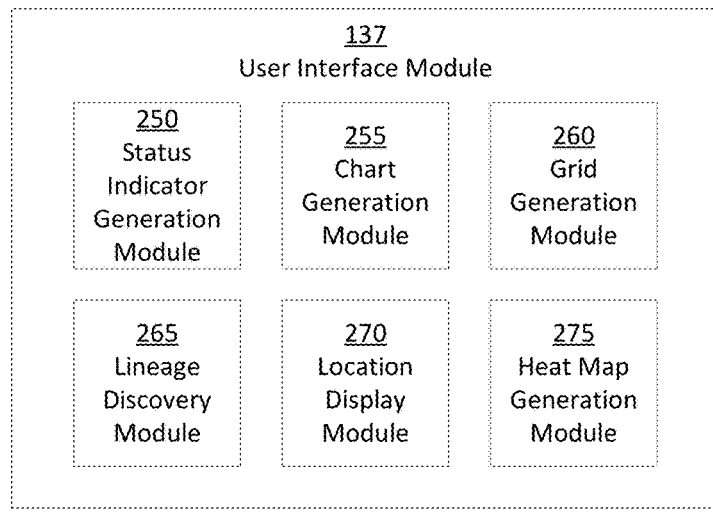
FIG. 2C is a block diagram of an example user interface module, in accordance with an embodiment.

FIG. 2C is a block diagram of user interface module 137, in accordance with an embodiment. The user interface module 137 includes a status indicator generation module 250, a chart generation module 255, a grid generation module 260, a lineage discovery module 265, a location display module 270, and a heat map generation module 275. The functionality of the user interface module 137 may be provided by additional, different, or fewer modules than those described herein.

The status indicator generation module 250 obtains assessment scores and generates corresponding status indicators visually representing the assessment scores. Status indicators are interface elements having a particular color, pattern, size, shape, and position within the user interface. Example status indicators include boxes, bars, slices, trend lines, and arcs. The size (e.g., area, length, arc length), color, pattern, size, shape, or position of a status indicator may reflect an assessment score. For example, the status indicator generation module 250 determines a color for an assessment score from a discrete or continuous mapping (e.g., red for highest risk scores, yellow for medium risk scores, green for low risk scores). Status indicators also may include text (e.g., one or more numbers and letters representing an assessment score (e.g., "1.1 T" represents 1.1 trillion dollars). The text may be color coded according to a discrete or continuous mapping of the assessment score to a set of colors.

A status indicator may represent an assessment score of a single enterprise database 120 or a group of enterprise databases 120. Selection of a status indicator may trigger selection of the corresponding enterprise database 120 (or group thereof). For example, selection of a status indicator prompts the interface to display further details of the corresponding one or more enterprise databases 120. As another example, selection of a status indicator prompts the interface to display a menu of options (e.g., protection policies, scans, alerts) for the one or more enterprise databases 120.

The status indicator generation module 250 may generate an aggregate assessment score for a group of enterprise databases 120. The status indicator generation module 250 identifies a group of enterprise databases 120 having one or more database attributes in common. For the identified group, the status indicator generation module 250 determines an aggregate assessment score from assessment scores of enterprise databases 120 in the group. For example, the aggregate assessment score is a sum total, an average, or a weighted average (e.g., weighted by number of data records, sensitive data records, protected sensitive data records, or unprotected sensitive data records). An aggregate status indicator may reflect the aggregate assessment score through any of its visual display properties (e.g., size, color, etc.).

The chart generation module 255 outputs a chart and takes as input a chart scope, one or more assessment dimensions, and zero or more filtering dimensions. The chart scope is a set of enterprise databases 120 or data used to generate a chart or other interface element. The chart scope may include all enterprise databases 120, a single enterprise database 120, or a subset of enterprise databases 120 (e.g., specified in terms of one or more database attributes or data characteristics). The assessment dimension defines a type of assessment score used to determine at least one aggregate assessment score reflected in at least one aggregate status indicator. A filtering dimension may be a database attribute or a data characteristic used to filter the enterprise databases 120 specified by the scope. Once subsets of databases are obtained using the filtering dimension, the chart generation module 255 obtains aggregate status indicators for each subset of filtered enterprise databases 120 and arranges the obtained aggregate status indicators according to one or more chart templates. If a subset of databases obtained according to the filtering dimension includes only one enterprise database 120, then the status indicator of the enterprise database 120 (for the assessment dimension) is displayed rather than an aggregate status indicator. Selection of an aggregate status element may trigger display of an additional chart (or may update another concurrently displayed chart), where the additional chart has a chart scope including the one or more filtering dimensions corresponding to the selected aggregate status element in addition to the chart scope of the chart containing the selected aggregate status indicator.

For example, from a single assessment dimension, the chart generation module 255 generates a pie chart, an arc graph, or another aggregate status indicator reflecting an aggregate assessment score of databases indicated by the chart scope. As another example, from an assessment dimension and a single filtering dimension, a chart generation module 255 generates a chart such as a bar graph. Such a chart includes an aggregate status indicator determined for each subset of databases filtered according to the filtering dimension (e.g., database attribute or data characteristic). The aggregate status indicator reflects the assessment dimension (e.g., a protection score, cost score, or risk score). As another example, the chart generation module 255 generates a chart from an assessment dimension and two filtering dimensions such as a three-dimensional bar graph. The chart includes an aggregate status indicator determined for each combination of the two filtering dimensions, where each aggregate status indicator reflects an assessment score specified by the assessment dimension. Charts are further described with respect to FIGS. 19A and 19B.

The grid generation module 260 generates a grid of aggregate status indicators from two filtering dimensions, one assessment dimension, and a chart scope. The grid of assessment indicators are arranged according to the two filtering dimensions and are labeled. For example, the filtering dimensions for the grid are enterprise grouping and sensitive data type, so the status indicator generation module 250 generates aggregate assessment indicators for each combination of enterprise grouping and sensitive data type specified by the chart scope. In the example, the aggregate assessment score specified by the assessment dimension is reflected by the aggregate status indicator using color. Selection of an aggregate status indicator may trigger the interface to display further charts (or other interface elements), where the chart scope for the further charts is the combination of filter dimensions corresponding to the selected aggregate status indicator in addition to the chart scope of the grid. Grids are further described with respect to FIG. 16.

The lineage discovery module 265 generates a lineage view of databases from a selection of an enterprise database 120. The lineage discovery module 265 uses the proliferation tracking module 135 to identify enterprise databases 120 that are dependent on the specified enterprise database 120 as well as enterprise databases 120 on which the specified enterprise database 120 depends. The status indicator generation module 250 then generates status indicators corresponding to the identified enterprise databases 120. The proliferation tracking module 135 also indicates a dependency layer of the identified enterprise databases 120 and dependency relationships between them. The lineage discovery module 265 arranges the status indicators according to the dependency relationships and dependency layers of the corresponding enterprise databases 120. For example, the lineage discovery module 265 arranges status indicators in the same dependency layer into a same column and arranges the status indicators within a column to place status indicators in a same row as status indicators of enterprise databases 120 having dependency relationships with the corresponding enterprise database 120.

In some embodiments, the lineage discovery module 265 aggregates enterprise databases 120 having a same set of dependency relationships. For example, enterprise databases 120 depending on a source database and depended on by a same set of dependent databases are aggregated together. Such aggregated enterprise databases 120 are represented by an aggregated status indicator instead of a status indicator. Lineage displays are further described with respect to FIGS. 18A through 18C.

The location display module 270 takes as input one or more locations and an assessment dimension and generates a location display for the one or more locations. Location displays are charts using location as a filtering dimension. A location display may overlay the aggregate status indicators for a location on a map illustrating the corresponding location. One example location display displays aggregate status indicators for a first level of geographic specificity (e.g., continents). In the example, selection of one of the aggregate status indicators prompts the location display module 270 to display additional aggregate status indicators corresponding to a second level of geographic specificity (e.g., country), where the chart scope of the additional aggregate status indicators includes the location of the selected aggregate status indicator. The location display may include status indicators overlaid with a map. For example, a first location display with aggregate status indicators representing continents is overlaid on a world map. Location displays are further described with respect to FIGS. 20A and 20B.

The heat map generation module 275 generates a heat map from one or more filtering dimensions, two assessment dimensions, and a chart scope. Heat maps are charts where one assessment dimension is reflected in a color of the status indicators (e.g., boxes), and the other assessment dimension is reflected in the relative size of the status indicators. The heat map generation module 275 obtains enterprise databases 120 within the chart scope, and the status indicator generation module 250 prepares status indicators for the enterprise databases 120. For example, the size of an enterprise database's status indicators reflects a number of sensitive data records or total number of data records in the enterprise database 120, and the color of the enterprise database 120 reflects a proportion of unprotected sensitive data records, risk score, or a cost score. The status indicators are visually grouped according to the filter dimension. For example, those status indicators that correspond to one value of a filter dimension occupy a contiguous block in the heat map. Heat maps are further described with respect to FIG. 17.

Impact Analysis Engine

Figure 2D:
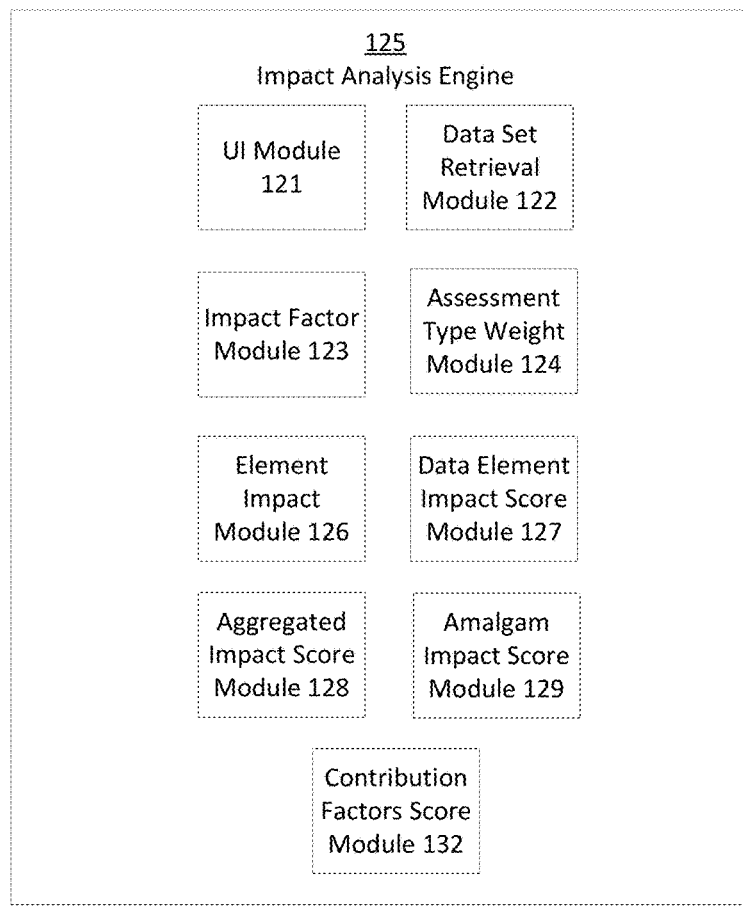
FIG. 2D is a block diagram of an example impact analysis engine, in accordance with an embodiment.

FIG. 2D is a block diagram of impact analysis engine 125, in accordance with an embodiment. The impact analysis provider 125 may include an impact UI module 121, a data set retrieval module 122, an impact factor module 123, an assessment type weight module 124, an element impact module 126, a data element impact score module 127, an aggregated impact score module 128, an amalgam impact score module 129, and a contribution factors score module 132.

The impact user interface (UI) module 121 generates a graphical user interface that a user interacts with through software and input devices on the enterprise client 110. The user interface is provided to the enterprise client 110 through communication with the software of the enterprise client 110. Through the user interface, the user adds and modifies enterprise policies, views status indicators of enterprise databases 120, and applies protection policies to enterprise databases. In some instances, the impact UI module 121 is part of the user interface module 137 described above.

The data set retrieval module 122 is configured for retrieving data comprising a set of data elements for risk analysis, and is one means for so doing.

The impact factor module 123 is configured for receiving, for each of a plurality of impact factors in the analysis, a set of value bands each representing a predetermined range for an impact factor and an associated value, and is one means for so doing. The impact factors include in one embodiment at least one risk factor associated with a measure of a magnitude of a risk to the enterprise attributable to the at least one risk factor and at least one impression metric magnitude factor associated with a measure of a magnitude of an impression metric on the enterprise. For example, the risk factors may include: a severity factor associated with a measure of a protection level of the selected data element, a protection status factor associated with a percentage of protected sensitive fields in the selected data element, a target magnitude factor associated with a number of targets at risk for the selected data element, and a value factor associated with a value of the selected data element. The impression metric magnitude factors may include: a number of records factor associated with a magnitude of a volume of sensitive data in the selected data element and a number of fields factor associated with a measure of a number of sensitive fields per record in the selected data element. For each impact factor for a selected data element from the set of data elements, the impact factor module 123 is further configured for determining the value band range that matches the value of the data element and obtaining the value associated with the determined value band.

The assessment type weight module 124 is configured for receiving a set of assessment type weights for a selected assessment type, and is one means for so doing. Each weight in the set of assessment type weights pairs with a corresponding at least one risk factor or at least one impression metric magnitude factor of the plurality of impact factors according to one embodiment. In one embodiment, a different set of assessment type weights is received for a different assessment type, with each weight in the different set of assessment type weights pairing with a corresponding at least one risk factor or at least one impression metric magnitude factor of the plurality of impact factors and where a different element impact results from the calculating applying the different set of assessment type weights.

The element impact module 126 is configured for determining an element impact for the selected data element according to the selected assessment type, and is one means for so doing. The element impact module 126 applies the set of assessment type weights to the obtained values for the impact factors to calculate at least one risk factor score corresponding to the at least one risk factor and at least one impression metric magnitude factor score corresponding to the at least one impression metric magnitude factor and calculating the element impact as the product of the at least one risk factor score and the at least one impression metric magnitude factor score.

The data element impact score module 127 is configured for calculating a data element impact score for the selected data element, and is one means for so doing. The data element impact score is calculated as the element impact divided by a maximum impact factor, with the maximum impact factor is the product of the assessment type weights in the set of assessment type weights.

The aggregated impact score module 128 is configured for calculating an aggregated impact score, and is one means for so doing. The aggregated impact score is calculated as, in one embodiment, as the sum, for a subset of data elements in the set of data elements, of the products of the data element impact scores for each data element in the subset of data elements and the element impacts for each data element in the subset of data elements, divided by the sum of the element impacts for each data element in the subset of data elements.

The amalgam impact score module 129 is configured for calculating an amalgam impact score, and is one means for so doing. The amalgam impact score is calculated as, in one embodiment, the sum, for the set of data elements, of the products of the data element impact scores for each data element in the set of data elements and the element impacts for each data element in the set of data elements, divided by the sum of the element impacts for each data element in the set of data elements.

The contribution factors score module 132 is configured for calculating an individual impact contribution factor for the selected element, and/or calculating a relative impact contribution factor for a subset of data elements, and is one means for so doing. The contribution factors score module 132 calculates the individual impact contribution factor as the product of the impact score and the element impact for the selected element, divided by the sum, for the set of data elements, of the products of the data element impact scores and the element impacts for the set of data elements. The contribution factors score module 132 calculates the relative impact contribution factor as the sum, for the subset of data elements, of the products of the data element impact scores and the element impacts for the subset of data elements, divided by the sum, for the set of data elements, of the products of the data element impact scores and the element impacts for the set of data elements.

Data Security Process Flow

Figure 3:
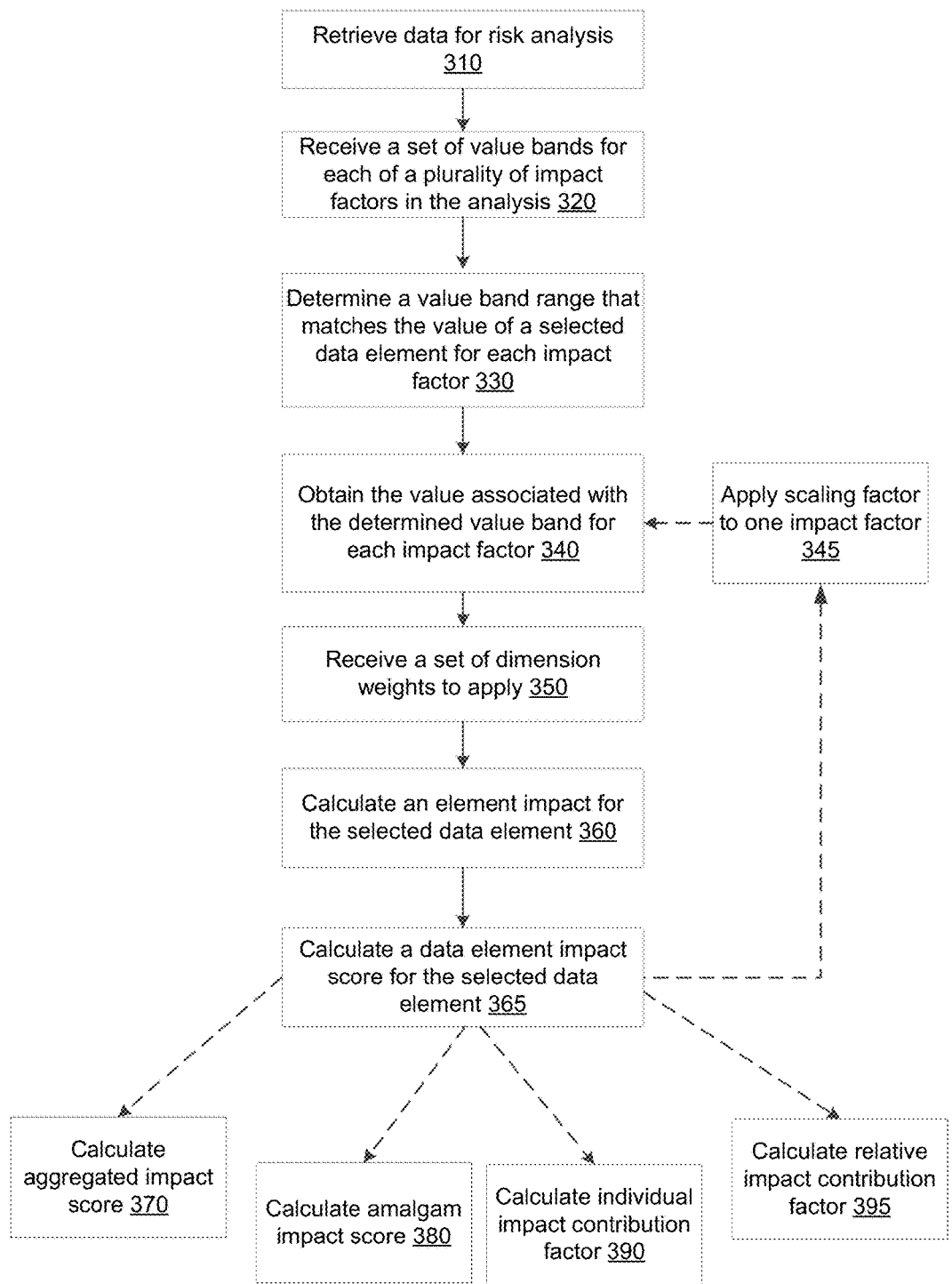
FIG. 3 is a flowchart of a process of determining an impact of a selected data element on enterprise security according to one embodiment.

FIG. 3 depicts a flowchart for a method of determining an impact of a selected data element on enterprise security according to one embodiment. The method begins with retrieving 310 data comprising a set of data elements for risk analysis. The set of data elements could be of any size. For example, the method could be used for data elements from all columns in table, for all tables in a database, for all data elements in an entire enterprise, or any other data set.

According to one embodiment, a method of discovering and protecting sensitive data within an enterprise, such as described in conjunction with FIG. 7 below, has been applied to the data received for risk analysis. Such a method obtains database descriptions of enterprise databases, obtains one or more record classification rules for one or more sensitive data types, identifies sensitive data records of the sensitive data type in the data records, determines assessment scores for the enterprise databases, generates status indicators for one or more enterprise groups which status indicators reflect a total number of identified sensitive data records in the enterprise group, and applies the status indicators, as described herein in conjunction with FIG. 7.

Next, a set of value bands is received 320 for each of a plurality of impact factors in the analysis, each value band representing a predetermined range or category for an impact factor and an associated risk value. For example, the value bands may be received from an enterprise, which has determined the ranges and associated risk values according to the particular data of the enterprise to be analyzed. In one embodiment, the impact factors comprise at least one risk and at least one impression metric factor associated with a measure of a magnitude of a risk or an impression metric on the enterprise. The bands can be received, e.g., via a settings screen such as FIG. 14, discussed below. The band could be human defined or computed directly based on metrics extrapolated from a sample data set to create a finite number of bands or expressed based on a percentage ratio.

The impact factors received can be custom for the enterprise associated with the data set, as can the values. In one example, the risk factors include security threats with the potential to impact an enterprise in the event of a data leak, and include a severity factor associated with a measure of a protection level of the selected data element, a protection status factor associated with a percentage of protected sensitive fields in the selected data element, a target magnitude factor associated with a number of targets at risk for the selected data element, and a value factor associated with a value of the selected data element.

Table 1 below shows value bands and values for a severity impact factor. Severity is related to the nature of the data that is subject to the security threat. As shown, there are six value bands for this impact factor, each with a corresponding risk value: CONFIDENTIAL, RESTRICTED, INTERNAL, PUBLIC, NON-SENSITIVE, and UNANALYZED. The most severe threat arises if data that is leaked or breached is the CONFIDENTIAL data, and thus it has the highest risk value. The risk values corresponding to the value bands are merely exemplary, are customizable, could be expressed as a ratio of previous band, by example 65%, and thus can vary. In the set of value bands received 320, the bands and values have been determined for use in the calculations of the method.

TABLE 1

| Severity | Risk Value |
| --- | --- |
| CONFIDENTIAL | 1 |
| RESTRICTED | 0.65 |
| INTERNAL | 0.42 |
| PUBLIC | 0.21 |
| NON-SENSITIVE | 0.11 |
| UNANALYZED | 0 |

These factor bands are received from the enterprise according to one embodiment, and could be human defined or computed directly based on metrics extrapolated from a sample data set to create a finite number of bands. Each band is the pair of (severity) impact factor (e.g., CONFIDENTIAL, RESTRICTED) and the associated value (e.g., 1, 0.65, respectively). In some circumstances, as below for Percent Protected (Table 2), the band is a range rather than an impact factor.

Table 2 below shows value bands and risk values for a protection status factor, which shows the protection status of data fields, by percent in this example. Protected data, as used herein, is data that has been masked permanently or dynamically, and/or encrypted, and the level of protection is detected as part of the data & data flow analysis. As shown, there are five value bands, each with a corresponding risk value: 0-24% protected, 25-49% protected, 50-74% protected, 75-89% protected, and equal to or greater than 90% protected. The lower the percentage of sensitive fields of the data elements that are protected, the higher the risk value. As with Table 1, the risk values in Table 2 corresponding to the value bands are merely exemplary, are customizable, and thus can vary. In the set of value bands received 320, the bands and values have been determined for use in the calculations of the method.

TABLE 2

| Percent Protected | Risk Value |
|---|---|
| 0-24 | 1 |
| 25-49 | 0.65 |
| 50-74 | 0.42 |
| 75-99 | 0.21 |
| >=100 | 0 |

In some embodiments, each band is expressed as a ratio of previous band, e.g., 65% of the previous value. The values given here are exemplary for a known data set, but will vary depending on the enterprise, data set, and volume of data that the bands correspond to.

Table 3 below shows value bands and risk values for an impact factor of target magnitude, which corresponds to the magnitude of the proliferation of data to targets. Data proliferation and data lineage impact the number of targets. For example, if data proliferates from a particular source, then the exposure and the remedial action at the source impacts all the downstream targets. For an example of data proliferation, see FIGS. 18A-18D, discussed below. As shown, there are six value bands, each with a corresponding risk value: equal to or greater than 100 targets, 75-99 targets, 50-74 targets, 30-49 targets, 1-29 targets, or no targets. The higher the number of proliferation targets, the higher the risk value. The risk values in Table 3 corresponding to the value bands are merely exemplary, are customizable, and thus can vary. For example, while a number of targets over 100 might be high for one data set (and thus have the highest risk value: 1), it may be relatively low for a different data set. Thus, the various bands may be established for a particular enterprise or data set for which the risk is to be assessed. Below is an example of a data set for which 100 targets or mire would be very high. Allowing for customization of the bands and corresponding values allows for calculations that most accurately reflect the data in the relevant data set. In the set of value bands received 320, the bands and values have been determined for use in the calculations of the method.

TABLE 3

| Number Of Target | Risk Factor |
|---|---|
| >=100 | 1 |
| 75-99 | 0.75 |
| 50-74 | 0.56 |
| 30-49 | 0.421875 |
| 1-29 | 0.31640625 |
| None | 0.00 |

Table 4 below shows value bands and risk values for a value impact factor, which corresponds to the value of the data elements in the data set. As shown, there are five value bands, each with a corresponding risk value per sensitive data dollar value: greater than to 10.00$, 5.01$-10.00$, 1.01$-5.00$, 0.01$-1.00$, and 0.00$. The greater the data value, the greater the risk value. The risk values in Table 4 corresponding to the value bands are merely exemplary, are customizable, and thus can vary. Allowing for customization of the bands and corresponding values allows for calculations that most accurately reflect the data in the relevant data set. In the set of value bands received 320, the bands and values have been determined for use in the calculations of the method.

TABLE 4

| Data Value | Risk Value |
|---|---|
| >10$ | 1 |
| 5.01$-10.00$ | .65 |
| 1.01$-5.00$ | .42 |
| 0.01$-1.00$ | 0.21 |
| 0 | 0 |

The impact factors received can be custom for the enterprise associated with the data set, as can the values. In one example, the impression metrics include factors that define the volume of sensitive data associated with a given data elements, and include a number of records factor associated with a magnitude of a volume of sensitive data in the selected data element and a number of fields factor associated with a measure of a number of sensitive fields per record in the selected data element.

Table 5 below shows value bands and risk values for a number of records factor, which corresponds to the number of records in the data set being analyzed. As shown, there are five value bands, each with a corresponding risk value: greater than or equal to 5,000,000, 1,000,000-4,999,999, 100,000-999,999, 10,000-99,999, and 0-9,999. The greater the number of records, the greater the risk value. The risk values in Table 5 corresponding to the value bands are merely exemplary, are customizable, and thus can vary. Allowing for customization of the bands and corresponding values allows for calculations that most accurately reflect the data in the relevant data set. In the set of value bands received 320, the bands and values have been determined for use in the calculations of the method. As above, these can be received from the enterprise, human determined, or automatically determined based on a sample data set. In this example, the bands are set based on a data set for which >=5,000,000 data records is a very high number.

TABLE 5

| Number of Records | Risk Value |
|---|---|
| >=5000000 | 1 |
| 1000000-4999999 | .65 |
| 100000-999999 | .42 |
| 10000-9999 | 0.21 |
| 0-9999 | 0 |

Table 6 below shows value bands and risk values for a number of fields factor, which corresponds to the number of sensitive fields per record in the data set. Sensitive data, in this context, means data that is company confidential data. As shown, there are five value bands, each with a corresponding risk value: greater than or equal to 15, 10-14, 5-9, 1-4, and 0. The greater the number of sensitive fields per record, the greater the risk value. The risk values in Table 6 corresponding to the value bands are merely exemplary, are customizable, and thus can vary. Allowing for customization of the bands and corresponding values allows for calculations that most accurately reflect the data in the relevant data set. In the set of value bands received 320, the bands and values have been determined for use in the calculations of the method.

TABLE 6

| Number of Sensitive Fields per Record | Risk Value |
| --- | --- |
| >=15 | 1 |
| 10-14 | .65 |
| 5-9 | .42 |
| 1-4 | 0.21 |
| 0 | 0 |

Next the method proceeds by determining 330, for each impact factor for a selected data element from the set of data elements, the value band range that matches the value of the data element. This step is a matching process for each factor, using the set of value bands received 320 for the data set. For example, if the number of sensitive fields per record is 12, that corresponds to the second band shown in Table 6. A similar matching occurs for each impact factor. Then, for each impact factor, the value associated with the determined value band is obtained 340. This step is a table lookup corresponding to the determined band of the previous step. For example, for the 12 sensitive fields per record sample above, the second band was determined 330 to match, and thus the corresponding value is 0.65 per Table 6. A similar lookup occurs for each impact factor, using the set of value bands received 320 for the data set. After this step, all of the values for the impact factors in the analysis are known.

The method then continues by receiving 250 a set of factor weights for a selected assessment type. An assessment type represents a particular framework or operational concern for evaluating a security threat. For example, in an enterprise the various assessment types can include liability, reputation, business interruption, compliance, and customer loss. Each assessment type is associated with a set of weights, wherein each weight is associated with a corresponding impact factor (risk factor or impression metric magnitude factor) and is applied to the risk value for the impact factor. As with the bands and values described above for each impact factor, the selected assessment type is variable, and application of a different assessment type will produce different results. See FIG. 14, discussed below.

The assessment type weights are weights applied to the values for the impact factors according to a particular user's perspective. However, the assessment type is not the same for all the different stakeholders. By example, a CISO will appreciate the security risk associated with potential security threat, and instead an application owner will perceived a different risk associated with potential data loss. Thus, one user within an organization having one perspective (first assessment type) may think the volume of data is more critical than the value itself, versus another user in the organization having a second perspective (second assessment type) might think the opposite for their business concerns. The assessment type weights allow the same general risk/impact data (e.g., various weighted impact factors for the data set per the banding) to yield a custom result for each different user perspective. For example, a perspective (assessment type) that weights, e.g., the number of rows, highest will end up with a different element impact result and a different impact score for the same data set, impact factors, and banding than will a user who puts a lower value on the number of rows and a high value on, e.g., the protection factor. By breaking down the various impacts factors in the analysis and allowing a set of specific assessment type weights to be applied to the factors according to the perspective, it is easy to update the analysis for a different assessment type by replacing assessment type weights from one perspective with assessment type weights from another perspective while otherwise keeping the analysis the same.

An example of two different sets of assessment type weights being applied to the same impact factors is shown below in Table 7, one for a Liability assessment and one for a Compliance assessment. As shown, the set of assessment type weights for the Liability assessment are 10, 30, 10, 20, 5, and 5, respectively, whereas the set of assessment type weights for the Compliance assessment are 20, 30, 5, 5, 10, and 5, respectively.

TABLE 7

| Liability | | Compliance | |
| --- | --- | --- | --- |
| Risk Factor | Weight | Risk Factor | Weight |
| Severity | 10 | Severity | 20 |
| Protection Level | 30 | Protection Level | 30 |
| Number Of Target | 10 | Number Of Target | 5 |
| Data Value | 20 | Data Value | 5 |
| Impression Metrics | | Impression Metrics | |
| Nb Row | 5 | Nb Row | 10 |
| Nb SField | 5 | Nb SField | 5 |

Then the method determines 360 an element impact for the selected data element according to the selected assessment type by applying the set of assessment type weights to the obtained values for the impact factors to calculate impact factor scores for the impact factors, and then calculating the element impact as the product of the impact factor scores.

In other words, the Element Impact is calculated by the formula:

ElementImpact=SumImpactFact*ProductImpressionWeight where the SumImpactFact is calculated as, for the sum of the risk factors:

$$SumImpactFact = \sum_{i=0}^{n} RV_i RFW_i$$

where RV is the risk value for an impact factor and RFW is the risk factor assessment type weight to be applied for the risk factor. The product impression weight, for the product of the impression metrics is calculated as:

ProductImpressionWeight=NR*NRW*NSF*NSFW where NR is the number of records (number of records factor) risk value, NRW is the assessment type weight to be applied to the number of records factor, NSF is the number of sensitive fields (number of fields factor) risk value, and the NSFW is the assessment type weight to be applied to the number of fields factor.

For example, Table 8 below illustrates the calculation using the Liability assessment weights and exemplary impact factor values from above for a data set, Data Store 1 or "DS1." The element impact (shown in the "score" column) is the value of the factor (e.g., severity=CONFIDENTIAL=1) times the weight (=10), resulting in the element impact for the impact factor "severity." Each of the other impact factor calculations are made ("score" column), and then the sum of the risk factors is determined ("sum of risk score," 63.16), and the product of the impression metrics ("impression weight," 15.00) is determined. These values are multiplied to product the element impact (across all impact factors) as 947 (shown below as "data store total score"). Note that the impact values for the classification of each risk factor are not shown in Table 8, but correspond to the exemplary tables above corresponding to each risk factor.

TABLE 8

| Liability | DS1 | | |
|---|---|---|---|
| | Weight | Classification | Score |
| Risk Factor | | | |
| Severity | 10 | CONFIDENTIAL | 10.00 |
| Protection Level | 30 | UNPROTECTED | 30.00 |
| Number Of Target | 10 | 1-29 | 3.16 |
| Data Value | 20 | >=10$ | 20.00 |
| Impression Metrics | | | |
| Nb Row | 5 | 1,000,000-9,999,999 | 3.00 |
| Nb SField | 5 | >=10 sFields | 5.00 |
| Calculation | | | |
| Sum of Risk Score | | | 63.16 |
| Impression Weight | | | 15.00 |
| Data Store Total Score | | | 947 |
| Data Store Risk Score | | ◉ | 54.1% |

The method further includes, according to one embodiment, calculating 365 a data element impact score for the selected data element as the calculated element impact divided by a maximum impact factor, wherein the maximum impact factor is the product of the assessment type weights in the set of assessment type weights. In the example of a severity factor, a protection status factor, a target magnitude factor, a value factor, a number of records factor, and a number of fields factor, calculating the element impact as the product of the at least one risk factor score and the at least one impression metric magnitude factor score includes calculating the at least one risk factor score as the sum of the severity factor score, the protection status factor score, the target magnitude factor score, and the value factor score and calculating the at least one impression metric magnitude factor score as the product of the number of records factor score and the number of fields factor score. Then the data element impact score for the selected data element is calculated using a maximum impact factor that is the product of the sum of the assessment type weights associated with the severity factor, the protection status factor, the target magnitude factor, and the value factor, and the product of the weights associated with the number of records factor and the number of fields factor.

The method further includes, according to one embodiment, calculating 365 a data element impact score for the selected data element as the calculated element impact divided by a maximum impact factor, wherein the maximum impact factor is the product of the assessment type weights in the set of assessment type weights. In the example of a severity factor, a protection status factor, a target magnitude factor, a value factor, a number of records factor, and a number of fields factor, calculating the element impact as the product of the at least one risk factor score and the at least one impression metric magnitude factor score includes calculating the at least one risk factor score as the sum of the severity factor score, the protection status factor score, the target magnitude factor score, and the value factor score and calculating the at least one impression metric magnitude factor score as the product of the number of records factor score and the number of fields factor score. Then the data element impact score for the selected data element is calculated using a maximum impact factor that is the product of the sum of the assessment type weights associated with the severity factor, the protection status factor, the target magnitude factor, and the value factor, and the product of the weights associated with the number of records factor and the number of fields factor.

Expressed as a formula, the data element impact score is:

$$DataElementImpactScore = \frac{ElementImpact}{MaxImpactFact}$$

where MaxImpactFact is calculated as:

$$MaxImpactFact = (NRW * NSFW)\sum_{i=0}^{n} RFW_i$$

where RFW is the sum of the risk factor weights for the risk factors, and the NRW and NSFW are, as above: NRW is the assessment type weight to be applied to the number of records factor, and NSFW is the assessment type weight to be applied to the number of fields factor.

Continuing the example from Table 8 above, MaxImpactFact is calculated as 5 (NRW) times 5 (NSFW) times 70 (the sum of the risk factors=10+30+10+20), which equals 1750. Calculating DataElementImpactScore as ElementImpact (947 per the above) over MaxImpactFact (1750), the result is 54.1%, shown in Table 8 above as "Data Store Risk Score."

As discussed above, a different set of assessment type weights could easily replace the Liability weights used in this example, without otherwise altering the formula. Using the Compliance weights from Table 7 above, for example, the element impacts for each impact factor would change to:
Severity=20 (20*1),
Protection Level=30 (30*1),
Number of Targets=1.58 (5*0.316),
Data Value=5 (5*1),
Nb rows=6 (1*0.6), and
Nb Sfileds=5 (1*5).

The resulting element impact (across all impact factors) would be 1697.4 (=(20+30+1.58+5)*(6*5)), and the resulting data element impact score would be 56.6% (=1697.4/(10*5(60)).

Another metric that can be calculated using the method is an aggregated impact score, or the risk associated with a group of objects or data elements. The method can further include, according to one embodiment, calculating 370 an aggregated impact score as the sum, for a subset of data elements in the set of data elements, of the products of the data element impact scores for each data element in the subset of data elements and the element impacts for each data element in the subset of data elements, all divided by the sum of the element impacts for each data element in the subset of data elements.

Expressed as a formula, for a group of "N" data elements or objects:

$$AggregatedImpactScore = \frac{\sum_{i=0}^{n} DataElementImpactScore_i ElementImpact_i}{\sum_{i=0}^{n} ElementImpact_i}$$

Similarly, using the same formula, it is possible to create a risk amalgam represents the risk associated with all impact assessment types, showing an amalgam risk for the entire enterprise in view of the various assessment types. Thus, the method further includes, according to one embodiment, calculating 380 an amalgam impact score as the sum, for the set of data elements, of the products of the data element impact scores for each data element in the set of data elements and the element impacts for each data element in the set of data elements, all divided by the sum of the element impacts for each data element in the set of data elements.

Expressed as a formula, for the risk associated with all "N" assessment types:

$$AmalgamImpactScore = \frac{\Sigma_{i=0}^{n} DataElementImpactScore_i ElementImpact_i}{\Sigma_{i=0}^{n} ElementImpact_i}$$

Another useful metric that can be used to identify and reduce the overall risk for an organization is to be able to quickly identify the highest risk contributor. This could be used to identify priority of corrective and preventive actions.

According to one embodiment, the method further includes calculating 390 an individual impact contribution factor for the selected element as the product of the impact score and the element impact for the selected element, all divided by the sum, for the set of data elements, of the products of the data element impact scores and the element impacts for the set of data elements.

Expressed as an equation, for the risk contribution of a given data element "m" on a group:

$$IndividualConributionFactor = \frac{ImpactScore_m ElementImpact_m}{\Sigma_{i=0}^{n} ImpactScore_i ElementImpact_i}$$

Likewise, a similar metric calculates the risk contribution of a given data element subset on a full group composed of elements. The method further includes, according to one embodiment, calculating 395 a relative impact contribution factor for a subset of data elements selected from the set of data elements, calculated as the sum, for the subset of data elements, of the products of the data element impact scores and the element impacts for the subset of data elements, all divided by the sum, for the set of data elements, of the products of the data element impact scores and the element impacts for the set of data elements. This calculation could be used to quickly identify the main lineage or proliferation of concern and best opportunity for remedy.

Expressed as an equation, the risk contribution of a given data element subset composed of "M" elements on a full group composed of "N" elements:

$$RelativeContributionFactor = \frac{\Sigma_{i=0}^{m} ImpactScore_i ElementImpact_i}{\Sigma_{i=0}^{n} ImpactScore_i ElementImpact_i}$$

Figure 5:
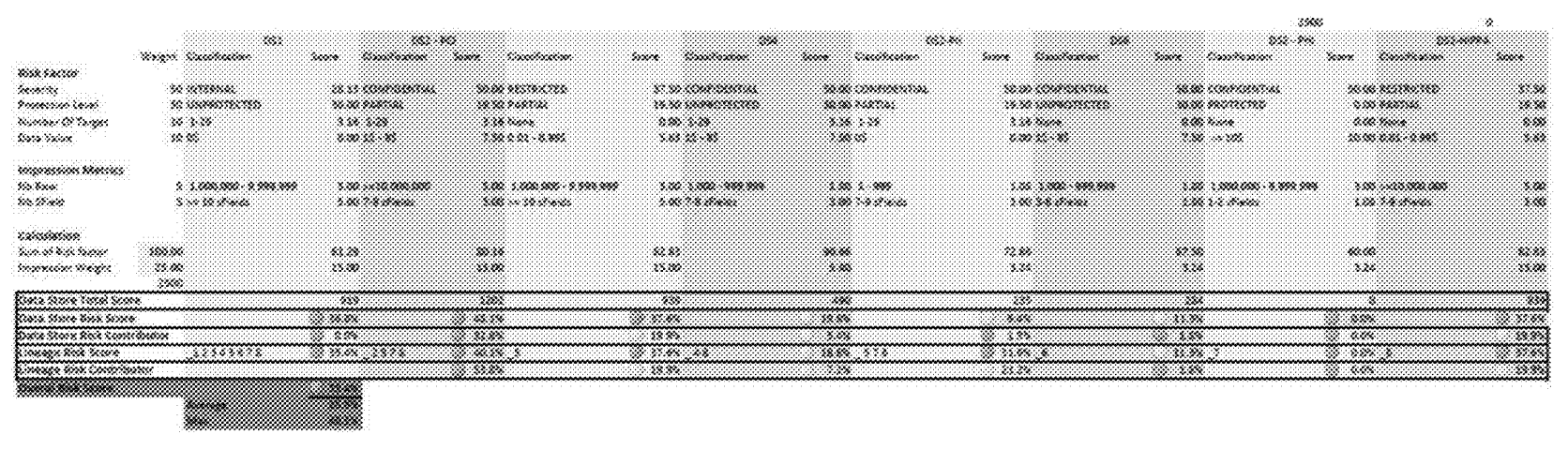
Figure 6:
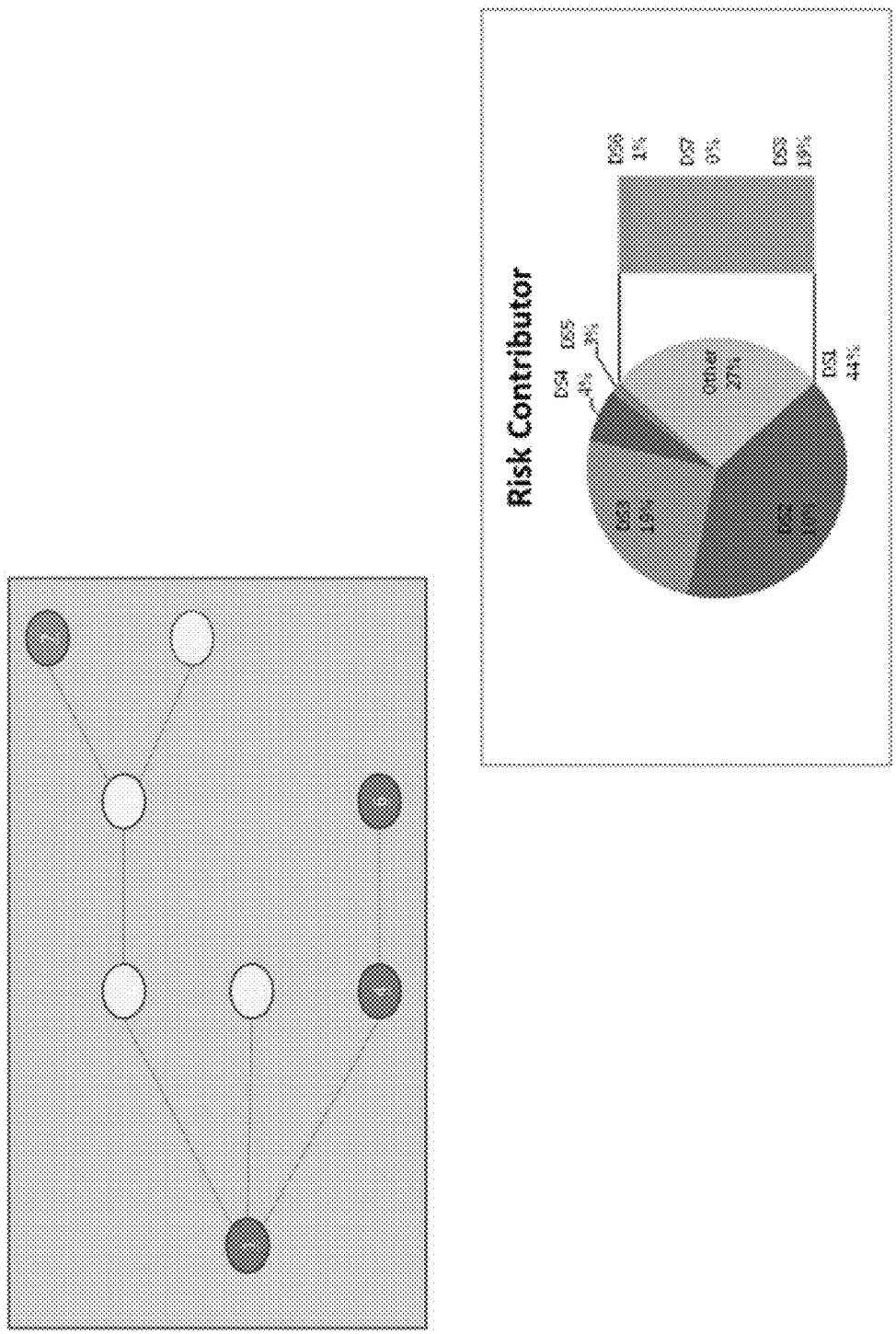
FIG. 6 shows the data target proliferation and relative risk contribution as a pie chart according to one embodiment.

For example, FIG. 5 shows Element Impact (Data Store Total Score), Data Element Impact Score (Data Store Risk Score), Individual Contribution Factors (Data Store Risk Contributor, Lineage Risk Score (showing Data Sets contributing), Relative Contribution Factor (Lineage Risk Contributor), and Aggregated Impact Score (Overall Risk Score) for eight different data stores (DS) and associated data flow between them. By example DS1 could be a production data store, DS2 an ODS used to feed a Data Warehouse (DS5) with proliferation to 2 data marts (DS7 & DS8), DS3 a Test database, DS4 a specialized DataMart and DS5 a Cube. FIG. 6 shows the corresponding data target proliferation and relative risk contribution as a pie chart.

The risk contribution calculation could be extended to optimize the remediation action selection and prioritization to get the highest risk factor reduction. For example, once identified, remedial factors could be introduced associated with the identified remediation actions. Using the new set of factors, a "what if" analysis could be executed to evaluate the benefit of remediation actions on the overall risk.

For example, the method could further include, according to one embodiment, determining 345 a remedial data element impact score by creating a scaling factor corresponding to one of the plurality of impact factors, adding the scaling factor to the plurality of impact factors for an updated analysis, and then calculating the remedial data element impact score for the selected data element by including the scaling factor in an updated calculation 365 of the data element impact score to determine the remedial effect of scaling the one of the plurality of impact factors by the scaling factor. In one example, the scaling factor can be a negative value of the one of the plurality of impact factors. When the negative value is applied, it zeroes out the impact of that factor. Then the data element impact score could be re-calculated to see what impact eliminating the remedial factor would have on the overall risk. Similarly, other scaling factors could be used. For example, a negative one-half value of the identified remedial factor could identify the impact of cutting the risk for a particular impact factor in half.

Using the data above from Table 8, for example, if the Protection Level impact factor had a remedial, negative factor applied (=−30.00), the element impact (across all impact factors) would reduce to 497.4 (=63.16−30=33.16*15), and the corresponding data element impact score would be 49.7% (=497.4/(40*25)), Thus, protecting all data would result in a reduction in the data element impact score of 4.4% (=54.1−49.7). Seeing this impact would help determine whether the reduction in risk that would result would be sufficient to consider the remedial action as a solution.

In yet another example, an individual impact factor calculation for a given impact factor could be adjusted to determine a remedial action. For example, in the data proliferation was virtually eliminated, e.g., number of proliferation targets reduced to zero such that the Number of Targets factor (for the data in Table 8) reduced to a value of 0, the element impact (across all impact factors) would reduce to 900 (=(10+30+0+20)*15)), and the corresponding data element impact score would be 51.4% (=900/(70*25)). Thus, eliminating proliferation targets would result in a 2.7% reduction (=54.1-51.4). Seeing this impact would help determine whether the reduction in risk that would result would be sufficient to consider the remedial action as a solution.

That process could be implemented using different framework, here an example using Relational one.

The formula used in the SQL and Java layer for calculating the risk score is. This formula is used to calculate the aggregate risk score at repository level based on each policy and then the aggregated risk score at department, application group or organization level.

sum(((risk_score*100)/max_score)*risk_score)/sum (risk_score)

Example

The following section presents the implementation of that model using a relational database.

Sats Risk Score Factor

| Column Name | Data Type | Type Mod | Ordinal Position | Length | Precision | Scale | Not Null |
|---|---|---|---|---|---|---|---|
| FACTOR_ID | NUMBER | | 1 | 22 | 10 | 0 | ☑ |
| FACTOR_NAME | VARCHARZ | | 2 | 1,000 | 0 | 0 | ☑ |
| FACTOR_WEIGHTAGE | NUMBER | | 3 | 22 | 10 | 2 | ☑ |
| FACTOR_TYPE | VARCHARZ | | 4 | 1,000 | 0 | 0 | ☑ |

Sats Risk Score Factor Value

| Column Name | Data Type | Type Mod | Ordinal Position | Length | Precision | Scale | Not Null |
|---|---|---|---|---|---|---|---|
| FACTOR-ID | NUMBER | | 1 | 22 | 10 | 0 | ☑ |
| FACTOR_VALUE | VARCHAR2 | | 2 | 1,000 | 0 | 0 | ☑ |
| FACTOR_VALUE_SEQUENCE | NUMBER | | 3 | 22 | 10 | 0 | ☑ |
| FACTOR_VALUE_DESCRIPTION | VARCHAR2 | | 4 | 4,000 | 0 | 0 | ☑ |
| HIDDEN | CHAR | | 5 | 1 | 0 | 0 | ☑ |

Sats Repo Risk Factor

| Column Name | Data Type | Type Mod | Ordinal Position | Length | Precision | Scale | Not Null | Default |
|---|---|---|---|---|---|---|---|---|
| REPO_ID | NUMBER | | 1 | 22 | 10 | 0 | ☑ | |
| POLICY_ID | NUMBER | | 2 | 22 | 10 | 0 | ☑ | |
| FACTOR_ID | NUMBER | | 3 | 22 | 10 | 0 | ☑ | |
| FACTOR_RISK_SCORE | NUMBER | | 4 | 22 | 10 | 2 | ☑ | |
| FACTOR_WEIGHTAGE | NUMBER | | 5 | 22 | 10 | 2 | ☑ | |
| FACTOR_VALUE | VARCHARZ | | 6 | 500 | 0 | 0 | ☑ | |

Data Quality Process Flow

Multi-assessment type impact analysis could be applied to others concepts, as by example the data quality. The same process could be applied using quality factors instead of risk factors to evaluate the quality of the data for data governance.

Figure 4:
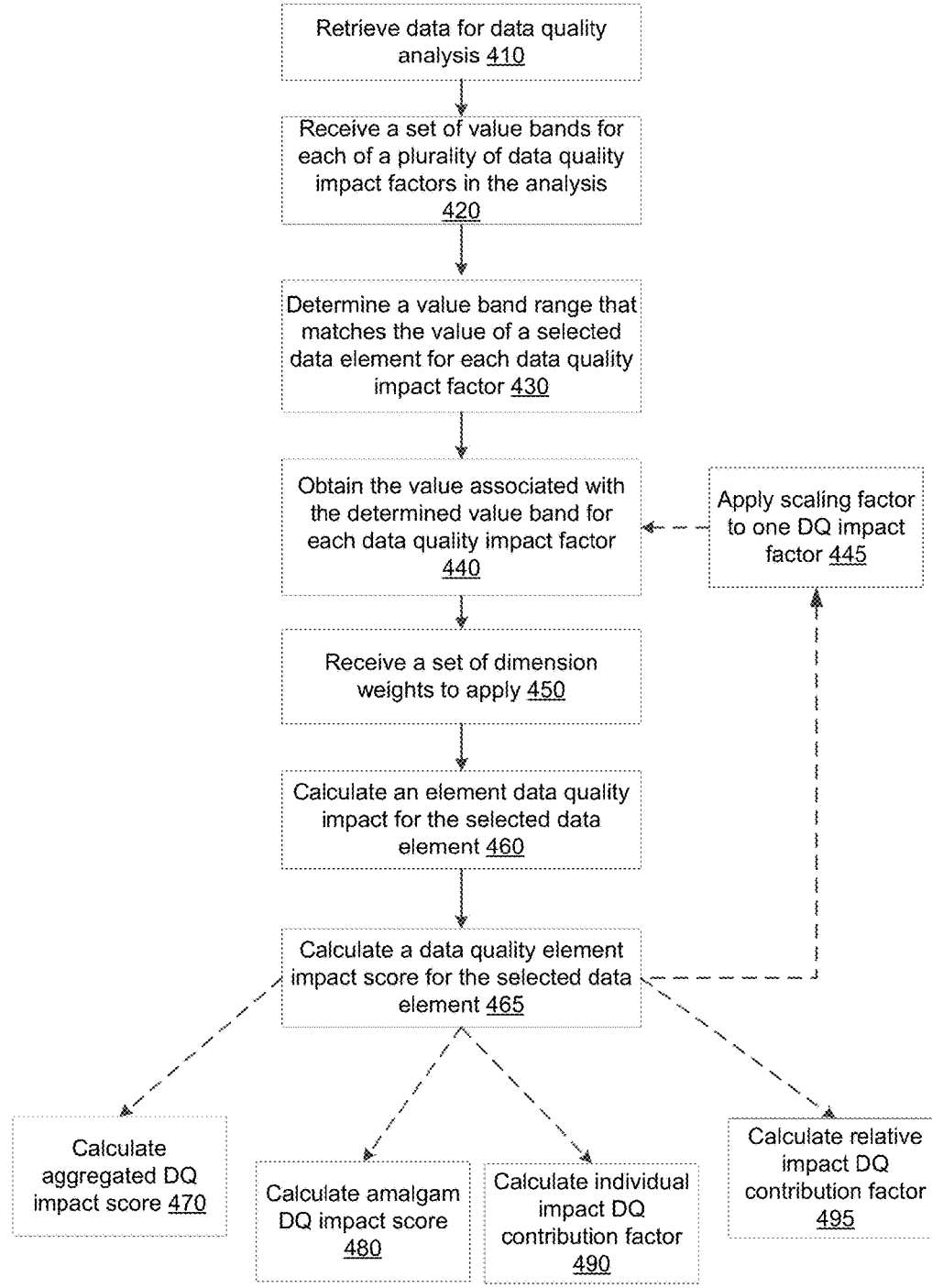
FIG. 4 is a flowchart of a process of determining an impact of a selected data element on enterprise data quality according to one embodiment.

FIG. 4 depicts a flowchart for a method of determining an impact of a selected data element on enterprise data quality according to one embodiment. The method begins with retrieving 410 data comprising a set of data elements for data quality analysis. The set of data elements could be of any size. For example, the method could be used for data elements from all columns in table, for all tables in a database, for all data elements in an entire enterprise, or any other data set.

Next, a set of value bands is received 420 for each of a plurality of data quality impact factors in the analysis, a set of value bands, each value band representing a predetermined range for of the data quality impact factor and an associated value. In one embodiment, the data quality impact factors comprise accuracy, completeness, update status, relevance, consistency across data sources, reliability, appropriate presentation, accessibility, or some subset thereof.

Next the method proceeds by determining 430, for each data quality impact factor for a selected data element from the set of data elements, the value band range that matches the value of the data element. This step is a matching process for each data quality impact factor, using the set of value bands received 420 for the data set. A similar matching occurs for each data quality impact factor. Then, for each data quality impact factor, the value associated with the determined value band is obtained 440. This step is a table lookup corresponding to the determined band of the previous step. A similar lookup occurs for each data quality impact factor, using the set of value bands received 420 for the data set. After this step, all of the values for the data quality impact factors in the analysis are known.

The method then continues by receiving 450 a set of assessment type weights for a selected assessment type, wherein each weight in the set of assessment type weights pairs with a corresponding data quality impact factor. As with the bands and values described above for each data quality impact factor, the selected assessment type is variable, and application of a different assessment type will produce different results. An assessment type, as used here, is the same as described above in conjunction with FIG. 3, i.e., a user's perspective. For example, in an enterprise the various assessment types can include liability, reputation, business interruption, compliance, and customer loss. The assessment type weights are weights applied to the values for the data quality impact factors according to a particular user's perspective.

Then the method determines 460 an element data quality impact for the selected data element according to the selected assessment type by applying the set of assessment type weights to the obtained values for the data quality impact factors to calculate a plurality of data quality impact scores and calculating the element impact as the product of the plurality of data quality impact scores.

In other words, the Element Impact is calculated by the formula:

$$ElementDQImpact = \sum_{i=0}^{n} DQImpactScore_i ElementWeight_i$$

Alternatively, if separate factors and impression metrics are used as in the risk calculations above, the equation would be:

$$ElementDQImpact = NR * NRW * NSF * NSFW \sum_{i=0}^{n} DQImpactScore_i$$

The method further includes, according to one embodiment, calculating 365 a data quality element impact score for the selected data element as the calculated element data quality impact divided by a maximum impact factor, wherein the maximum impact factor is calculated as the product of the set of assessment type weights.

Expressed as a formula, the data quality element impact score is:

$$DQElementImpactScore = \frac{ElementDQImpact}{MaxImpactFact}$$

where MaxImpactFact is calculated as:

$$MaxImpactFact = \sum_{i=0}^{n} DQW_i$$

where DQW is the set of data quality assessment type weights corresponding to the plurality of data quality impact factors.

Alternatively, if separate factors and impression metrics are used as in the risk calculations above, the equation would be:

$$MaxImpactFact = (NRW * NSFW) \sum_{i=0}^{n} DQW_i$$

Another metric that can be calculated using the method is an aggregated data quality impact score, or the data quality associated with a group of objects or data elements. The method can further include, according to one embodiment, calculating 470 an aggregated DQ impact score as the sum, for a subset of data elements in the set of data elements, of the products of the DQ element impact scores for each data element in the subset of data elements and the element impacts for each data element in the subset of data elements, all divided by the sum of the element impacts for each data element in the subset of data elements.

Expressed as a formula, for a group of "N" data elements or objects:

$$AggregatedDQImpactScore = \frac{\sum_{i=0}^{n} DQElementImpactScore_i ElementDQImpact_i}{\sum_{i=0}^{n} ElementDQImpact_i}$$

Similarly, using the same formula, it is possible to create a risk amalgam represents the data quality associated with all DQ impact assessment types, showing an amalgam data impact for the entire enterprise in view of the various assessment types. Thus, the method further includes, according to one embodiment, calculating 480 an amalgam DQ impact score as the sum, for the set of data elements, of the products of the data element DQ impact scores for each data element in the set of data elements and the element DQ impacts for each data element in the set of data elements, all divided by the sum of the DQ element impacts for each data element in the set of data elements.

Expressed as a formula, for the data quality associated with all "N" assessment types:

$$AmalgamDQImpactScore = \frac{\sum_{i=0}^{n} DQElementImpactScore_i ElementDQImpact_i}{\sum_{i=0}^{n} ElementDQImpact_i}$$

Another useful metric that can be used to identify and improve the overall data quality for an organization is to be able to quickly identify the highest contributor to data quality degradation. This could be used to identify priority of corrective and preventive actions.

According to one embodiment, the method further includes calculating 490 an individual DQ impact contribution factor for the selected element as the product of the DQ impact score and the element DQ impact for the selected element, all divided by the sum, for the set of data elements, of the products of the data element DQ impact scores and the element DQ impacts for the set of data elements.

Expressed as an equation, for the data quality contribution of a given data element "m" on a group:

$$IndividualDQContributionFactor = \frac{ImpactDQScore_m ElementDQImpact_m}{\sum_{i=0}^{n} ImpactDQScore_i ElementDQImpact_i}$$

Likewise, a similar metric calculates the data quality contribution of a given data element subset on a full group composed of elements. The method further includes, according to one embodiment, calculating a relative DQ impact contribution factor for a subset of data elements selected from the set of data elements, calculated as the sum, for the subset of data elements, of the products of the data element DQ impact scores and the element DQ impacts for the subset of data elements, all divided by the sum, for the set of data elements, of the products of the data element DQ impact scores and the element DQ impacts for the set of data elements. This calculation could be used to quickly identify the main lineage or proliferation of data quality concerns and best opportunity for remedy.

Expressed as an equation, the data quality contribution of a given data element subset composed of "M" elements on a full group composed of "N" elements:

$$RelativeDQContributionFactor = \frac{\sum_{i=0}^{n} ImpactDQScore_i ElementDQImpact_i}{\sum_{i=0}^{n} ImpactDQScore_i ElementDQImpact_i}$$

The data quality contribution calculation could be extended to optimize the remediation action selection and prioritization to get the highest factor affecting data quality. For example, once identified, remedial factors could be introduced associated with the identified remediation actions. Using the new set of factors, a "what if" analysis could be executed to evaluate the benefit of remediation actions on the overall data quality.

For example, the method could further include, according to one embodiment, determining 445 a remedial data element impact score by creating a scaling factor corresponding to one of the plurality of DQ impact factors, adding the scaling factor to the plurality of DQ impact factors for an updated analysis, and then calculating the remedial data element DQ impact score for the selected data element by including the scaling factor in an updated calculation 465 of the data element DQ impact score to determine the remedial effect of scaling the one of the plurality of DQ impact factors by the scaling factor. In one example, the scaling factor can be a negative value of the one of the plurality of DQ impact factors. When the negative value is applied, it zeroes out the impact of that DQ factor. Then the data element DQ impact score could be re-calculated to see what impact eliminating the factor would have on the overall risk. Similarly, other scaling factors could be used. For example, a negative one-half value of the identified remedial factor could identify the impact of cutting the data quality degradation from a particular impact factor in half.

Sensitive Data Identification and Protection

Figure 7:
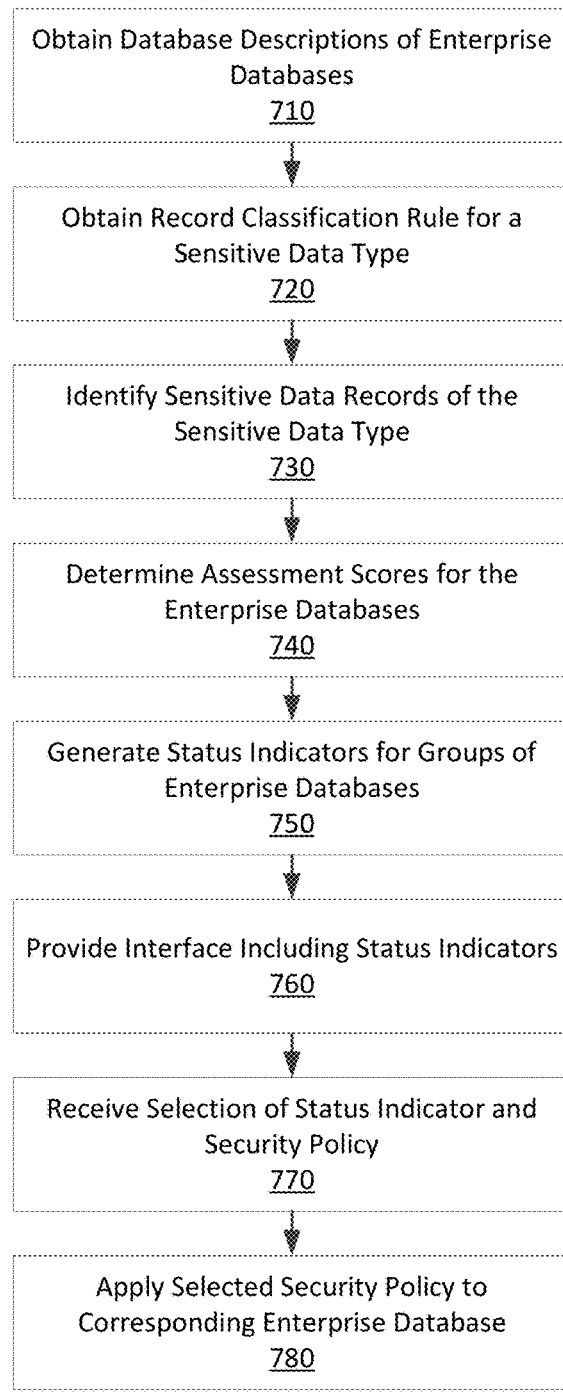
FIG. 7 is a flowchart of an example process for identifying and securing sensitive data, in accordance with an embodiment.

FIG. 7 is a flowchart of an example process for identifying and securing sensitive data, in accordance with an embodiment. The process described herein may be performed in a different order or using different, fewer, or additional steps. For example, steps described as being performed sequentially may be performed in parallel.

The data management service 130 obtains 710 database descriptions of enterprise databases 120, where a database description indicates a database attribute of an enterprise database 120. The data management service 130 obtains 720 a record classification rule for a sensitive data type, where the record classification rule specifies at least one field type.

The classification engine 134 identifies 730 sensitive data records of the sensitive data type by identifying data records having the at least one field type specified by the record classification rule. The assessment module 136 determines 740 assessment scores for the enterprise databases 120. An assessment score may be determined from a number of identified sensitive data records in the corresponding database.

The user interface module 137 generates 750 status indicators for groups of enterprise databases 120 each having a common database attribute. A status indicator for an enterprise group reflects a total number of identified sensitive data records in enterprise databases 120 having membership in the enterprise group. The user interface module provides 760 an interface comprising the generated status indicators.

The data management service 130 receives 770 via the user interface a selection of one of the generated status indicators and a selection of a protection policy. The security engine 138 applies 780 the selected protection policy to sensitive data records of an enterprise database 120 having membership in the enterprise group corresponding to the selected status indicator.

Example Interface

FIG. 8A is an example interface illustrating database attributes of an enterprise database 120, in accordance with an embodiment. The properties include a name and description of the database (as used within the data management service 130) as well as database configuration properties such as database type, connectivity (e.g., IP (internet protocol) address, port number, service name, domain name), and access credentials (e.g., connection string, username, password). The database attributes include an associated location and enterprise groupings (e.g., application group, security group, department).

Figure 8C:
FIG. 8C is an example interface for obtaining attributes of an enterprise database, in accordance with an embodiment.

FIGS. 8B and 8C are example interfaces for obtaining attributes of an enterprise database 120, in accordance with an embodiment. Some or all of the properties listed in FIG. 8C may be relevant to specific repository and/or data store types selected in FIG. 8B. Accordingly, the selection of a repository and/or data store type in FIG. 8B prompts the UI generator 137 to display additional database attributes specific to the data store and/or repository type.

Figure 9A:
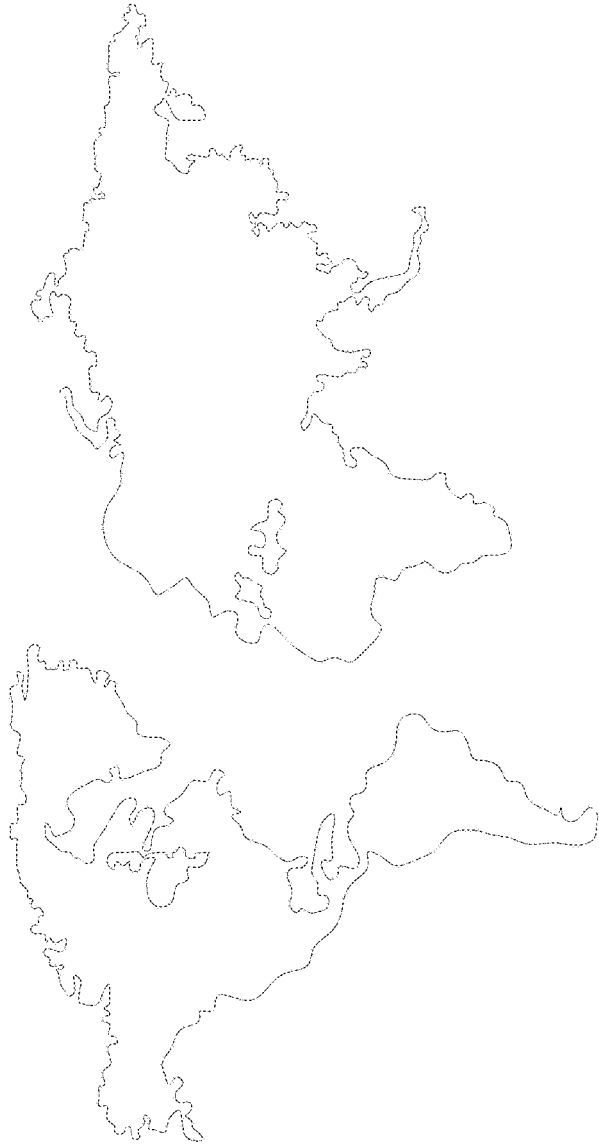
FIG. 9A is an example interface for obtaining attributes of a location, in accordance with an embodiment.

FIG. 9A is an example interface for obtaining location attributes of a location, in accordance with an embodiment. The location attributes include a name and description for use within the data management service 130 as well as specification of geographic locations (e.g., region, country, state, city) of varying specificity. The location attributes also include an expression field for entering a pattern in IP or other network address, which the data management service 130 may use to determine a location of the enterprise database 120.

Figure 9B:
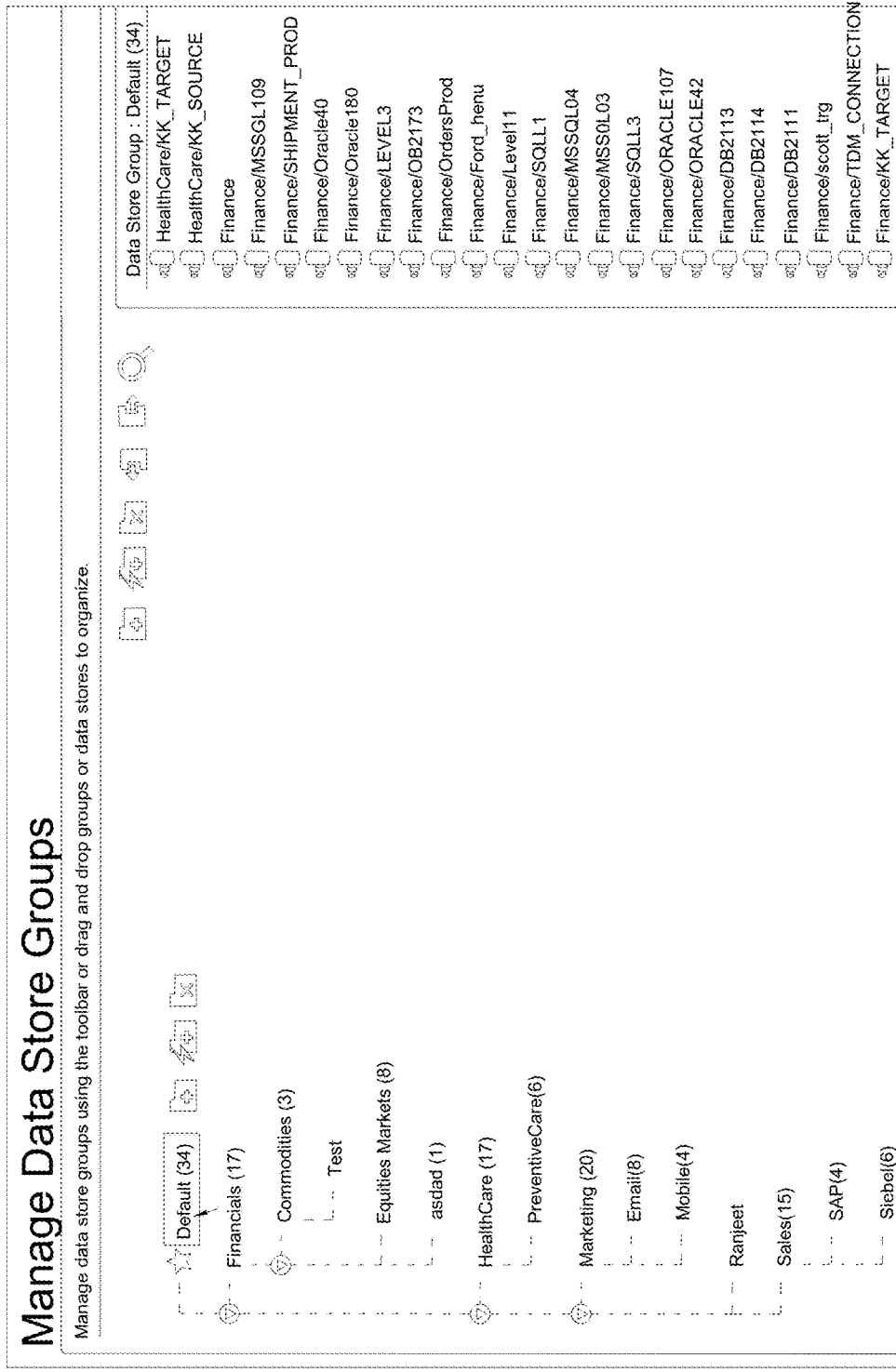
FIG. 9B is an example interface for associating an enterprise database with an enterprise group, according to an embodiment.

FIG. 9B is an example interface for associating an enterprise database 120 with an enterprise group, according to an embodiment. Using the tree menu on the left, a user may add, modify, and delete enterprise groups. The user may also specify sub-group relationships of enterprise groups. For example, the enterprise groups "commodities" and "equities markets" are part of the "financials" enterprise group. By dragging and dropping the enterprise databases 120 listed on the right to an enterprise group, the user may associate the enterprise database 120 with the selected enterprise group (and any enterprise groups including the selected enterprise group).

Figure 10A:
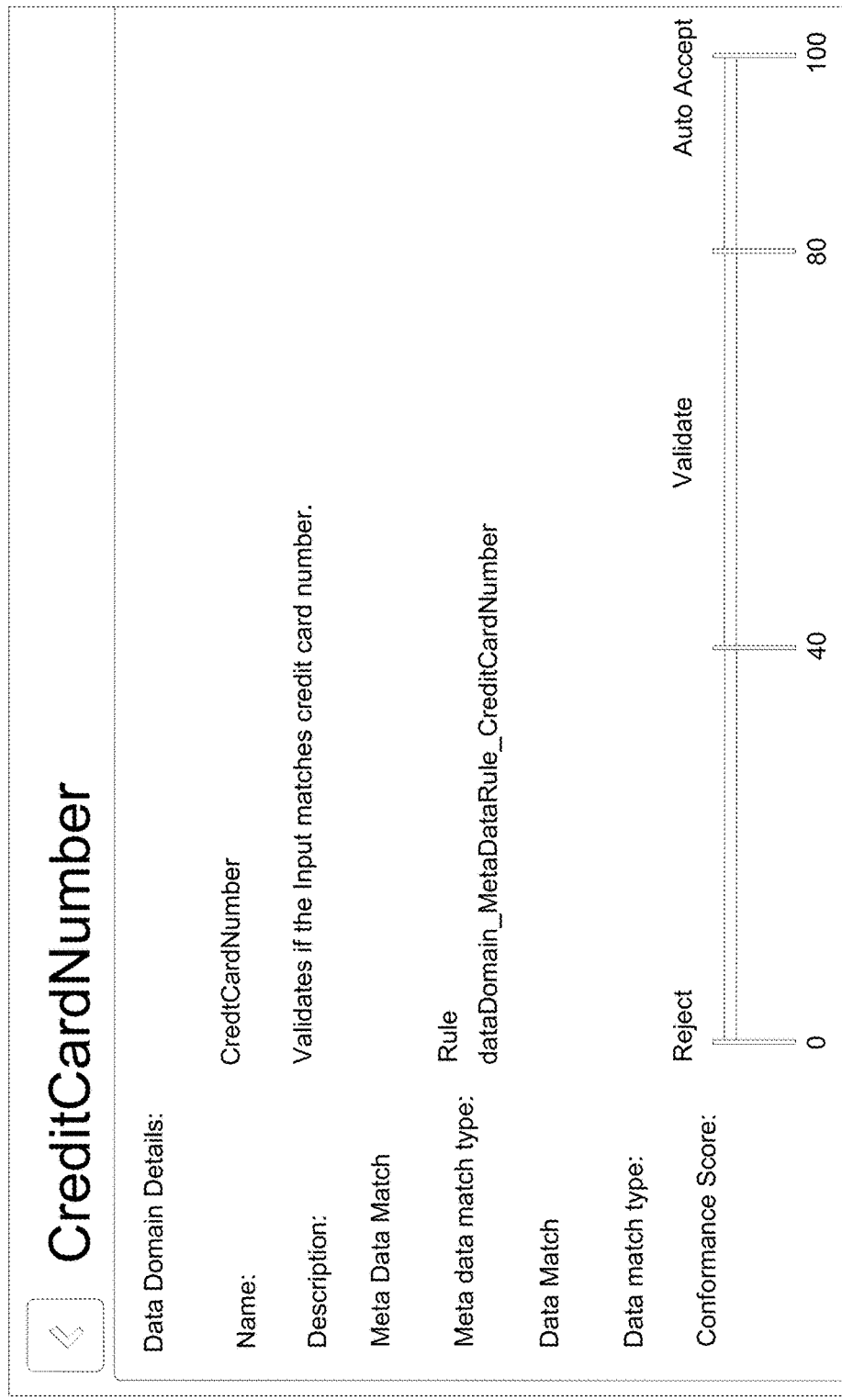
FIG. 10A is an example interface illustrating properties of a field classification rule, in accordance with an embodiment.

FIG. 10A is an example interface illustrating properties of a field classification rule, in accordance with an embodiment. The field classification rule includes a name and description for use within the data management service 130 as well as conditions for the field classification rule. In this case, the field is classified as having a credit card number type if the metadata of the header matches metadata specified by a selected rule. FIGS. 10B and 10C are example interfaces for configuring a field classification rule, in accordance with an embodiment. In FIG. 10B, the user may select a metadata match condition using the header metadata (e.g., using the header type classifier 205). The metadata may be compared against a user entered pattern (in the text box) or a standard reference table or rule (e.g., created by the data management service 130 to streamline the user's workflow). In FIG. 10C, the user may select a data match condition using sampled fields (e.g., using the data sampling classifier 210). When using sampled fields, the user may select rejection and validation thresholds. The user may also select data sampling options such as number of sampled fields and sampling method (e.g., first, last, uniform, random). The user also selects a pattern, reference table, or standard rule for comparison against the sampled fields.

FIG. 11A is an example interface illustrating example record classification rules, in accordance with an embodiment. The interface summarizes a number of field types ("Domains") specified by each record classification rule, a number of enterprise databases 120 having the sensitive data type of each record classification rule, and a number of scans identifying sensitive data using each record classification rule.

FIGS. 11B and 11C are example interfaces for configuring a record classification rule, in accordance with an embodiment. In FIG. 11B, the user indicates a name, description, record cost, and sensitivity level associated with the classification rule. The user also selects one or more field types used by the classification rule. In FIG. 11C, the user indicates the Boolean logic for combining the field types such as match any (OR), match all (AND), or match a custom combination. To specify the custom combination of Boolean logic, the user selects field types and specifies Boolean operators for determining whether data records have the sensitive data type.

Figure 11D:
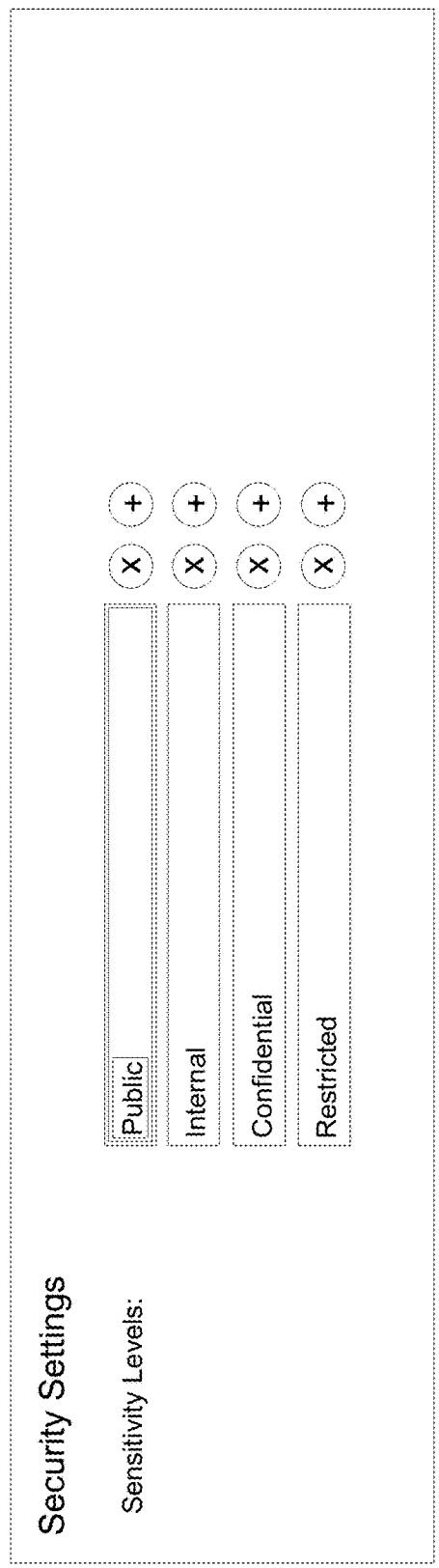
FIG. 11D is an example interface for configuring sensitivity levels, in accordance with an embodiment.

FIG. 11D is an example interface for configuring sensitivity levels, in accordance with an embodiment. The user may specify different names for the sensitivity levels as well as modify the number of sensitivity levels used. The least sensitive level is listed at top ("Public") and the most sensitive level is listed at bottom ("Restricted).

FIG. 8A is an example interface illustrating example data scans, in accordance with an embodiment. The interface summarizes a number of field types ("Domains") queried in each scan, a number of enterprise databases 120 queried in each scan, and a number of record classification rules checked in each scan as well as a scan status. A failed scan may have failed due to access problems in a specified enterprise database 120, for example.

FIGS. 8B through 8D are example interfaces for configuring a data scan, in accordance with an embodiment. In FIG. 8B, the user enters a name, description, and repository type for the scan, and the user selects enterprise databases 120 to scan. In FIG. 8C, the user selects the record classification rules checked in the scan. In FIG. 8D, the user schedules the scan (e.g., run upon creation, run at a scheduled time, run at a recurring time).

FIG. 13A is an example interface illustrating example alert rules, in accordance with an embodiment. The interface lists the number of alert rule conditions, a severity of the alert rule, an action to take, and a frequency with which the access monitoring module 139 scans enterprise databases 120 with the alert rule.

Figure 13C:
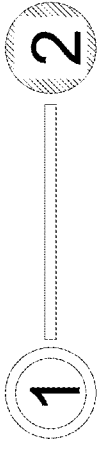
FIG. 13C is an example interface for configuring an alert rule, in accordance with an embodiment.

FIGS. 13B and 13C are example interfaces for configuring an alert rule, in accordance with an embodiment. In FIG. 13B, the user enters a name, description, and severity band for the alert rule. The severity band may be used to prioritize (e.g., sort) alerts generated by alert rules for review by an administrator. The user also specifies one or more alert conditions. An alert condition includes a database attribute or data characteristic and an operator for determining whether the alert condition evaluates to true. If the user specifies multiple alert conditions, then the alert rule generates an alert for enterprise databases 120 meeting the multiple alert conditions. In FIG. 13C, the user schedules checking of the alert rule (e.g., run upon creation, run at a scheduled time, run at a recurring time). The user also selects one or more consequences of the rule (e.g., email notification, push notification on a native application on a mobile device).

FIG. 13D is an example interface illustrating an alert generated by an alert rule, in accordance with an embodiment. The alert lists enterprise database 120 meeting the alert conditions as well as characteristics of the alert (e.g., severity, scan name). For each identified enterprise database 120, the interface lists a risk score (e.g., determined by the risk score module 240), a protection status (e.g., determined by the protection status module 230), a sensitivity of data on the enterprise database 120 (e.g., determined from the sensitive data type), a data cost score (e.g., determined by the cost score module 235), and a user in charge.

FIG. 14 is an example interface for configuring calculation of risk scores, in accordance with an embodiment. Using the sliders, a user may indicate numerical weighting for the different risk factors including sensitivity level, protection status (e.g., determined by the protection status module 230), number of fields including sensitive data (e.g., indicated by a data classification rule and determined by the classification engine 134), number of sensitive data records (e.g., determined by the classification engine 134), number of dependent databases ("targets") (e.g., determined by the proliferation tracking module 136), and cost score (e.g., determined by the cost score module 235). The pie chart at right indicates relative weighting of the risk factors (e.g., in terms of the raw weighting values or in terms of percentages of the total weighting values).

Figure 15A:
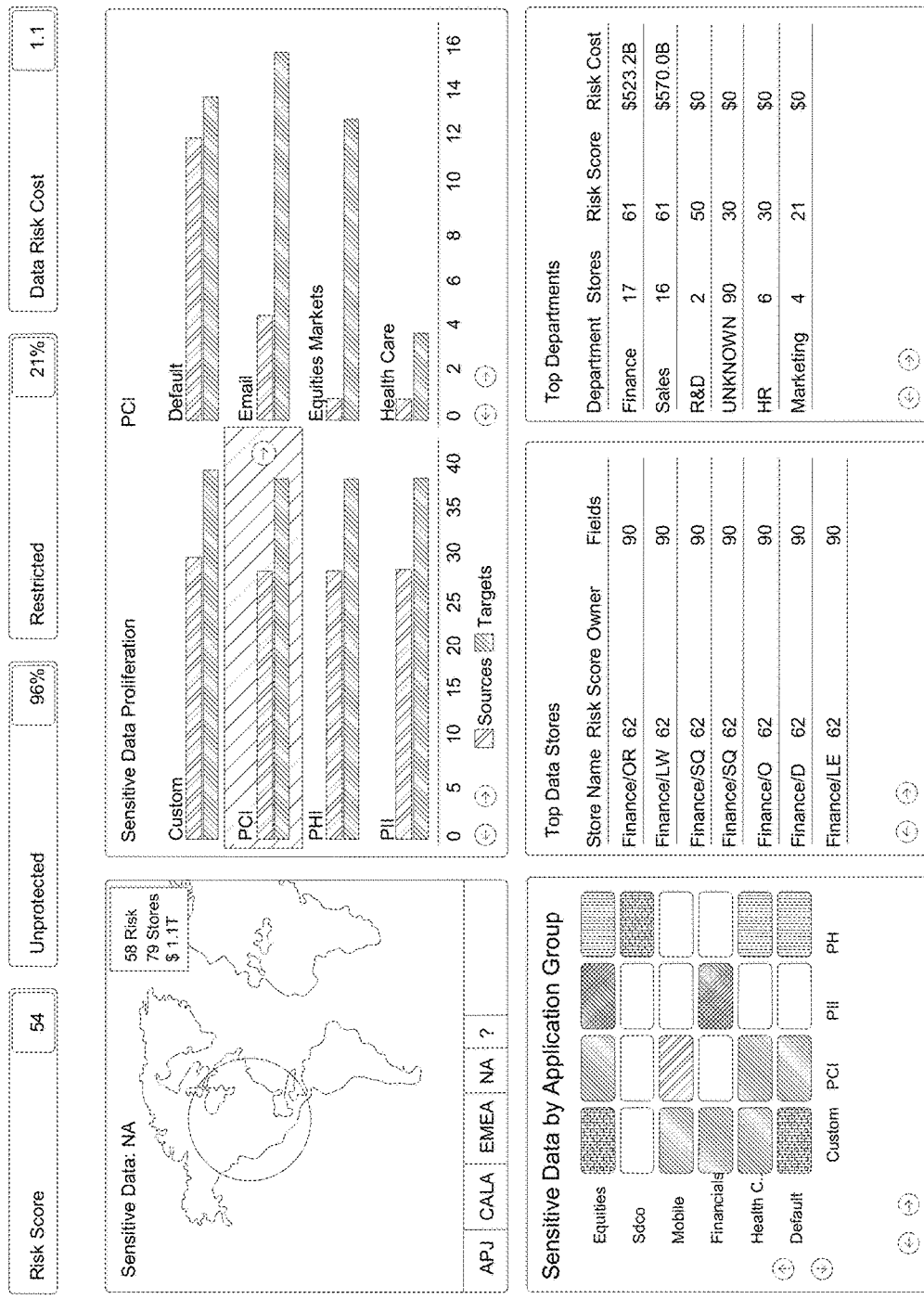
FIG. 15A is an example interface illustrating a status overview of enterprise databases, in accordance with an embodiment.

FIG. 15A is an example interface illustrating a status overview of enterprise databases 120, in accordance with an embodiment. The status overview includes a location display (e.g., generated by the location display module 270), a grid (e.g., from the grid generation module 260), and charts (e.g., from the chart generation module 255). The location display includes aggregate status indicators (e.g., cost score, risk score, total databases) for enterprise database 120 in a particular location (e.g., North America), but other locations may be specified using the buttons below the map. The grid is a chart where each aggregate status indicator corresponds to data filtered by sensitive data type and enterprise group (filtering dimensions), and where color of the aggregate status indicators corresponds to risk score or proportion of sensitive data records (the assessment dimension). Using the arrows, the user may scroll to view aggregate status indicators for other enterprise groups or sensitive data types that don't fit within the displayed gird. The bar charts indicate relative number of source databases and dependent databases having different sensitive data types (a first filtering dimension at left), or belonging to different enterprise groups (a second filtering dimension at right). As illustrated, the user has selected the aggregate status indicator for PCI. In response, the scope of the charts on the right has changed to include only enterprise databases 120 having sensitive data of the PCI type. Using the arrows, the user may view aggregate status indicators for other values of the filtering dimensions of the bar charts. The bottom middle display indicates enterprise databases 120 having a highest risk score. The bottom right displays numerical aggregate status indicators for the filtering dimension of enterprise group and the assessment dimensions of total databases, risk score, and cost score. The aggregate status indicators are ranked by the aggregate assessment scores (risk score, cost score, or both).

Figure 15B:
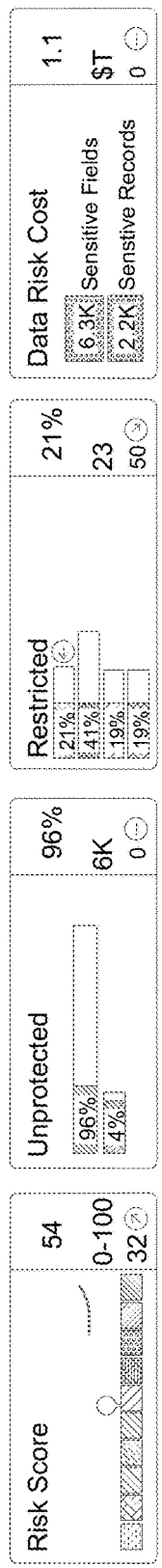
FIG. 15B is a close-in view of expandable elements of the status overview illustrated in FIG. 15A, in accordance with an embodiment.

FIG. 15B is a close-in view of expandable elements of the status overview illustrated in FIG. 15A, in accordance with an embodiment. The illustrated elements may be viewed by selecting the aggregate status indicators determined for all enterprise databases 120 at the top of the interface of FIG. 15A. The aggregate status indicators include bar graphs, numerical statistics, and temporal trends in aggregate assessment scores (risk score, proportion of unprotected sensitive data, and cost score). The arrows and numbers at the bottom right of each box indicate a percentage change from a recent time period (e.g., the last month).

Figure 15C:
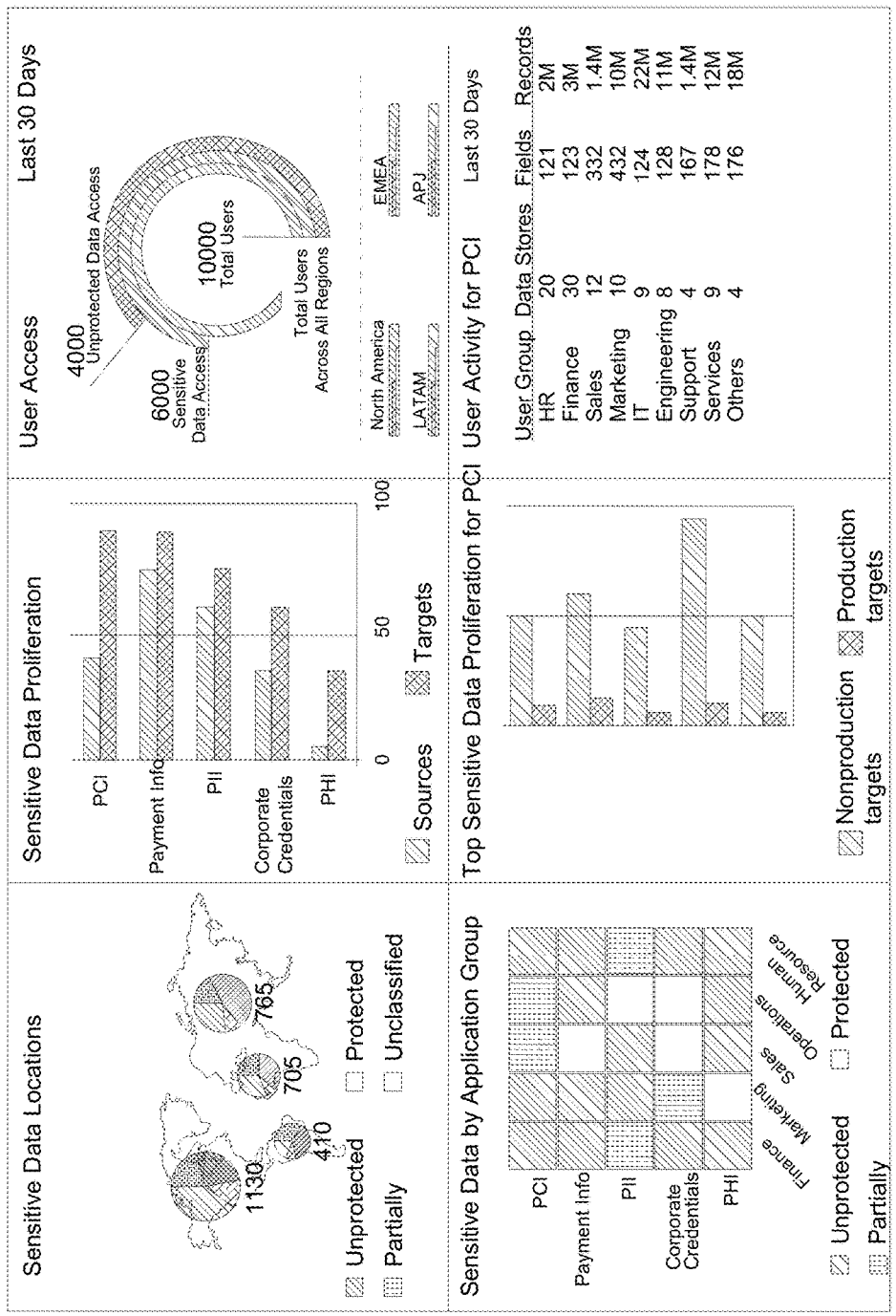
FIG. 15C is another example interface illustrating a status overview of enterprise databases, in accordance with an embodiment.

FIG. 15C is another example interface illustrating a status overview of enterprise databases 120, in accordance with an embodiment. The other example interface includes similar elements to the interface illustrated in FIG. 15A. Instead of risk scores, the assessment score is a categorization of an enterprise database's sensitive data records as protected, partially protected, protected, or unclassified (e.g., due to failure to scan for sensitive data). Another assessment dimension used in the upper-right chart is an aggregated total number of users having access to data, as determined for the filtering dimension of access to any data, sensitive data, and unprotected sensitive data. Alternatively or additionally, the upper-right chard indicates a total number of access operation to unprotected data, a total number of access operations to sensitive data, and a total number of access operations overall. Similarly, the lower-right table indicates a number of enterprise databases 120, a total number of sensitive data fields, and a total number of sensitive data records accesses by users in various enterprise groups, in this case departments.

Figure 16:
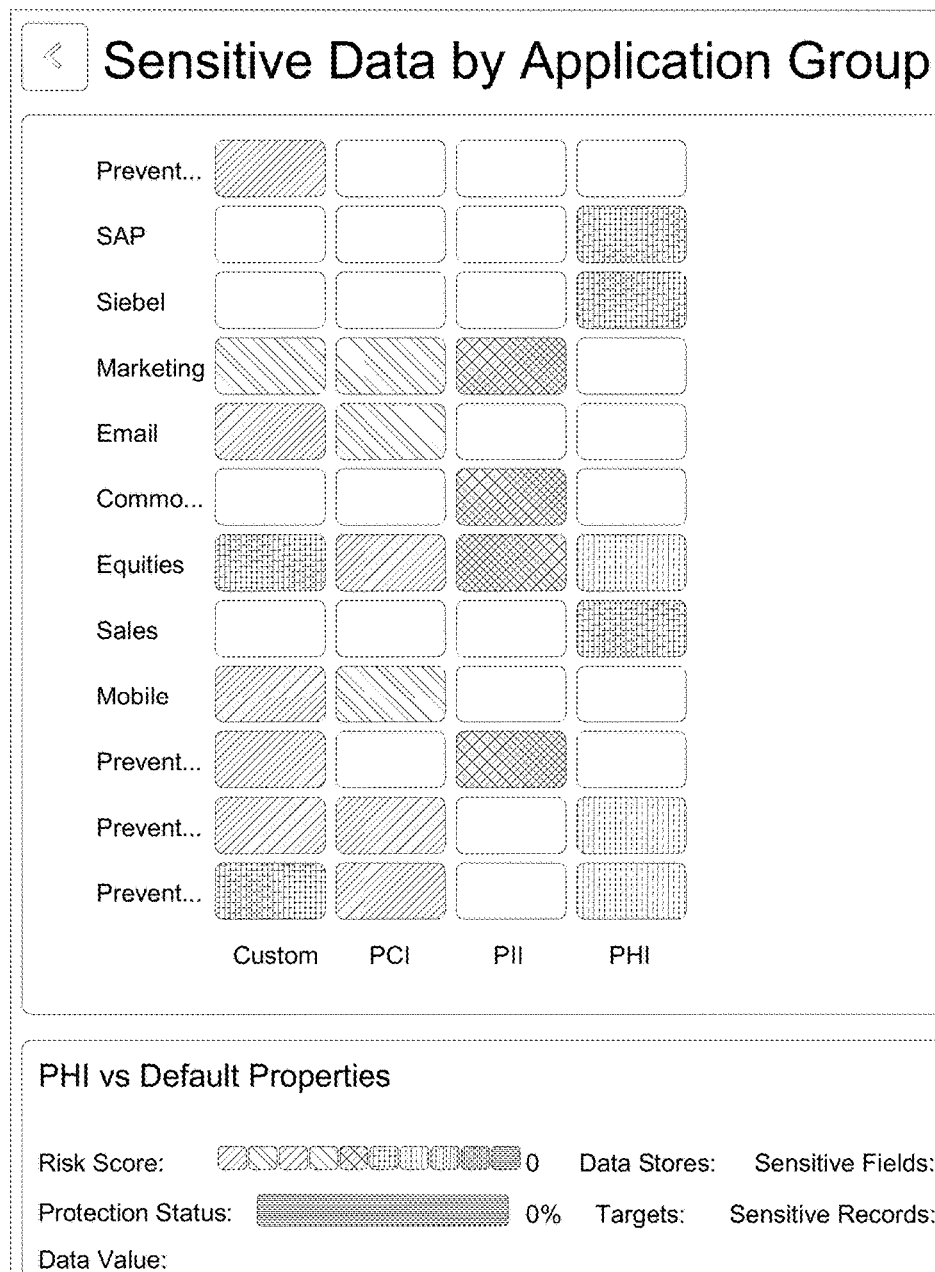
FIG. 16 is an example interface including a grid view of status indicators, in accordance with an embodiment.

FIG. 16 is an example interface including a grid view of status indicators, in accordance with an embodiment. The grid is a chart where each aggregate status indicator corresponds to data filtered by sensitive data type and enterprise group (filtering dimensions), and where color of the aggregate status indicators corresponds to risk score or the proportion or number of sensitive data records (the assessment dimension). By selecting an aggregate status indicator (e.g., for the enterprise group "Default" and the sensitive data type PHI), the user may view additional aggregate status indicators (risk score, protection status, cost score, other risk factors) generated using a chart scope of the selected enterprise group and sensitive data type.

Figure 17:
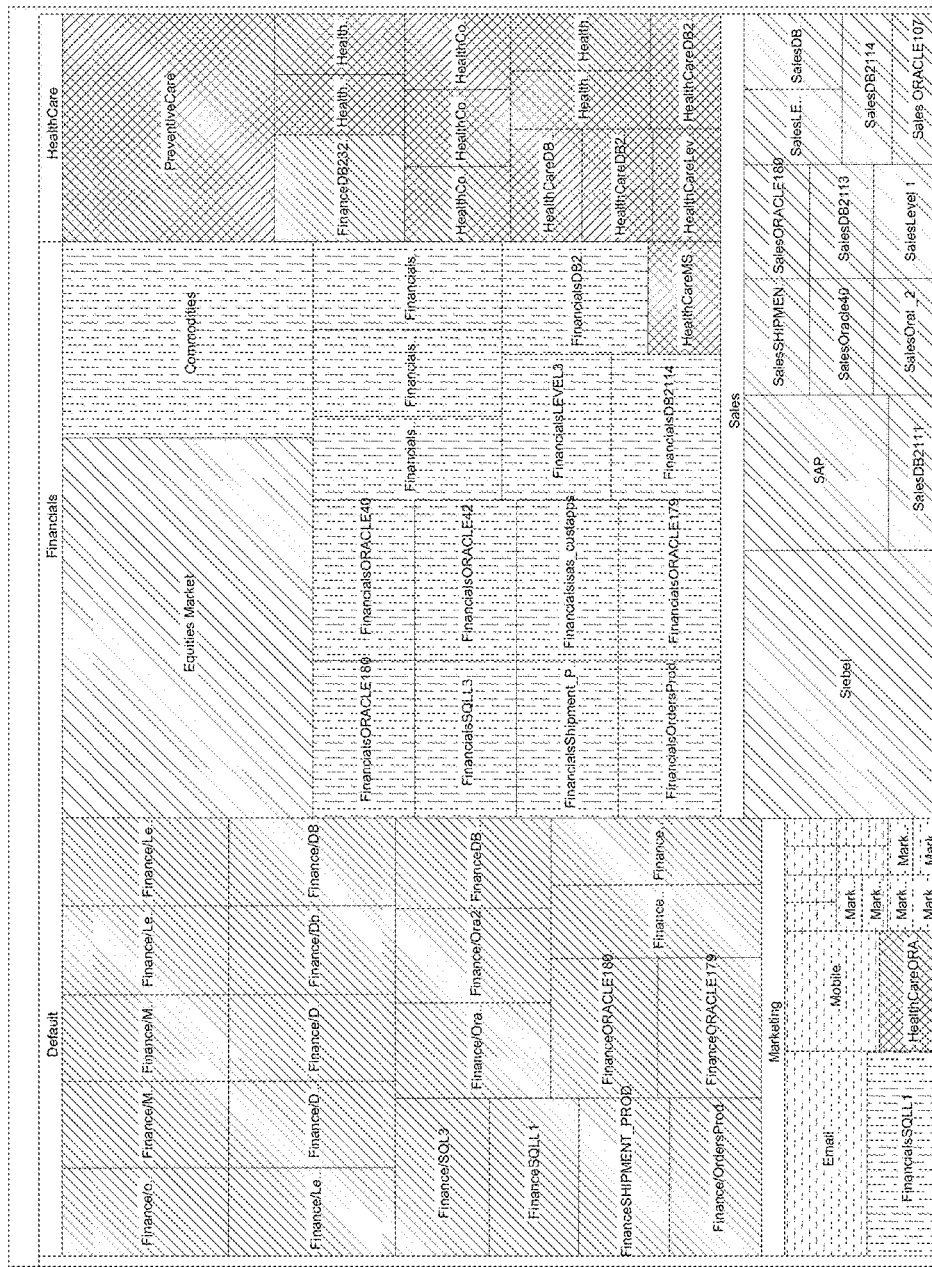
FIG. 17 is an example interface including a heat map of status indicators, in accordance with an embodiment.

FIG. 17 is an example interface including a heat map of status indicators, in accordance with an embodiment. The filter dimension for the heat map is enterprise grouping (e.g., department). The heat map includes status indicators corresponding to databases in the enterprise grouping. The status indicators for databases having a common department are grouped under blocks. The assessment dimensions are the number of sensitive data records (reflected in the size of the respective status indicators) and the risk score (reflected in the color of the respective status indicators).

Figure 18A:
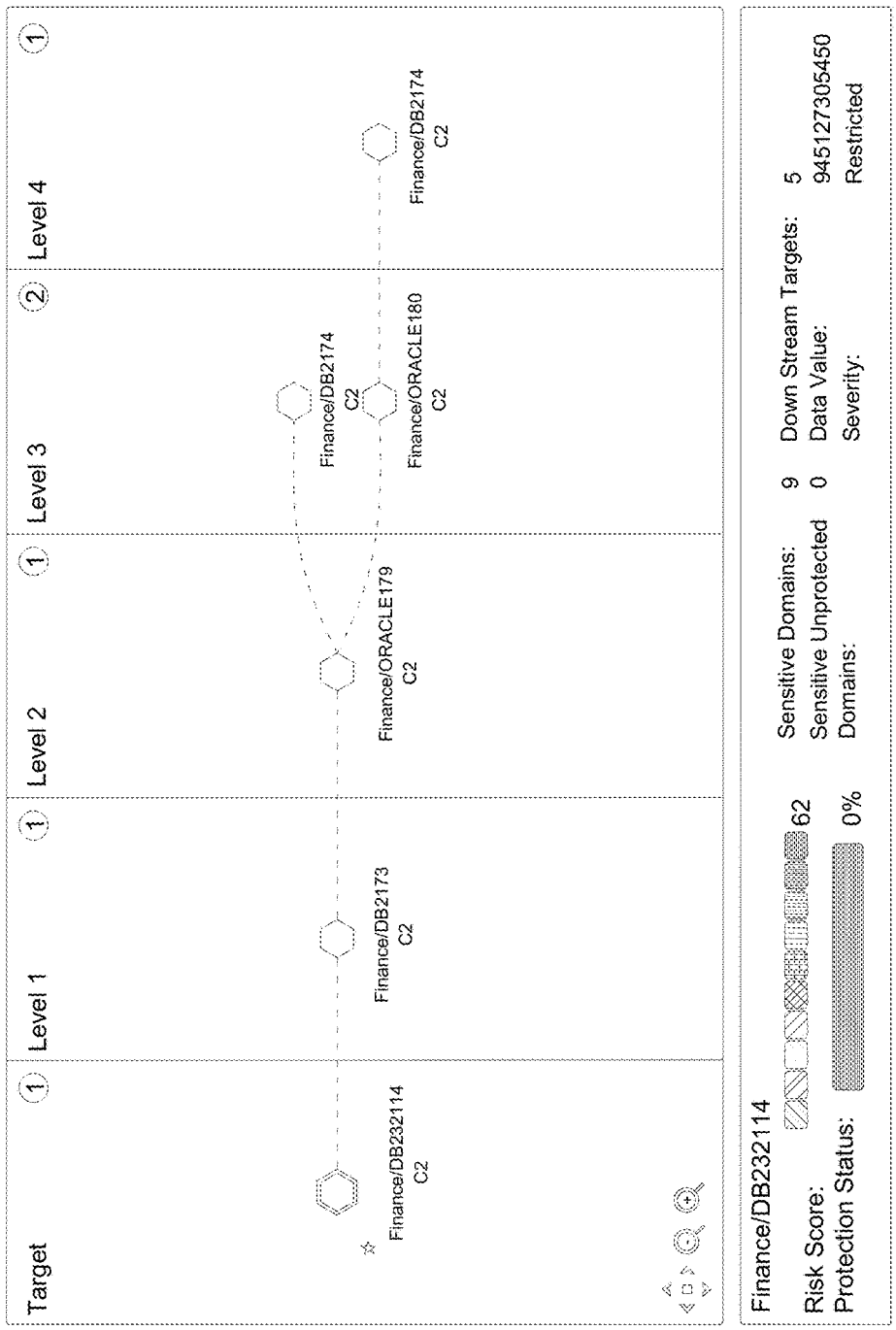
FIG. 18A is an example interface including a lineage view of enterprise databases, in accordance with an embodiment.

FIG. 18A is an example interface including a lineage view of enterprise databases 120, in accordance with an embodiment. The status indicator of the source database is indicated at the far left, and various layers of dependent databases are illustrated with status indicators from left to right in order of increasing layers of dependence. The lines between the status indicators indicate dependency relationships between the corresponding enterprise databases 120. The status indicators have colors indicating protection status. Selection of a status indicator corresponding to an enterprise database 120 prompts the interface to update the status indicators at bottom (i.e., by changing the chart scope to the selected enterprise database 120. The status indicators at the bottom have assessment dimensions including risk score, protection status, and other risk factors.

Figure 18B:
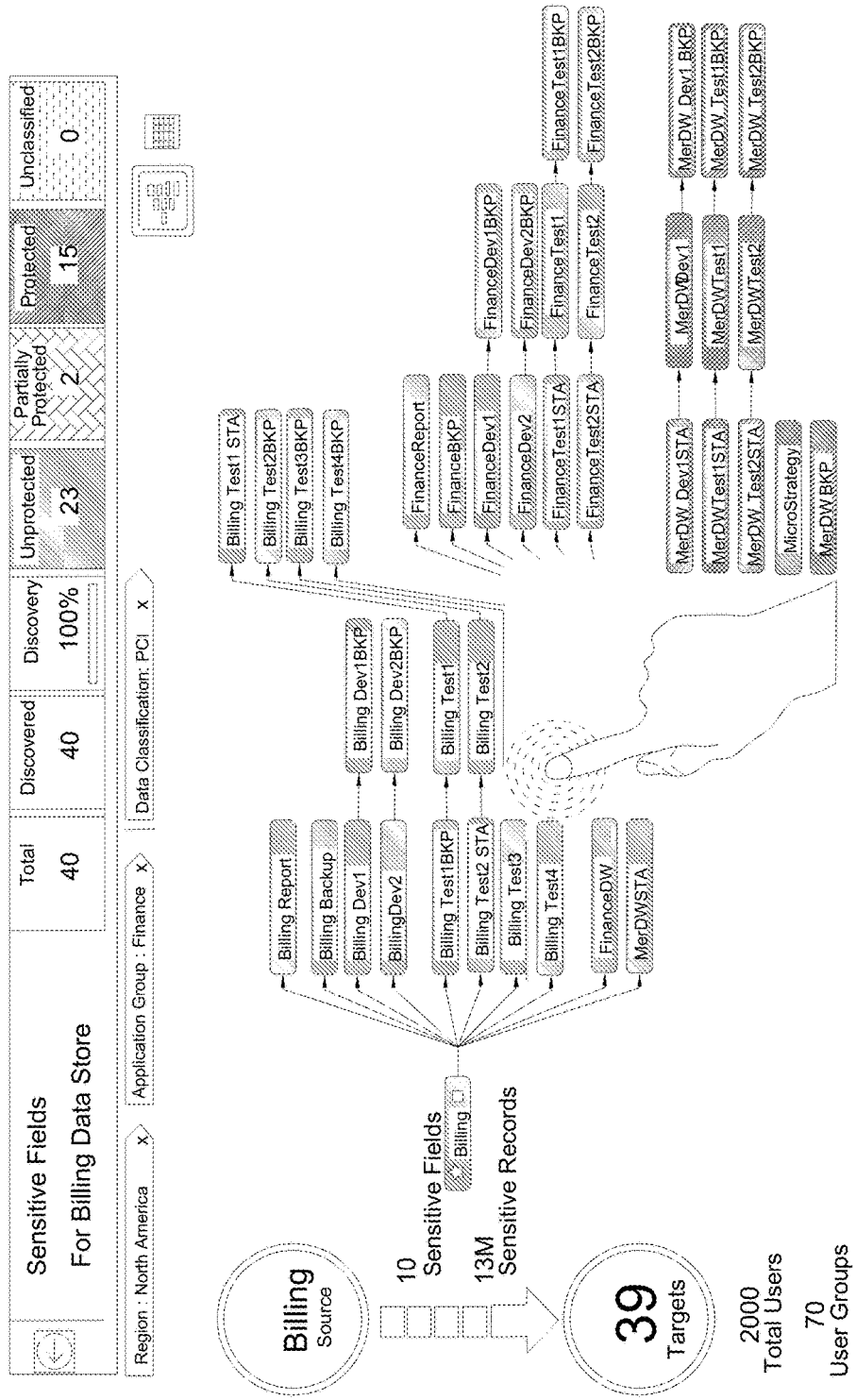
FIG. 18B is another example interface including a lineage view of enterprise databases, in accordance with an embodiment.

FIG. 18B is another example interface including a lineage view of enterprise databases 120, in accordance with an embodiment. The left side includes aggregate status indicators (e.g., number of sensitive fields, number of sensitive data records, number of dependent databases, users able to access the sensitive data records, number of user groups able to access the sensitive data records) for the enterprise databases 120 corresponding to the displayed status indicators.

Figure 18C:
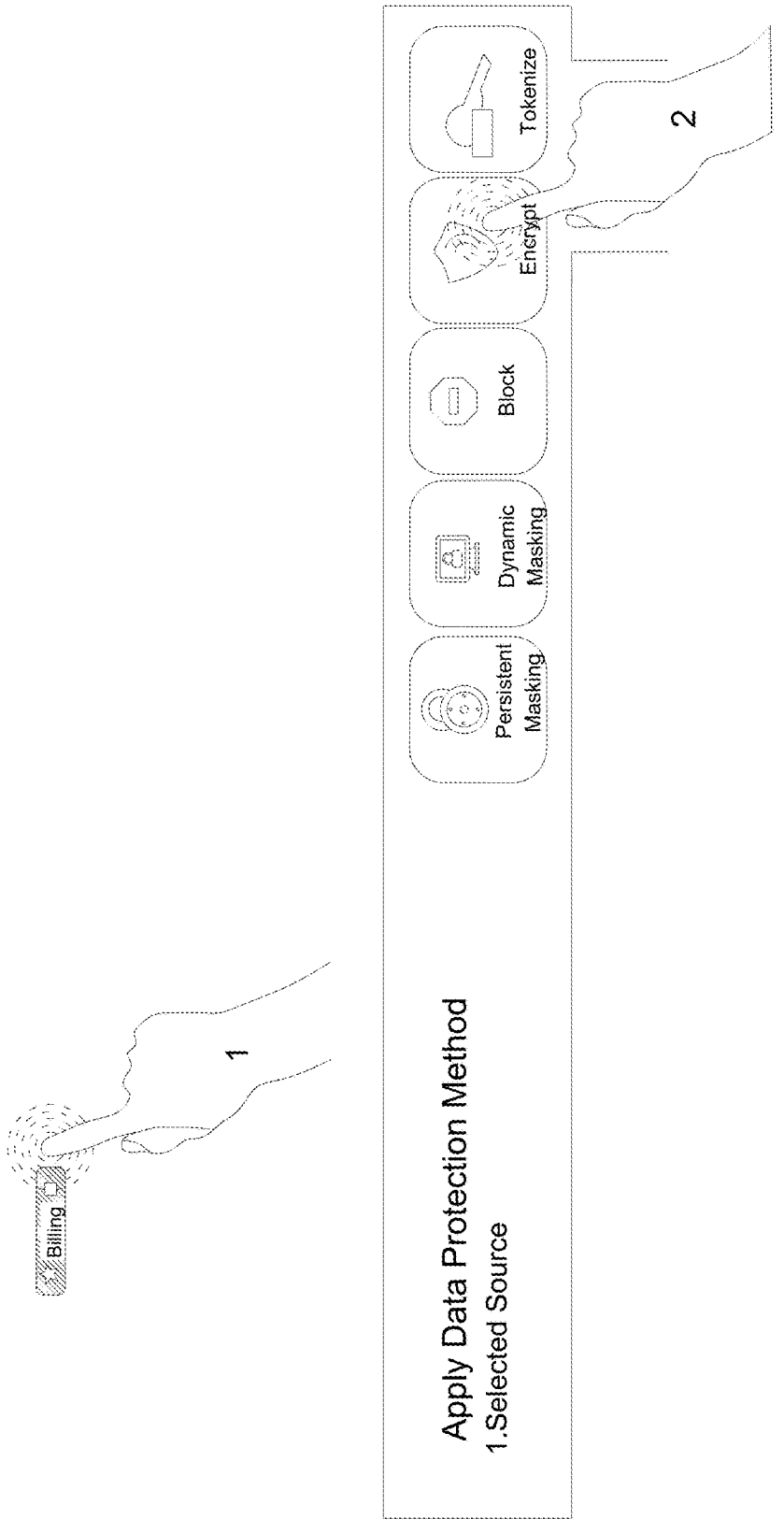
FIG. 18C is an example interface for applying a protection policy to a source database selected from the lineage view illustrated in FIG. 18B, in accordance with an embodiment.
Figure 18D:
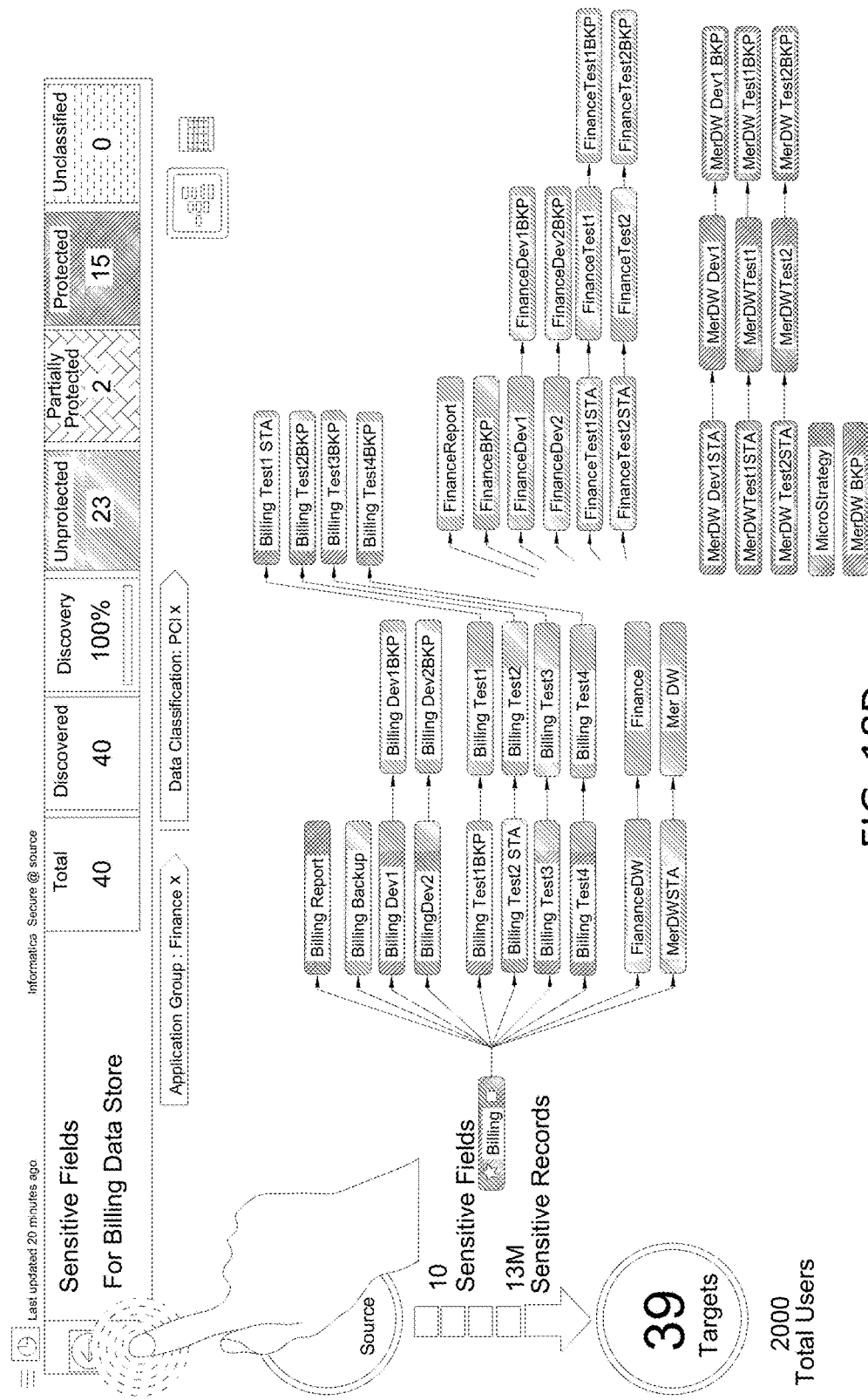
FIG. 18D is an example interface illustrating a change in status indicators included in the lineage view illustrated in FIG. 18B as a result of applying a protection policy, in accordance with an embodiment.

FIG. 18C is an example interface for applying a protection policy to a source database selected from the lineage view illustrated in FIG. 18B, in accordance with an embodiment. In response to the user selecting the source database (step 1), the interface displays a menu of protection policies. The user selects a protection policy from the menu (step 2). FIG. 18D is an example interface illustrating a change in status indicators included in the lineage view illustrated in FIG. 18B as a result of applying a protection policy, in accordance with an embodiment. Due to the dynamic masking applied at the source database, the protection status of the source database has changed to protected. Meanwhile, the databases dependent on the source database have become partially protected as the protected data proliferates through the dependent databases.

Figure 19A:
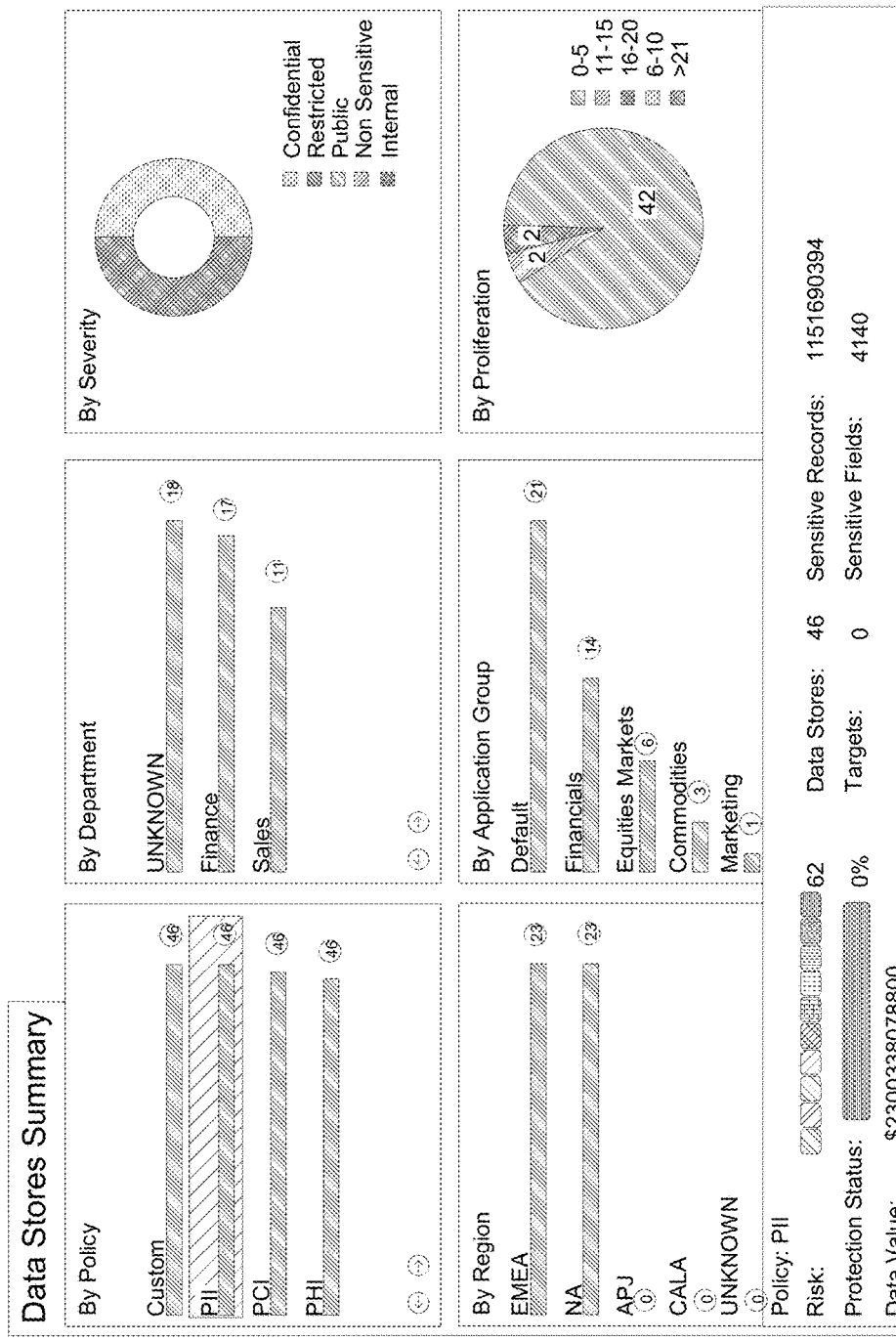
FIG. 19A is an example interface illustrating filterable status indicators of enterprise databases, in accordance with an embodiment.

FIG. 19A is an example interface illustrating filterable status indicators of enterprise databases 120, in accordance with an embodiment. The interface includes several charts with different filtering dimensions including sensitive data type, enterprise grouping, location region, and application group. The four leftmost charts have an assessment dimension of risk score. The charts at right do not have a filtering dimension but instead indicate aggregate assessment scores for an assessment dimension such as sensitivity level and number of dependent databases. Selecting one of the aggregate status indicators of the chart (in this case PII) causes the chart scope of the other five charts to include only enterprise databases 120 that store PII-type sensitive data. Additionally, selecting one of the aggregate status indicators of the chart (in this case PII) causes the chart scope of the other charts to include the database attribute or data characteristic corresponding to the selected aggregate status indicator. Accordingly, the aggregate status indicators are regenerated according to the new chart scope (in this case PII).

Figure 19B:
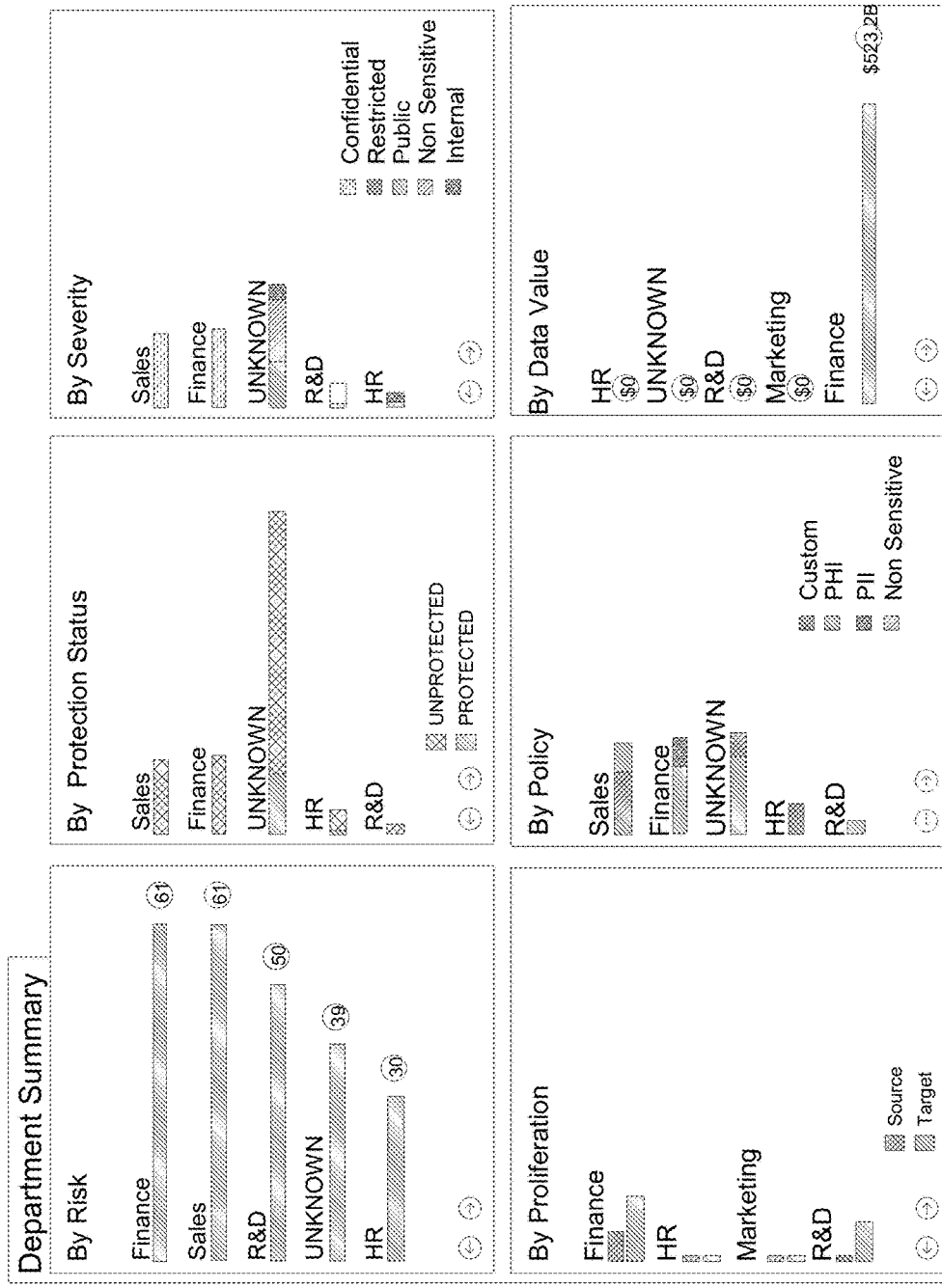
FIG. 19B is an example interface illustrating filterable status indicators of databases in enterprise groups, in accordance with an embodiment.

FIG. 19B is an example interface illustrating filterable status indicators of databases in enterprise groups, in accordance with an embodiment. FIG. 19B illustrates six bar charts each having an enterprise group filter dimension. The assessment dimension for the six charts correspond to risk score, protection status, sensitivity level, number of source databases and dependent databases, number of databases having different sensitive data types, and cost score. The assessment dimension is reflected in the width of the colored bar corresponding to a value of the filter dimension for the bar chart.

Figure 20A:
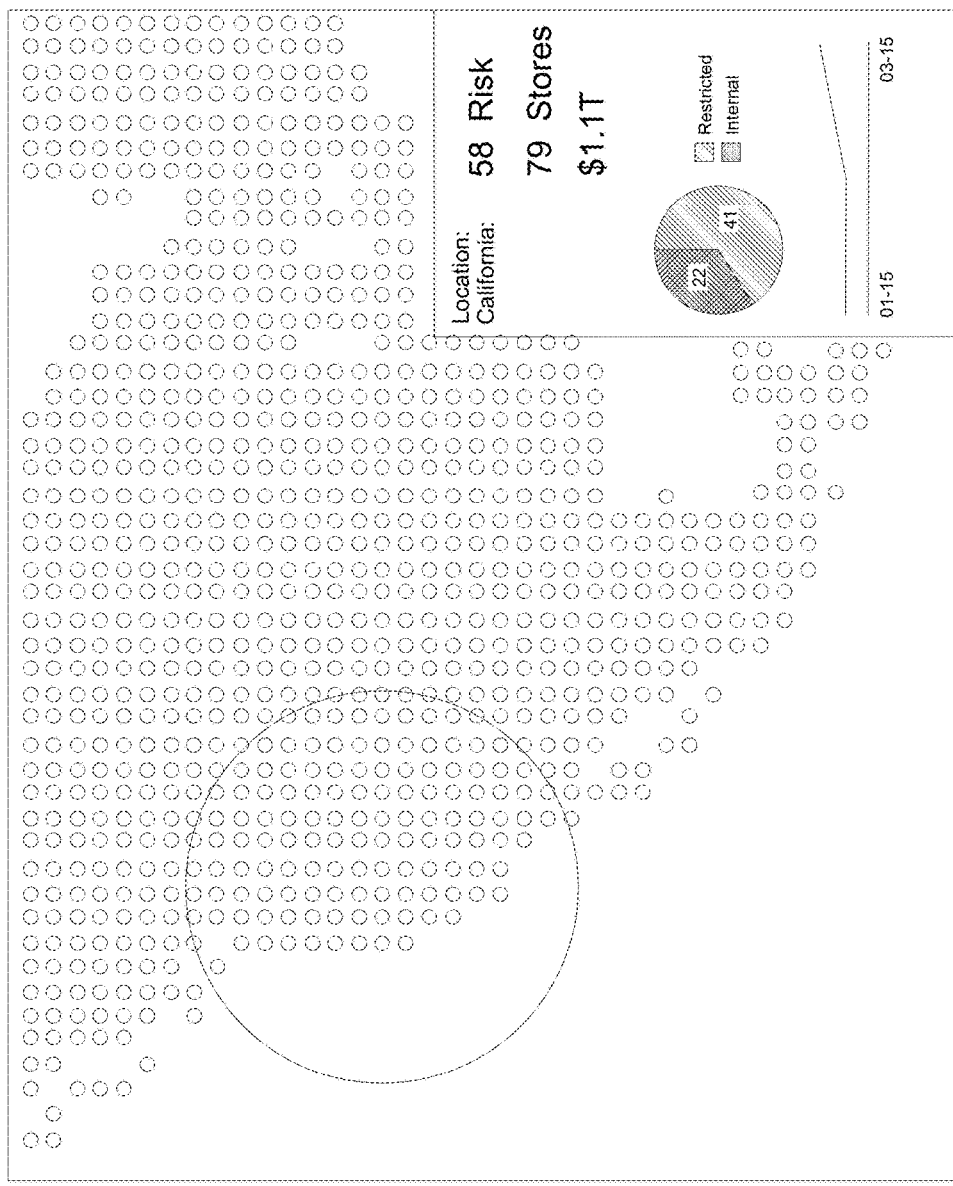
FIG. 20A is an example interface including status indicators of databases in a geographic region, in accordance with an embodiment.

FIG. 20A is an example interface including status indicators of databases in a geographic region, in accordance with an embodiment. The location display has a chart scope of databases with a particular location (California) and includes aggregate assessment indicators including risk score, number of enterprise databases 120, cost score, and sensitivity levels. The location display also includes a temporal trend display for an assessment dimension such as risk score.

Figure 20B:
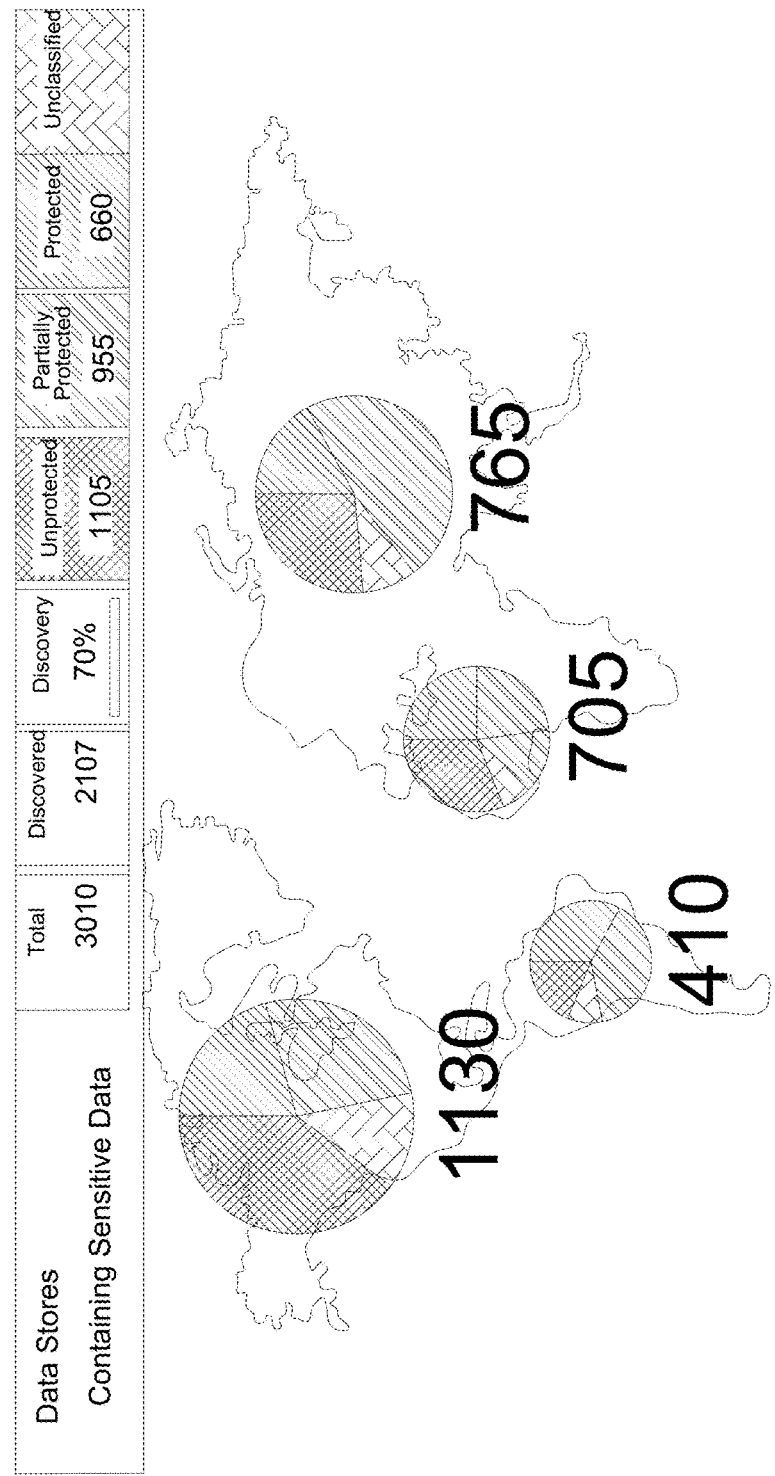
FIG. 20B is another example interface including status indicators of databases in different geographic regions, in accordance with an embodiment.

FIG. 20B is another example interface including status indicators of databases in different geographic regions, in accordance with an embodiment. Each continent has a chart with a chart scope of enterprise databases 120 in the continent, a filter dimension of protection status, and an assessment dimension of total number of databases.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the data management service 130 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for securing and monitoring sensitive data. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

The invention claimed is:

1. A method executed by one or more computing devices for determining an impact of a data element on enterprise security, comprising:
   analyzing, by at least one of the one or more computing devices, information retrieved over a computer network from one or more enterprise databases which store the data element to determine a plurality of impact values of the data element, wherein the plurality of impact values correspond to a plurality of impact factors and wherein the plurality of impact factors comprise one or more risk factors and one or more impression metric factors;
   receiving, by at least one of the one or more computing devices, for each of the plurality of impact factors, a plurality of value bands, each value band indicating a risk value corresponding to a predetermined range of impact values of that impact factor;
   mapping, by at least one of the one or more computing devices, the plurality of impact values to a plurality of risk values based at least in part on the plurality of band values for each impact factor in the plurality of impact factors;
   receiving, by at least one of the one or more computing devices, a plurality of weights corresponding to an assessment perspective, wherein each weight in the plurality of weights pairs with a corresponding impact factor in the plurality of impact factors; and
   determining, by at least one of the one or more computing devices, an element impact for the data element according to the assessment perspective by:
      applying the plurality of weights to the plurality of risk values to calculate a plurality of weighted risk values; and
      calculating the element impact as a product of the plurality of weighted risk values.

2. The method of claim 1, further comprising:
   receiving, by at least one of the one or more computing devices, a second plurality of weights corresponding to a second assessment perspective, wherein each weight in the second plurality of weights pairs with a corresponding impact factor in the plurality of impact factors; and
   determining, by at least one of the one or more computing devices, a second element impact for the data element according to the second assessment perspective by:
      applying the second plurality of weights to the plurality of risk values to calculate a second plurality of weighted risk values; and
      calculating the element impact as the product of the second plurality of weighted risk values;
   wherein the second element impact is different than the element impact.

3. The method of claim 1, further comprising:
   calculating, by at least one of the one or more computing devices, a data element impact score for the data element by dividing the element impact by a maximum impact factor, wherein the maximum impact factor comprises a product of the plurality of weights.

4. The method of claim 1,
   wherein the one or more risk factors comprise one or more of:
      a severity factor corresponding to a sensitivity level of the data element;
      a protection status factor corresponding to a percentage of protected fields in the data element;
      a data store quantity factor corresponding to quantity of data stores which are affected by the data element due to data proliferation; or
      a value factor corresponding to a value of the data element; and
   wherein the one or more impression metric factors comprise one or more of:
      a records quantity factor corresponding to a quantity of records which have the data element; or
      a sensitive fields quantity factor corresponding to a quantity of sensitive fields per record in the data element.

5. The method of claim 1, wherein analyzing information retrieved over a computer network from one or more enterprise databases which store the data element to determine a plurality of impact values of the data element comprises one or more of:
   analyzing header metadata retrieved from the one or more enterprise databases to determine a sensitivity level of the data element;

analyzing header metadata retrieved from the one or more enterprise databases to determine a quantity of protected fields in the data element;

analyzing data lineage information retrieved from the one or more enterprise databases to determine a quantity of data stores which are affected by the data element;

analyzing one or more data types retrieved from the one or more enterprise databases to determine one or more values of one or more fields the data element;

analyzing a volume of data retrieved from the one or more enterprise databases to determine a quantity of records having the data element; or analyzing one or more data fields of the data element retrieved from the one or more enterprise databases to determine a quantity of sensitive data fields.

6. A method executed by one or more computing devices for determining an impact of a data element on enterprise data quality, comprising:

analyzing, by at least one of the one or more computing devices, information retrieved over a computer network from one or more enterprise databases which store the data element to determine a plurality of impact values of the data element, wherein the plurality of impact values correspond to a plurality of impact factors;

receiving, by at least one of the one or more computing devices, for each of the plurality of impact factors, a plurality of value bands, each value band indicating a data quality value corresponding to a predetermined range of impact values of that impact factor;

mapping, by at least one of the one or more computing devices, the plurality of impact values to a plurality of data quality values based at least in part on the plurality of band values for each impact factor in the plurality of impact factors;

receiving, by at least one of the one or more computing devices, a plurality of weights corresponding to an assessment perspective, wherein each weight in the plurality of weights pairs with a corresponding impact factor in the plurality of impact factors; and determining, by at least one of the one or more computing devices, an element data quality impact for the data element according to the assessment perspective by:

applying the plurality of weights to the plurality of data quality values to calculate a plurality of weighted data quality values; and calculating the element data quality impact as a product of the plurality of weighted data quality values.

7. The method of claim 6, further comprising:

calculating, by at least one of the one or more computing devices, a data quality element impact score for the data element by dividing the element data quality impact by a maximum impact factor, wherein the maximum impact factor comprises a product of the plurality of weights.

8. An apparatus for determining an impact of a data element on enterprise security, the apparatus comprising:

one or more processors; and one or more memories operatively coupled to at least one of the one or more processors and having instructions stored thereon that, when executed by at least one of the one or more processors, cause at least one of the one or more processors to:

analyze information retrieved over a computer network from one or more enterprise databases which store the data element to determine a plurality of impact values of the data element, wherein the plurality of impact values correspond to a plurality of impact factors and wherein the plurality of impact factors comprise one or more risk factors and one or more impression metric factors;

receive, for each of the plurality of impact factors, a plurality of value bands, each value band indicating a risk value corresponding to a predetermined range of impact values of that impact factor;

map the plurality of impact values to a plurality of risk values based at least in part on the plurality of band values for each impact factor in the plurality of impact factors;

receive a plurality of weights corresponding to an assessment perspective, wherein each weight in the plurality of weights pairs with a corresponding impact factor in the plurality of impact factors; and determine an element impact for the data element according to the assessment perspective by:

applying the plurality of weights to the plurality of risk values to calculate a plurality of weighted risk values; and calculating the element impact as a product of the plurality of weighted risk values.

9. The apparatus of claim 8, wherein at least one of the one or more memories has further instructions stored thereon that, when executed by at least one of the one or more processors, cause at least one of the one or more processors to:

receive a second plurality of weights corresponding to a second assessment perspective, wherein each weight in the second plurality of weights pairs with a corresponding impact factor in the plurality of impact factors; and determine a second element impact for the data element according to the second assessment perspective by:

applying the second plurality of weights to the plurality of risk values to calculate a second plurality of weighted risk values; and calculating the element impact as the product of the second plurality of weighted risk values;

wherein the second element impact is different than the element impact.

10. The apparatus of claim 8, wherein at least one of the one or more memories has further instructions stored thereon that, when executed by at least one of the one or more processors, cause at least one of the one or more processors to:

calculate a data element impact score for the data element by dividing the element impact by a maximum impact factor, wherein the maximum impact factor comprises a product of the plurality of weights.

11. The apparatus of claim 8, wherein the one or more risk factors comprise one or more of:

a severity factor corresponding to a sensitivity level of the data element;

a protection status factor corresponding to a percentage of protected fields in the data element;

a data store quantity factor corresponding to a quantity of data stores which are affected by the data element due to data proliferation; or a value factor corresponding to a value of the data element; and wherein the one or more impression metric factors comprise one or more of:

a records quantity factor corresponding to a quantity of records which have the data element; or a sensitive fields quantity factor corresponding to a quantity of sensitive fields per record in the data element.

12. The apparatus of claim 8, wherein the instructions that, when executed by at least one of the one or more processors, cause at least one of the one or more processors to analyze information retrieved over a computer network from one or more enterprise databases which store the data element to determine a plurality of impact values of the data element further cause at least one of the one or more processors to:
 analyze header metadata retrieved from the one or more enterprise databases to determine a sensitivity level of the data element;
 analyze header metadata retrieved from the one or more enterprise databases to determine a quantity of protected fields in the data element;
 analyze data lineage information retrieved from the one or more enterprise databases to determine a quantity of data stores which are affected by the data element;
 analyze one or more data types retrieved from the one or more enterprise databases to determine one or more values of one or more fields the data element;
 analyze a volume of data retrieved from the one or more enterprise databases to determine a quantity of records having the data element; or
 analyze one or more data fields of the data element retrieved from the one or more enterprise databases to determine a quantity of sensitive data fields.

13. An apparatus for determining an impact of a data element on enterprise data quality, the apparatus comprising:
 one or more processors; and
 one or more memories operatively coupled to at least one of the one or more processors and having instructions stored thereon that, when executed by at least one of the one or more processors, cause at least one of the one or more processors to:
  analyze information retrieved over a computer network from one or more enterprise databases which store the data element to determine a plurality of impact values of the data element, wherein the plurality of impact values correspond to a plurality of impact factors;
  receive, for each of the plurality of impact factors a plurality of value bands, each value band indicating a data quality value corresponding to a predetermined range of impact values of that impact factor;
  map the plurality of impact values to a plurality of data quality values based at least in part on the plurality of band values for each impact factor in the plurality of impact factors;
  receive a plurality of weights corresponding to an assessment perspective, wherein each weight in the plurality of weights pairs with a corresponding impact factor in the plurality of impact factors; and
  determine an element data quality impact for the data element according to the assessment perspective by:
   applying the plurality of weights to the plurality of data quality values to calculate a plurality of weighted data quality values; and
   calculating the element data quality impact as a product of the plurality of weighted data quality values.

14. The apparatus of claim 13, wherein at least one of the one or more memories has further instructions stored thereon that, when executed by at least one of the one or more processors, cause at least one of the one or more processors to:
 calculate a data quality element impact score for the data element by dividing the element data quality impact by a maximum impact factor, wherein the maximum impact factor comprises a product of the plurality of weights.

15. At least one non-transitory computer-readable medium storing computer-readable instructions that, when executed by one or more computing devices, cause at least one of the one or more computing devices to:
 analyze information retrieved over a computer network from one or more enterprise databases which store the data element to determine a plurality of impact values of the data element, wherein the plurality of impact values correspond to a plurality of impact factors and wherein the plurality of impact factors comprise one or more risk factors and one or more impression metric factors;
 receive, for each of the plurality of impact factors, a plurality of value bands, each value band indicating a risk value corresponding to a predetermined range of impact values of that impact factor;
 map the plurality of impact values to a plurality of risk values based at least in part on the plurality of band values for each impact factor in the plurality of impact factors;
 receive a plurality of weights corresponding to an assessment perspective, wherein each weight in the plurality of weights pairs with a corresponding impact factor in the plurality of impact factors; and
 determine an element impact for the data element according to the assessment perspective by:
  applying the plurality of weights to the plurality of risk values to calculate a plurality of weighted risk values; and
  calculating the element impact as a product of the plurality of weighted risk values.

16. The at least one non-transitory computer-readable medium of claim 15, further storing computer-readable instructions that, when executed by at least one of the one or more computing devices, cause at least one of the one or more computing devices to:
 receive a second plurality of weights corresponding to a second assessment perspective, wherein each weight in the second plurality of weights pairs with a corresponding impact factor in the plurality of impact factors; and
 determine a second element impact for the data element according to the second assessment perspective by:
  applying the second plurality of weights to the plurality of risk values to calculate a second plurality of weighted risk values; and
  calculating the element impact as the product of the second plurality of weighted risk values;
 wherein the second element impact is different than the element impact.

17. The at least one non-transitory computer-readable medium of claim 15, further storing computer-readable instructions that, when executed by at least one of the one or more computing devices, cause at least one of the one or more computing devices to:
 calculate a data element impact score for the data element by dividing the element impact by a maximum impact factor, wherein the maximum impact factor comprises a product of the plurality of weights.

18. The at least one non-transitory computer-readable medium of claim 15,
  wherein the one or more risk factors comprise one or more of:
    a severity factor corresponding to a sensitivity level of the data element;
    a protection status factor corresponding to a percentage of protected fields in the data element;
    a data store quantity factor corresponding to a quantity of data stores which are affected by the data element due to data proliferation; or
    a value factor corresponding to a value of the data element; and
  wherein the one or more impression metric factors comprise one or more of:
    a records quantity factor corresponding to a quantity of records which have the data element; or
    a sensitive fields quantity factor corresponding to a quantity of sensitive fields per record in the data element.

19. The at least one non-transitory computer-readable medium of claim 15, wherein the instructions that, when executed by at least one of the one or more computing devices, cause at least one of the one or more computing devices to analyze information retrieved over a computer network from one or more enterprise databases which store the data element to determine a plurality of impact values of the data element further cause at least one of the one or more computing devices to:
  analyze header metadata retrieved from the one or more enterprise databases to determine a sensitivity level of the data element;
  analyze header metadata retrieved from the one or more enterprise databases to determine a quantity of protected fields in the data element;
  analyze data lineage information retrieved from the one or more enterprise databases to determine a quantity of data stores which are affected by the data element;
  analyze one or more data types retrieved from the one or more enterprise databases to determine one or more values of one or more fields the data element;
  analyze a volume of data retrieved from the one or more enterprise databases to determine a quantity of records having the data element; or
  analyze one or more data fields of the data element retrieved from the one or more enterprise databases to determine a quantity of sensitive data fields.

20. The at least one non-transitory computer-readable medium of claim 15, further storing computer-readable instructions that, when executed by at least one of the one or more computing devices, cause at least one of the one or more computing devices to:
  calculate a data quality element impact score for the data element by dividing the element data quality impact by a maximum impact factor, wherein the maximum impact factor comprises a product of the plurality of weights.

21. At least one non-transitory computer-readable medium storing computer-readable instructions that, when executed by one or more computing devices, cause at least one of the one or more computing devices to:
  analyze information retrieved over a computer network from one or more enterprise databases which store the data element to determine a plurality of impact values of the data element, wherein the plurality of impact values correspond to a plurality of impact factors;
  receive, for each of the plurality of impact factors a plurality of value bands, each value band indicating a data quality value corresponding to a predetermined range of impact values of that impact factor;
  map the plurality of impact values to a plurality of data quality values based at least in part on the plurality of band values for each impact factor in the plurality of impact factors;
  receive a plurality of weights corresponding to an assessment perspective, wherein each weight in the plurality of weights pairs with a corresponding impact factor in the plurality of impact factors; and
  determine an element data quality impact for the data element according to the assessment perspective by:
    applying the plurality of weights to the plurality of data quality values to calculate a plurality of weighted data quality values; and
    calculating the element data quality impact as a product of the plurality of weighted data quality values.

* * * * *